United States Patent
Brodin et al.

(10) Patent No.: US 12,497,651 B2
(45) Date of Patent: *Dec. 16, 2025

(54) ENCODED DUAL-PROBE ENDONUCLEASE ASSAYS

(71) Applicants: Pleno, Inc., San Diego, CA (US); Exact Sciences Corporation, Madison, WI (US)

(72) Inventors: Jeffrey Brodin, San Diego, CA (US); Lorenzo Berti, San Diego, CA (US); Donald Brian Eidson, San Diego, CA (US); Christian Schlegel, San Diego, CA (US); Angela Blum, San Diego, CA (US); Rachel Schowalter, San Diego, CA (US); Ludovic Vincent, San Diego, CA (US); Pieter Van Rooyen, San Diego, CA (US); Gavin Stone, San Diego, CA (US); Hatim T. Allawi, Middleton, WI (US)

(73) Assignees: Pleno, Inc.; Exact Sciences Corporation

( * ) Notice: Subject to any disclaimer, the term of this patent is extended or adjusted under 35 U.S.C. 154(b) by 0 days.

This patent is subject to a terminal disclaimer.

(21) Appl. No.: 18/150,661

(22) Filed: Jan. 5, 2023

(65) Prior Publication Data

US 2023/0257801 A1 Aug. 17, 2023

Related U.S. Application Data

(63) Continuation of application No. PCT/US2022/037791, filed on Jul. 21, 2022, which is a continuation of application No. PCT/US2021/060647, filed on Nov. 23, 2021.

(60) Provisional application No. 63/346,186, filed on May 26, 2022, provisional application No. 63/317,838, filed on Mar. 8, 2022, provisional application No. 63/234,635, filed on Aug. 18, 2021, provisional application No. 63/222,963, filed on Jul. 17, 2021, provisional application No. 63/183,876, filed on May 4, 2021, provisional application No. 63/157,924, filed on Mar. 8, 2021, provisional application No. 63/126,414, filed on Dec. 16, 2020, provisional application No. 63/116,997, filed on Nov. 23, 2020.

(51) Int. Cl.
| | | |
|---|---|---|
| *C12Q 1/6827* | (2018.01) | |
| *C12N 9/22* | (2006.01) | |
| *C12Q 1/6874* | (2018.01) | |
| *C12Q 1/6886* | (2018.01) | |
| *G16B 30/20* | (2019.01) | |

(52) U.S. Cl.
CPC .......... *C12Q 1/6827* (2013.01); *C12N 9/22* (2013.01); *C12Q 1/6874* (2013.01); *C12Q 1/6886* (2013.01); *G16B 30/20* (2019.02); *C12Q 2600/154* (2013.01); *C12Q 2600/156* (2013.01)

(58) Field of Classification Search
CPC .. C12Q 1/6827; C12Q 1/6874; C12Q 1/6886; C12Q 2600/154; C12Q 2600/156; C12Q 1/6816; C12N 9/22; G16B 30/20; G16B 40/10
See application file for complete search history.

(56) References Cited

U.S. PATENT DOCUMENTS

| | | |
|---|---|---|
| 5,912,124 A | 6/1999 | Kumar |
| 6,221,603 B1 | 4/2001 | Mahtani |
| 6,225,056 B1 | 5/2001 | Abe et al. |
| 6,996,475 B2 | 2/2006 | Balaban |
| 7,074,564 B2 | 7/2006 | Landegren |
| 7,115,364 B1 | 10/2006 | Chee et al. |
| 7,189,509 B2 | 3/2007 | Shao et al. |
| 7,294,466 B2 | 11/2007 | McMillan |

(Continued)

FOREIGN PATENT DOCUMENTS

| | | |
|---|---|---|
| EP | 0867506 A1 | 9/1998 |
| EP | 1007725 A1 | 6/2000 |

(Continued)

OTHER PUBLICATIONS

Ezpeleta, Joaquín, et al. "Designing robust watermark barcodes for multiplex long-read sequencing." Bioinformatics 33.6 (2017): 807-813 (Year: 2017).*

(Continued)

*Primary Examiner* — Anne M. Gussow
*Assistant Examiner* — Kyle T Rega
(74) *Attorney, Agent, or Firm* — Wilson Sonsini Goodrich & Rosati

(57) ABSTRACT

Methods are provided for conducting a dual-probe assay on a set of nucleic acid targets, including: combining a set of dual probes with a sample composition potentially comprising a set of nucleic acid targets to form a set of cleavable ternary nucleic acid complexes; releasing from the cleavable ternary nucleic acid complex a set of recognition element fragments; hybridizing each of the set of released recognition element fragments to a coded oligonucleotide probe and using resulting hybridized released recognition elements as primers for copying the coded oligonucleotide probe to produce a set of target-associated codes, wherein each of the coded oligonucleotide probes comprises a code from a set of codes, each code comprises at least one segment encoding one or more symbols that correspond to a sequence of one or more nucleotides; and performing a detection event to identify a set of detected codes of the target-associated codes.

28 Claims, 36 Drawing Sheets

Specification includes a Sequence Listing.

(56) References Cited

U.S. PATENT DOCUMENTS

| | | |
|---|---|---|
| 7,427,479 B2 | 9/2008 | Karger et al. |
| 8,278,052 B2 | 10/2012 | Lam et al. |
| 8,407,013 B2 | 3/2013 | Rogan |
| 8,664,164 B2 | 3/2014 | Ericsson et al. |
| 8,828,661 B2 | 9/2014 | Lucero et al. |
| 9,090,934 B2 | 7/2015 | Lucero et al. |
| 9,234,239 B2 | 1/2016 | Sikora et al. |
| 9,624,538 B2 | 4/2017 | Church et al. |
| 9,809,848 B2 | 11/2017 | Jones |
| 10,093,986 B2 | 10/2018 | Zhang et al. |
| 10,108,777 B2 | 10/2018 | Huang et al. |
| 10,214,773 B2 | 2/2019 | Jones |
| 10,227,632 B2 | 3/2019 | Jarvius |
| 10,465,245 B2 | 11/2019 | Mann et al. |
| 10,513,739 B2 | 12/2019 | Zhang et al. |
| 10,731,214 B2 | 8/2020 | Dahl et al. |
| 10,829,814 B2 | 11/2020 | Fan et al. |
| 10,829,821 B2 | 11/2020 | Zhang et al. |
| 10,837,879 B2 | 11/2020 | Burns et al. |
| 11,028,435 B2 | 6/2021 | Kelley et al. |
| 11,549,135 B2 | 1/2023 | Engreitz |
| 11,597,965 B2 | 3/2023 | Nilsson et al. |
| 11,680,284 B2 | 6/2023 | Gore et al. |
| 2004/0086892 A1 | 5/2004 | Crothers et al. |
| 2008/0269068 A1 | 10/2008 | Church et al. |
| 2011/0159499 A1 | 6/2011 | Hindson et al. |
| 2013/0084561 A1 | 4/2013 | Coull et al. |
| 2013/0109588 A1* | 5/2013 | Chun .................. C12Q 1/6853 506/9 |
| 2013/0224729 A1 | 8/2013 | Church et al. |
| 2015/0004600 A1 | 1/2015 | Wang et al. |
| 2015/0284786 A1 | 10/2015 | Shapero et al. |
| 2015/0369772 A1 | 12/2015 | Van De Stolpe et al. |
| 2016/0010085 A1 | 1/2016 | Kwon et al. |
| 2016/0108460 A1 | 4/2016 | Lucero et al. |
| 2017/0183726 A1 | 6/2017 | Church et al. |
| 2018/0363039 A1 | 12/2018 | Weng et al. |
| 2019/0078150 A1 | 3/2019 | Chen et al. |
| 2019/0292581 A1 | 9/2019 | Egidio et al. |
| 2019/0309352 A1 | 10/2019 | Buis et al. |
| 2019/0352697 A1 | 11/2019 | Jones |
| 2020/0040376 A1 | 2/2020 | Russel et al. |
| 2020/0131570 A1 | 4/2020 | Berti et al. |
| 2020/0149037 A1 | 5/2020 | Shum |
| 2020/0224244 A1 | 7/2020 | Nilsson et al. |
| 2020/0255821 A1 | 8/2020 | Wang et al. |
| 2020/0277664 A1 | 9/2020 | Frenz |
| 2020/0309784 A1 | 10/2020 | Bertozzi et al. |
| 2021/0087625 A1 | 3/2021 | Fan et al. |
| 2021/0198727 A1 | 7/2021 | Kühnemund et al. |
| 2021/0238680 A1 | 8/2021 | Bava |
| 2021/0277460 A1 | 9/2021 | Bava |
| 2021/0340618 A1 | 11/2021 | Kühnemund et al. |
| 2021/0355483 A1 | 11/2021 | Chee et al. |
| 2022/0025429 A1 | 1/2022 | Liao et al. |
| 2022/0157400 A1 | 5/2022 | Struble et al. |
| 2022/0186301 A1 | 6/2022 | Nguyen et al. |
| 2022/0228200 A1 | 7/2022 | Bava |
| 2022/0358672 A1 | 11/2022 | Babadi et al. |
| 2022/0372654 A1 | 11/2022 | Fu et al. |
| 2022/0390442 A1 | 12/2022 | Luo et al. |
| 2022/0403457 A1 | 12/2022 | Glezer et al. |
| 2023/0021752 A1 | 1/2023 | Kapur et al. |
| 2023/0048356 A1 | 2/2023 | Zobeck et al. |
| 2023/0084407 A1 | 3/2023 | Hernández Neuta et al. |
| 2023/0115903 A1 | 4/2023 | Hernández Neuta et al. |
| 2023/0295739 A1 | 9/2023 | Brodin et al. |

FOREIGN PATENT DOCUMENTS

| | | |
|---|---|---|
| EP | 1141417 A1 | 10/2001 |
| EP | 1252334 A2 | 10/2002 |
| EP | 1297179 B1 | 9/2008 |
| EP | 1399588 B1 | 8/2010 |
| EP | 1558764 B1 | 1/2011 |
| EP | 2464753 A1 | 6/2012 |
| EP | 1423532 B1 | 5/2013 |
| EP | 2773452 A1 | 9/2014 |
| EP | 1745155 B1 | 10/2014 |
| EP | 2885638 A2 | 6/2015 |
| EP | 2954315 A2 | 12/2015 |
| EP | 2971121 A1 | 1/2016 |
| EP | 2456888 B1 | 4/2016 |
| EP | 3041957 A1 | 7/2016 |
| EP | 2504448 B1 | 10/2016 |
| EP | 2627781 B1 | 2/2017 |
| EP | 2236622 B1 | 9/2017 |
| EP | 3074535 B1 | 10/2017 |
| EP | 3383994 A1 | 10/2018 |
| EP | 3507364 A1 | 7/2019 |
| EP | 3541950 A1 | 9/2019 |
| EP | 3583214 A1 | 12/2019 |
| EP | 3126523 B1 | 2/2020 |
| EP | 3619326 A1 | 3/2020 |
| EP | 2885638 B1 | 4/2020 |
| EP | 3668998 A1 | 6/2020 |
| EP | 3696275 A1 | 8/2020 |
| EP | 3789490 A1 | 3/2021 |
| EP | 3798318 A1 | 3/2021 |
| EP | 3818177 A1 | 5/2021 |
| EP | 3555317 B1 | 6/2021 |
| EP | 3837365 A1 | 6/2021 |
| EP | 3770273 B1 | 9/2021 |
| EP | 3892735 A1 | 10/2021 |
| EP | 3918090 A1 | 12/2021 |
| EP | 3947721 A1 | 2/2022 |
| EP | 3976817 A1 | 4/2022 |
| EP | 4004234 A1 | 6/2022 |
| EP | 3872187 B1 | 9/2022 |
| EP | 4073270 A1 | 10/2022 |
| WO | WO-9747769 A1 | 12/1997 |
| WO | WO-9811210 A1 | 3/1998 |
| WO | WO-9949079 A1 | 9/1999 |
| WO | WO-0036141 A1 | 6/2000 |
| WO | WO-0157256 A2 | 8/2001 |
| WO | WO-2004044549 A2 | 5/2004 |
| WO | WO-2005010199 A2 | 2/2005 |
| WO | WO-2005061735 A2 | 7/2005 |
| WO | WO-2007061284 A1 | 5/2007 |
| WO | WO-2007120208 A2 | 10/2007 |
| WO | WO-2011019874 A1 | 2/2011 |
| WO | WO-2011066476 A1 | 6/2011 |
| WO | WO-2012049316 A1 | 4/2012 |
| WO | WO-2013066975 A1 | 5/2013 |
| WO | WO-2013123220 A1 * | 8/2013 | ........... C12Q 1/6806 |
| WO | WO-2014122548 A2 | 8/2014 |
| WO | WO-2014144371 A1 | 9/2014 |
| WO | WO-2015035087 A1 | 3/2015 |
| WO | WO-2015079042 A1 | 6/2015 |
| WO | WO-2017087560 A1 | 5/2017 |
| WO | WO-2017096322 A1 | 6/2017 |
| WO | WO-2018094031 A1 | 5/2018 |
| WO | WO-2018109206 A1 | 6/2018 |
| WO | WO-2019068880 A1 | 4/2019 |
| WO | WO-2019195268 A2 | 10/2019 |
| WO | WO-2020069350 A1 | 4/2020 |
| WO | WO-2020124050 A1 | 6/2020 |
| WO | WO-2020193769 A1 | 10/2020 |
| WO | WO-2020240025 A1 | 12/2020 |
| WO | WO-2021007099 A1 | 1/2021 |
| WO | WO-2021021982 A1 | 2/2021 |
| WO | WO-2021033981 A1 | 2/2021 |
| WO | WO-2021118435 A1 | 6/2021 |
| WO | WO-2021123282 A1 | 6/2021 |
| WO | WO-2021123286 A1 | 6/2021 |
| WO | WO-2021146636 A1 | 7/2021 |
| WO | WO-2022026891 A1 | 2/2022 |
| WO | WO-2022040147 A1 | 2/2022 |
| WO | WO-2022109496 A2 | 5/2022 |
| WO | WO-2022159474 A1 | 7/2022 |
| WO | WO-2022164989 A2 | 8/2022 |
| WO | WO-2022197589 A1 | 9/2022 |
| WO | WO-2022235764 A1 | 11/2022 |

(56) References Cited

FOREIGN PATENT DOCUMENTS

| WO | WO-2022236011 A1 | 11/2022 |
|---|---|---|
| WO | WO-2022251586 A1 | 12/2022 |
| WO | WO-2023015192 A1 | 2/2023 |
| WO | WO-2023021518 A1 | 2/2023 |
| WO | WO-2023077109 A2 | 5/2023 |
| WO | WO-2023096671 A1 | 6/2023 |
| WO | WO-2023096672 A1 | 6/2023 |
| WO | WO-2023096674 A1 | 6/2023 |
| WO | WO-2023096675 A1 | 6/2023 |
| WO | WO-2023102245 A1 | 6/2023 |
| WO | WO-2023122345 A1 | 6/2023 |
| WO | WO-2023141588 A1 | 7/2023 |
| WO | WO-2023158993 A2 | 8/2023 |

OTHER PUBLICATIONS

Ali, M. Monsur, et al. "Rolling circle amplification: a versatile tool for chemical biology, materials science and medicine." Chemical Society Reviews 43.10 (2014): 3324-3341 (Year: 2014).*

Frank, Daniel N. "BARCRAWL and BARTAB: software tools for the design and implementation of barcoded primers for highly multiplexed DNA sequencing." BMC bioinformatics 10.1 (2009): 1-13 (Year: 2009).*

Sun, Wei, et al. "The association between copy number aberration, DNA methylation and gene expression in tumor samples." Nucleic acids research 46.6 (2018): 3009-3018 (Year: 2018).*

Ong, Carmichael, et al. "Ligation with Nucleic Acid Sequence-Based Amplification." The Journal of Molecular Diagnostics 14.3 (2012): 206-213 (Year: 2012).*

Chen (Nucleic acids research 46.4 (2018): e22-e22) (Year: 2018).*

Chung et al., Deterministic droplet-based co-encapsulation and pairing of microparticles via active sorting and downstream merging. Lab Chip. 17(21):3664-3671 (2017).

Lareau et al., Droplet-based combinatorial indexing for massive-scale single-cell chromatin accessibility. Nat Biotechnol. 916-924 (2019).

PCT/US2022/037791 International Search Report and Written Opinion dated Dec. 2, 2022.

Gao et al., Rolling circle amplification for single cell analysis and in situ sequencing. TrAC Trends in Analytical Chemistry. 121:115700, pp. (2019).

Sorvillo et al., Extracellular DNA NET-works with dire consequences for health. Circ Res. 125(4):470-488 (2019).

PCTUS2021060647 International Search Report and Written Opinion dated May 16, 2022.

PCTUS202237781 International Search Report and Written Opinion dated Dec. 19, 2022.

U.S. Appl. No. 18/150,669 Office Action dated Mar. 7, 2024.

U.S. Appl. No. 18/150,669 Office Action dated Sep. 5, 2024.

* cited by examiner

|  | Total Bases In Sequence (Including Header and Tail) | Total Bases In Code Word (proper) | Total, Full Pyro Cycles (in a Code Word proper) |
|---|---|---|---|
| Locus Code #1 | 28 | 26 | 10 |
| Locus Code #2 | 28 | 26 | 10 |
| Locus Code #3 | 29 | 27 | 10 |
| d_min of CWs set | | | |
| 25 | | | |

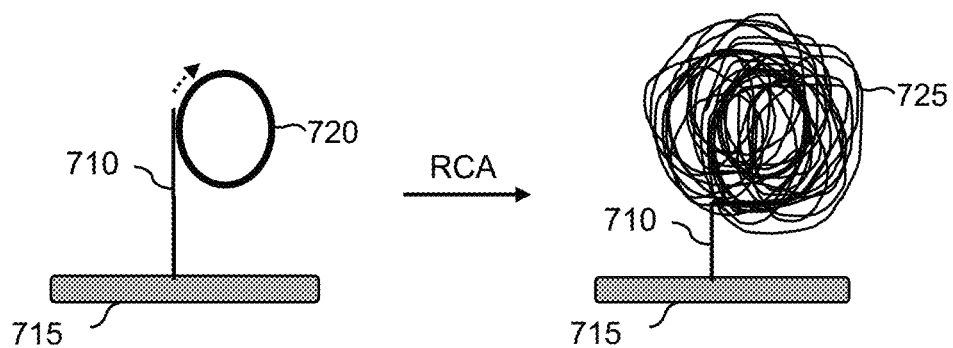
FIG. 7A
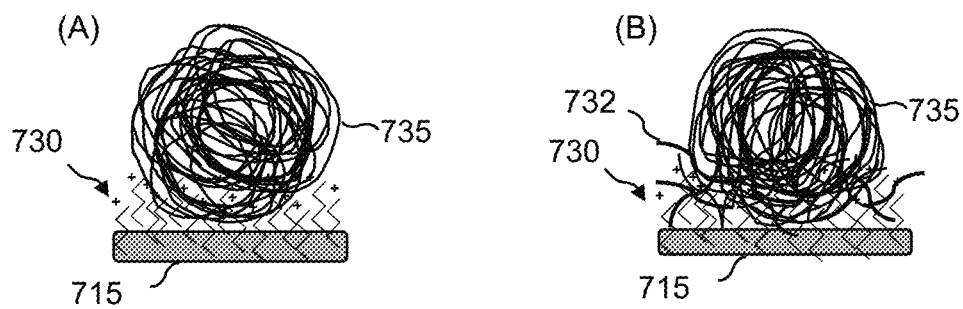
FIG. 7B
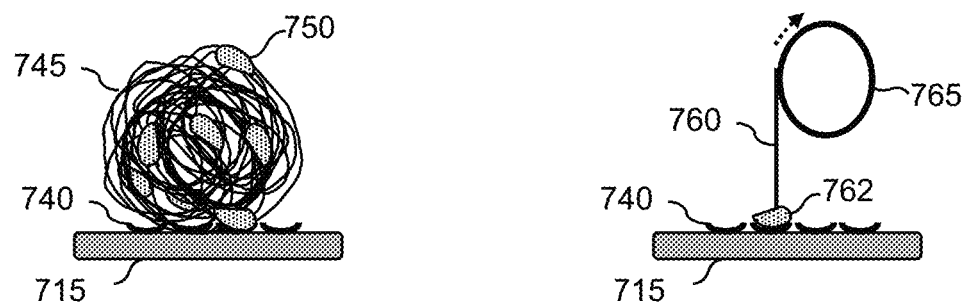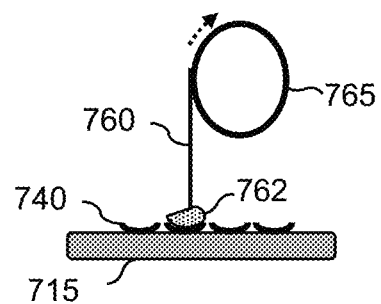
FIG. 7C  FIG. 7D

FIG. 27

| Targets | 10 | 100 | 1,000 | 10,000 |
|---|---|---|---|---|
| Code Space | 256 | 65,536 | 9,765,625 | 10,000,000,000 |
| Segments | 4 | 4 | 4 | 4 |
| # Flows (time) | 4 | 8 | 10 | 10 |
| Colors | 4 | 4 | 5 | 10 |

*Trellis code modulation*

High efficiency transmission over band-limited channels using quaternary numeral system (4 color system)

Enables error correction in the system to maximize decoding sensitivity and minimize overall error rate From a code space of 65,536 possible codewords → select 128 error correcting hypercodes

| Excluded sequences | | | | | |
|---|---|---|---|---|---|
| Hairpins | Primer dimers | | Uniqueness | | |
| Seq 3 | Seq 4 | Seq | Seq | Seq | 23 |
| Seq 7 | Seq | Seq 4 | Seq | 23 Seq | |
| Seq 11 | Seq 25 | Seq | Seq | 14 Seq | |
| Seq 13 | Seq | Seq 25 | Seq | 10 Seq | |
| Seq 15 | Seq 12 | Seq | Seq | Seq | 10 |
| Seq 26 | Seq | Seq 12 | Seq | Seq | 34 |
| Seq 29 | Seq 8 | Seq | Seq | 34 Seq | |
| Seq 36 | Seq | Seq 8 | Seq | Seq | 9 |
| Seq 39 | | | | | |
| Seq 48 | | | | | |
| Seq 49 | | | | | |

Highest Tm = 57°C (on target)
Lowest Tm = 48°C (on target)

Highest Tm = 23°C (off target)
Highest Tm = 23°C (primer dimers)

Lists of 10's-100's segments are generated with different requirements

*FIG. 30B*

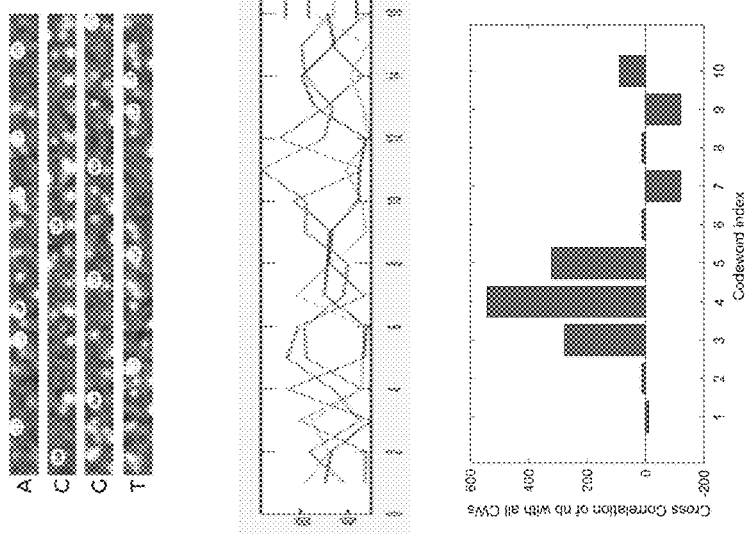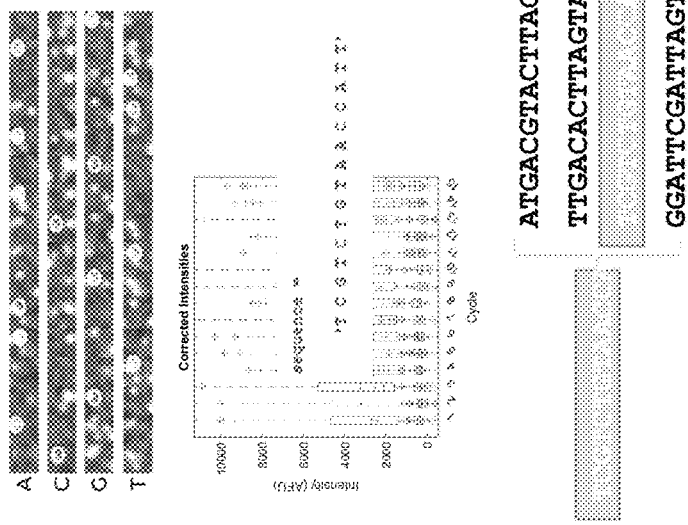
FIG. 31

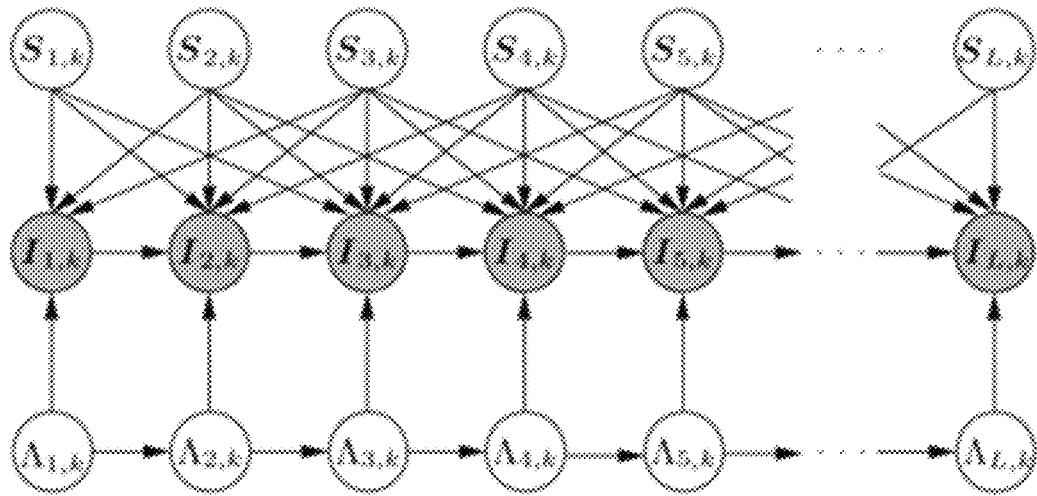

- Modelled after probabilistic next generation sequencing basecalling algorithm – NaïveBayesCall
- Model includes
    - Signal decay
        - lower signal from features over subsequent hybridization events
    - Amplitude noise
        - intensity fluctuations for each feature
    - Color crosstalk
        - bleed over of signal among channels
    - Signal leakage in time
        - rising background, non-specific binding, etc.
    - System noise

*FIG. 33*

SEQUENCE LISTING

```
Sequence total quantity: 8
SEQ ID NO: 1            moltype = DNA  length = 28
FEATURE                 Location/Qualifiers
source                  1..28
                        mol_type = other DNA
                        organism = synthetic construct
SEQUENCE: 1
actagcagct actgactaga gagtgcag                                      28

SEQ ID NO: 2            moltype = DNA  length = 28
FEATURE                 Location/Qualifiers
source                  1..28
                        mol_type = other DNA
                        organism = synthetic construct
SEQUENCE: 2
agtctgcaga tagtagctgc tgcagctg                                      28

SEQ ID NO: 3            moltype = DNA  length = 29
FEATURE                 Location/Qualifiers
source                  1..29
                        mol_type = other DNA
                        organism = synthetic construct
SEQUENCE: 3
agcagtatgc tagtgcgcta ctactatag                                     29

SEQ ID NO: 4            moltype = DNA  length = 15
FEATURE                 Location/Qualifiers
source                  1..15
                        mol_type = other DNA
                        organism = synthetic construct
SEQUENCE: 4
tcgtctgtaa ccatt                                                    15

SEQ ID NO: 5            moltype = DNA  length = 15
FEATURE                 Location/Qualifiers
source                  1..15
                        mol_type = other DNA
                        organism = synthetic construct
SEQUENCE: 5
atgacgtact tacgc                                                    15

SEQ ID NO: 6            moltype = DNA  length = 15
FEATURE                 Location/Qualifiers
source                  1..15
```

```
                        mol_type = other DNA
                        organism = synthetic construct
SEQUENCE: 6
ttgacactta gtacc                                                        15

SEQ ID NO: 7            moltype = DNA  length = 15
FEATURE                 Location/Qualifiers
source                  1..15
                        mol_type = other DNA
                        organism = synthetic construct
SEQUENCE: 7
ggattcgatt agtag                                                        15

SEQ ID NO: 8            moltype = DNA  length = 13
FEATURE                 Location/Qualifiers
source                  1..13
                        mol_type = other DNA
                        organism = synthetic construct
SEQUENCE: 8
tcgtctgtaa cca                                                          13
```

ENCODED DUAL-PROBE ENDONUCLEASE ASSAYS

RELATED APPLICATIONS

This application is a continuation application of International Application No. PCT/US2022/037791, filed Jul. 21, 2022, which claims the benefit of U.S. Provisional Application No. 63/346,186, filed on May 26, 2022, and claims the benefit of U.S. Provisional Application No. 63/317,838, filed on Mar. 8, 2022, and is a Continuation of International Patent Application No. PCT/US2021/60647, filed on Nov. 23, 2021, which claims the benefit of U.S. Provisional Application No. 63/234,635, filed Aug. 18, 2021, U.S. Provisional Application No. 63/222,963, filed Jul. 17, 2021, U.S. Provisional Application No. 63/183,876, filed May 4, 2021, U.S. Provisional Application No. 63/157,924, filed Mar. 8, 2021, U.S. Provisional Application No. 63/126,414, filed Dec. 16, 2020 and U.S. Provisional Application No. 63/116,997 filed Nov. 23, 2020, each of which is herein incorporated by reference in its entirety.

SEQUENCE LISTING

The instant application contains a Sequence Listing which has been submitted electronically in XML file format and is hereby incorporated by reference in its entirety. Said XML copy, created on Apr. 19, 2022, is named 64100_719_302_SL.xml and is 8,039 bytes in size.

FIELD OF THE INVENTION

The invention relates to encoded assays, in which a target analyte is detected based on association of the target with a code, and detection of the code as a surrogate for detection of the target analyte.

BACKGROUND OF THE INVENTION

Many assays such as single base detection assays require a high-level of sensitivity and specificity and are associated with low signal level. Low signal requires amplification (e.g., PCR, immunostaining cascades, and the like) resulting in complex and lengthy protocols, high-level of background and other biases limiting the performance of the assay. There is a need in the art for assays that are easier to read and detect at higher sensitivity than the analyte itself.

BRIEF DESCRIPTION OF DRAWINGS

The features and advantages of the present invention will be more clearly understood from the following description taken in conjunction with the accompanying drawings, which are not necessarily drawn to scale, and wherein:

FIG. 3 discloses SEQ ID NOS 1-3, respectively, in order of appearance.

FIG. 7A is a schematic diagram illustrating an example of a process of using a surface-bound oligonucleotide to initiate an RCA reaction.

FIG. 7B is a schematic diagram illustrating an example of capturing a nanoball on a cation-coated surface.

FIG. 7C is a schematic diagram illustrating an example of capturing a nanoball on a streptavidin-coated surface.

FIG. 7D is a schematic diagram showing an example of using a biotin-streptavidin linkage to perform a surface-bound RCA reaction.

FIG. 27 is a screenshot of an example of the permutations (e.g., colors, flows/segment, total segments, and total flows) that may be used to achieve a relatively large combination space (codespace) from which to select a subset of codes.

FIG. 30B shows examples of excluded sequences and temperature parameters for the strategy for designing oligo segments on a probe of FIG. 40A.

FIG. 31 is a representation of an overview of a decoding process comparing hard decoding vs. soft decoding. FIG. 31 discloses SEQ ID NOS 4-8 respectively, in order of appearance.

FIG. 33 is a summary of a channel model for a base calling algorithm that may be used in a soft decoding process.

SUMMARY OF THE INVENTION

Figure 1:
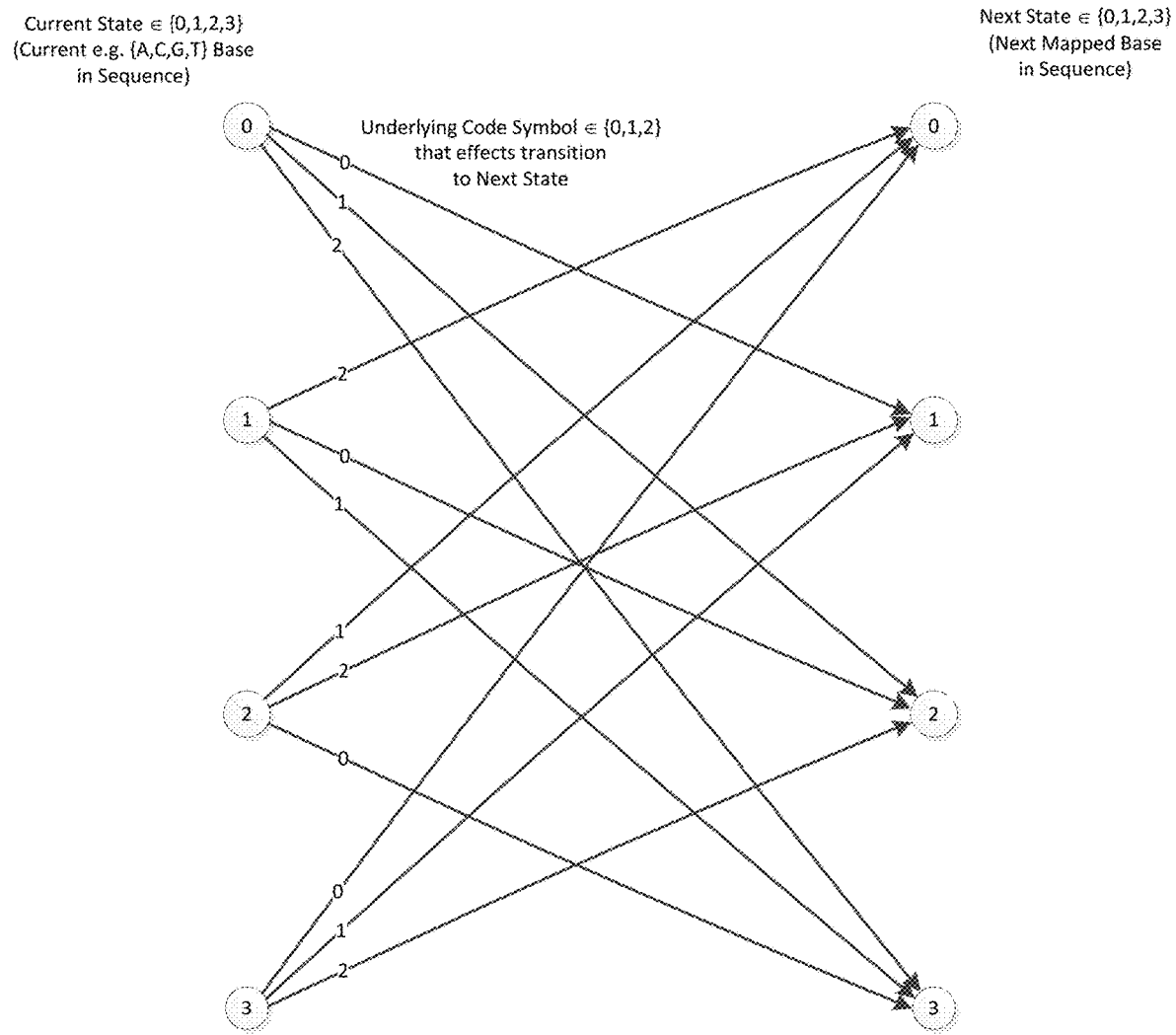
FIG. 1 is a diagram illustrating an encoding method that uses a 4-state encoding trellis with 3 transitions per state.

In one embodiment, a method is provided of conducting an assay for a nucleic acid target, the method comprising: (a) providing a composition potentially comprising the nucleic acid target; (b) binding a dual probe recognition element to the nucleic acid target, if present, to form a cleavable ternary nucleic acid complex, wherein (i) the dual probe recognition element comprises two probes; (ii) a probe of the dual probe recognition element comprises a mismatch sequence comprising a code; (iii) binding the dual probe recognition element to the nucleic acid target with no mismatches causes the mismatch sequence to form a cleavable ternary nucleic acid complex; and (iv) binding the dual probe recognition element to a nucleic acid with mismatches does not cause the mismatch sequence to form a cleavable ternary nucleic acid complex; (c) cleaving the ternary nucleic acid complex, if present, to release a recognition element fragment comprising the mismatch sequence and the code; and (d) using the recognition element fragment, if present, to determine the presence of the code; wherein the presence of the code indicates the presence of the nucleic acid target in the composition, and absence of the code indicates absence of the nucleic acid target in the composition.

In another embodiment, a method is provided of conducting an assay for a nucleic acid target, the method comprising: (a) providing a composition potentially comprising the nucleic acid target; (b) binding a dual probe recognition element to the nucleic acid target, if present, to form a cleavable ternary nucleic acid complex, wherein (i) the dual probe recognition element comprises two probes; (ii) a probe of the dual probe recognition element comprises a mismatch sequence, wherein the mismatch sequence does not comprise a code; (iii) binding the dual probe recognition element to the nucleic acid target with no mismatches causes the mismatch sequence to form a cleavable ternary nucleic acid complex; and (iv) binding the dual probe recognition element to a nucleic acid with mismatches does not cause the mismatch sequence to form a cleavable ternary nucleic acid complex; (c) cleaving the ternary nucleic acid complex, if present, to release a recognition element fragment comprising the mismatch sequence; (d) binding the recognition element fragment to a complementary oligonucleotide probe, wherein (i) the oligonucleotide probe comprises a code; and (ii) binding the recognition element fragment to the oligonucleotide probe produces a hybrid complex comprising the recognition element fragment and the oligonucleotide probe; and (e) using the hybrid complex, if present, to determine the presence of the code, wherein the presence of the code indicates the presence of the nucleic acid target in the composition, and absence of the code indicates absence of the nucleic acid target in the composition.

In various aspects, a method is provided of conducting an assay for nucleic acid targets, the method comprising: (a) combining, with a set of nucleic acid targets potentially present in a sample, a set of single encoded oligonucleotide probes in an amplification reaction with a forward and a reverse primer and a DNA polymerase having 5' nuclease activity, in which: (i) each of the set of encoded probes comprises a mismatch sequence comprising a code from a set of codes and a target-specific sequence having at least one base complementary to a target site of interest and each code forms in the presence of the target a hybridized target-specific region and a single-stranded region that includes the mismatch sequence, and (ii) during the amplification, the DNA polymerase cleaves at a 5' terminus of the target-specific region and releases the mismatch sequence if there is a match between the probe and the target site; and (b) performing a ligation reaction to circularize the released mismatch sequence; and (c) amplifying the circularized sequence and detecting the targets by decoding the codes that are amplified.

In other aspects, a method is provided of conducting an assay for nucleic acid targets, the method comprising: (a) combining, with a set of nucleic acid targets potentially present in a sample, a set of single oligonucleotide probes in an amplification reaction with a forward and a reverse primer and a DNA polymerase having 5' nuclease activity, in which: (i) each of the set of probes comprises a mismatch sequence and a target-specific sequence having at least one base complementary to a target site of interest and each probe forms in the presence of the target a hybridized target-specific region and a single-stranded region that includes the mismatch sequence, and (ii) during the amplification, the DNA polymerase cleaves at a 5' terminus of the target-specific region and releases the mismatch sequence if there is a match between the probe and the target site; (b) hybridizing the released mismatch sequences with a set of encoded probes each encoded probe comprising a code from a set of codes and complementarity to the mismatch sequence and performing a ligation reaction to circularize the encoded probe sequence; and (c) amplifying the circularized sequence and detecting the targets by decoding the codes that are amplified.

In one embodiment, a method is provide of conducting an assay for nucleic acid targets, the method including: (a) combining a set of coded dual probe recognition elements with a composition potentially including a set of nucleic acid targets to form a set of cleavable ternary nucleic acid complexes, wherein (i) each dual probe recognition element comprises two probes; (ii) a probe of each of the dual probe recognition elements includes a mismatch sequence including a code from a set of codes, wherein each code comprises at least one segment encoding one or more symbols that correspond to a sequence of one or more nucleotides; (iii) binding of the dual probe recognition element to the nucleic acid target with no mismatches results in a cleavable ternary nucleic acid complex; and (iv) binding of the dual probe recognition element to a nucleic acid with mismatches results in an uncleavable ternary nucleic acid complex; (b) performing a transformation event in which a set of recognition element fragments including the mismatch sequence and the code is released from the cleavable ternary nucleic acid complex and circularizing the released fragments to produce a set of circular modified recognition elements including the target-associated codes; and (c) performing a detection event for each code of the set of circular modified recognition element fragments to determine the presence of the code; wherein the presence of the code indicates the presence of the nucleic acid target in the composition, and absence of the code indicates absence of the nucleic acid target in the composition.

In another embodiment, a method is provided of conducting an assay for nucleic acid targets, the method including: (a) combining a set of dual probe recognition elements with a composition potentially including a set of nucleic acid targets to form a set of cleavable ternary nucleic acid complexes, wherein: (i) each dual probe recognition element comprises two probes; (ii) a probe of each of the dual probe recognition elements comprises a mismatch sequence; (iii) binding of the dual probe recognition element to the nucleic acid target with no mismatches results in a cleavable ternary nucleic acid complex; and (iv) binding of the dual probe recognition element to a nucleic acid with mismatches results in an uncleavable ternary nucleic acid complex; (b) performing a transformation event in which a set of recognition element fragments including the mismatch sequence is released from the cleavable ternary nucleic acid complex and binding each of the set of released recognition element fragments to a complementary coded oligonucleotide probe from a set of coded oligonucleotide probes, wherein each of the coded oligonucleotide probes includes a code from a set of codes, each code comprises at least one segment encoding one or more symbols that correspond to a sequence of one or more nucleotides, and circularizing the set of released fragments to produce a set of circular modified recognition elements including the target-associated codes; and (c) performing a detection event for each code of the set of circular modified recognition element fragments to determine the presence of the code, wherein the presence of the code indicates the presence of the nucleic acid target in the composition, and absence of the code indicates absence of the nucleic acid target in the composition.

In some instances, a method is provided of conducting an assay for nucleic acid targets, the method comprising: (a) combining, with a set of nucleic acid targets potentially present in a sample, a set of single coded oligonucleotide probes in an amplification reaction with a forward and a reverse primer and a DNA polymerase having 5' nuclease activity, in which: (i) each of the set of coded probes comprises a mismatch sequence comprising a code from a set of codes and a target-specific sequence having at least one base complementary to a target site of interest and each code forms in the presence of the target a hybridized target-specific region and a single-stranded region that includes the mismatch sequence, wherein each code comprises at least one segment encoding one or more symbols that correspond to a sequence of one or more nucleotides, and (ii) during the amplification, the DNA polymerase cleaves the target-specific region and releases the mismatch sequence if there is a match between the probe and the target site to yield a set of released mismatched sequences associated with the targets; (b) performing a ligation reaction to circularize the set of released mismatch sequences to yield a set of circular modified mismatch sequences comprising the target-associated codes; and (c) amplifying the set of circular modified mismatch sequences and detecting the targets by decoding the codes that are amplified.

In other instances, a method is provided of conducting an assay for nucleic acid targets, the method comprising: (a) combining, with a set of nucleic acid targets potentially present in a sample, a set of single oligonucleotide probes in an amplification reaction with a forward and a reverse primer and a DNA polymerase having 5' nuclease activity, in which: (i) each of the set of probes comprises a mismatch sequence and a target-specific sequence having at least one base complementary to a target site of interest and each probe forms in the presence of the target a hybridized target-specific region and a single-stranded region that includes the mismatch sequence, and (ii) during the amplification, the DNA polymerase cleaves at the target-specific region and releases the mismatch sequence if there is a match between the probe and the target site to yield a set of released mismatched sequences associated with the targets; (b) hybridizing the set of released mismatch sequences with a set of coded probes each coded probe comprising: (i) a code from a set of codes, each code comprising at least one segment encoding one or more symbols that correspond to a sequence of one or more nucleotides, and (ii) complementarity to the mismatch sequence, and performing a ligation reaction to circularize the coded probe sequences to yield a set of circular modified coded probe sequences comprising the target-associated codes; and (c) amplifying the set of circular modified coded probe sequences and detecting the targets by decoding the codes that are amplified.

In the methods of the invention, the targets may be detected by decoding the codes that are amplified (e.g., determining the presence of or the sequence of the codes).

In the methods of the invention, the set of coded probes may comprise at least 10, 100, 1000, or 10,000 coded probes and each of the coded probes in the set may include a soft decodable code.

In some instances of the methods of the invention, the amplification may include a rolling circle amplification reaction to generate a nanoball which is performed on a surface. Performance on the surface may not include a covalent attachment to the surface. For example, the surface may be a charged surface, a cation-coated surface, or a polylysine coated surface.

In some embodiments, each code includes at least one segment encoding one or more symbols that correspond to a sequence of one or more nucleotides.

In the methods of the invention, determining the presence of the codes or the sequence of the codes or decoding the codes may include recording signal produced in response to interrogation of each segment of the codes and, upon completion of the interrogation, determining a probably of the presence of each of the codes by applying a soft-decision probabilistic decoding algorithm to the recorded signal.

The signal produced in response to interrogation of each segment of the codes may include signal from one or a combination of nanopore sequencing, next-generation sequencing, massively parallel sequencing, Sanger sequencing, sequencing by synthesis (SBS), pyrosequencing, sequencing by hybridization, decoding by hybridization, single molecule real-time sequencing, SOLID, and sequencing by ligation.

In some instances, each segment of the codes of the invention may include one symbol corresponding to one nucleotide. Each of the codes may include up to 50 segments for a length of each code comprising up to 50 nucleotides. Interrogation of the up to 50 segments having one symbol corresponding to one nucleotide may be performed by sequencing by synthesis (SBS).

In other instances, each segment may include one symbol corresponding to more than one nucleotide.

In various embodiments, each code may include two or more segments. Each code may include three or more segments. Each code may include four or more segments. In some cases, each code includes five to sixteen segments.

In one example, interrogation of code segments that have one symbol corresponding to more than one nucleotide is performed by decoding by hybridization. In some instances, at least one of the segments is interrogated more than one time by hybridization with one or more hybridization probes each having at least one label to produce the signal. At least four different labels may be utilized in the decoding by hybridization. In one example, each code includes at least four segments and at least sixteen symbols. In the case that at least one of the segments is interrogated more than one time by hybridization with one or more hybridization probes each having at least one label to produce the signal, a unique number of possibilities at each of the segments includes up to a number of the different labels to the power of a number of the hybridizations per segment. The label may be an optical label. The label may be a fluorescent label. At least one probe may include two or more of the labels to create a pseudo label and generate a larger number of the symbols.

In the methods of the invention, the set of targets may include tens of target analytes, hundreds of target analytes, thousands of target analytes, or tens of thousands of target analytes.

The length of each code from the set of codes may range from 3 to 100 nucleotides or from 3 to 75 nucleotides.

In various instances, each code from the set of codes is a predetermined code. Each code from the set of codes may be selected to avoid interaction with other assay components. Each code from the set of codes may be selected to ensure that it differs from each other code from the set of codes. Each code from the set of codes may be homopolymer free. Each code from the set of codes may be generated from a 4-ary nucleotide alphabet of A, C, G and T and generated, for example, using a 4-state encoding trellis with 3 transitions per state. In another example, each code from the set of codes is generated from a 3-ary nucleotide alphabet of a set of three of A, C, G and T and generated, for example, using a 4-state encoding trellis with 3 transitions per state.

In one instance, each of the coded probes is unique for a specific target and includes a code that is unique to the set of codes.

In various embodiments of the methods of the invention, the codes in the set of coded probes may be the same length. In some instances, at least a subset of the set of coded probes has codes of the same length.

In some embodiments, the set of coded probes consists of tens, hundreds, thousands, or up to tens of thousands of the coded probes, and decoding the codes includes decoding the codes by a soft decoding method. In these embodiments, the codes may be trellis codes.

In some embodiments, the set of coded probes consists of tens, hundreds, thousands, or up to tens of thousands of the coded probes, wherein decoding the codes comprises decoding the codes by a soft decoding method, and wherein the codes are trellis codes and at least a subset of the trellis codes has the same length.

In the methods of the invention, the methods may include repeating the transformation event or the amplification reaction in which the set of recognition element fragments comprising the mismatch sequence is released to increase the number of mismatch sequences released.

In some embodiments, the surface is a charged surface.

In some embodiments, the charged surface is a cation-coated surface.

In some embodiments, the cation-coated surface is a polylysine coated surface.

In various embodiments, coded probes, sets of coded probes, and compositions including the sets of coded probes are provided. Specifically, in one instance, a set of coded probes is provided, each coded probe comprising a code from a set of codes, each code is a soft decodable code comprising at least one segment encoding one or more symbols that correspond to a sequence of one or more nucleotides. The set of coded probes may include or consist of padlock probes. The set of coded probes may include at least 10, 100, 1000, or 10000 probes. In one embodiment, a composition is provided that includes the set of coded probes. In another embodiment, a composition is provided that includes the set of coded probes in a buffer.

DETAILED DESCRIPTION OF THE INVENTION

Definitions

"A," "an" and "the" include their plural forms unless the context clearly dictates otherwise.

"About" means approximately, roughly, around, or in the region of. When "about" is used with a numerical range, it modifies that range by extending the boundaries above and below the numerical values indicated. "About" can modify a numerical value above and below the stated value by a variance of, e.g., 10 percent up or down (higher or lower).

"And" is used interchangeably with "or" unless expressly stated otherwise.

"Include," "including," and the like are to be construed in an inclusive sense as opposed to an exclusive or exhaustive sense; that is to say, in the sense of "including, but not limited to."

"Invention," "the invention" and the like are intended to refer to various embodiments or aspects of subject matter disclosed herein and are not intended to limit the invention to the specific embodiments or aspects of the invention referred to.

"Optimum," "optimal," "optimize" and the like are not intended to limit the invention to the absolute optimum state of the aspect or characteristic being optimized but will include improved but less than optimum states.

The terms "coded" and "encoded" are intended to have the same meaning and are herein used interchangeably.

"Sample" means a source of target or analyte. Examples of samples include biological samples, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Samples may be from any organism (e.g., prokaryotes, eukaryotes, plants, animals, humans) or other sample (e.g., environmental or forensic samples). A sample preparation process may be used to produce a sequencing-ready sample from a raw sample or partially processed sample. Note that one or more samples may be combined for sample preparation and/or sequencing and may be distinguished post-sequencing using sample-specific DNA barcodes linked to sample fragments.

"Subject" includes any mammal, including without limitation, humans.

"Set" includes sets of one or more elements or objects. A "subset" of a set includes any number elements or objects from the set, from one up to all of the elements of the set.

The "target" may be a nucleic acid analyte (e.g., mRNA, cfDNA etc.) or the "target" may be a proxy for the target analyte of interest (e.g., an antibody conjugated with oligonucleotide). Thus, in some instances, the term "target" and the term "target analyte" are used interchangeably. "Target" with respect to a nucleic acid includes wild-type and mutated nucleic acid sequences, including for example, point mutations (e.g., substitutions, insertions and deletions), chromosomal mutations (e.g., inversions, deletions, duplications), and copy number variations (e.g., gene amplifications). "Target" with respect to a nucleic acid may also include the presence or absence of one or more methyl groups on the nucleic acid target. "Target" with respect to a polypeptide includes wild-type and mutated polypeptides of any length, including proteins and peptides.

"Linked" with respect to two nucleic acids means not only a fusion of a first moiety to a second moiety at 3'-terminus or 5'-terminus, but also includes insertion of the first moiety to the second moiety into a common nucleic acid. Thus, for example, the nucleic acid A may be linked directly to nucleic acid B such that A is adjacent to B (-A-B-), but nucleic acid A may be linked indirectly to nucleic acid B, by intervening nucleotide or nucleotide sequence C between A and B (e.g., -A-C-B- or -B-C-A-). The term "linked" is intended to encompass these various possibilities.

"Decoding with respect to a code includes determining the presence of a known code or a probability of the presence of a known code with or without determining the sequence of the code. Decoding may be hard decision decoding. Decoding may be soft decision decoding.

"Identify," "determine" and the like with respect to codes, targets or analytes of the invention are intended to include any or all of: (A) an indication of the presence or absence of the relevant code, target or analyte, (B) an indication of the probability of the presence or absence of the relevant code, target or analyte, and/or (C) quantification of the relevant code, target or analyte.

"Hard decision decoding" or "hard decision" refers to a method or model that includes making a call for each nucleotide in a nucleic acid segment (commonly referred to as a "base call") in order to determine the sequence of nucleotides in the nucleic acid segment. Models of the invention incorporate hard decision decoding models. The particular nucleic acid being decoded may be or include a code of the invention.

"Soft decision decoding" or "soft decision" refers to a method or a model that uses data collected during a sequencing or decoding process to calculate a probability that a particular nucleic acid or nucleic acid segment is present. The probability may optionally be calculated without making a base call for each nucleotide in a nucleic acid segment. In another example, a probability is calculated without making a hard call that a string of nucleic acids in a segment are present. Instead of making a hard call for each nucleotide or nucleotide segment, a probabilistic decoding algorithm is applied to the recorded signal upon completion of signal collection. A probability of the presence of each of the codes is determined without discarding signal in contrast to hard decision decoding method in which hard calls are made during the signal collection process. In soft decision decoding, the data may, for example, include or be calculated from, intensity readings in spectral bands for signals produced by the sequencing/decoding chemistry. In one embodiment, soft decision decoding uses data collected during a sequencing/decoding process to calculate a probability that a particular nucleic acid segment from a known set of sequences is present. Models of the invention may be used for soft decision decoding. The particular nucleic acid or nucleic acid segment being decoded may be or include a code of the invention.

"Phasing" or "signal phasing" means misalignment of SBS cycles during an SBS process caused by the non-incorporation of a nucleotide during a cycle or by the incorporation of two or more nucleotides during an SBS cycle.

"Droop" or "signal droop" means signal decay that occurs during an SBS process, which may be caused by some complementary strands being synthesized as part of the SBS process being blocked, preventing further nucleotide incorporation.

"Crosstalk" refers to the situation in which a signal from one nucleotide addition reaction may be picked up by multiple channels (referred to as "color crosstalk") or the situation in which a signal from a nanoball or sequencing cluster interferes with an adjacent or nearby cluster or nanoball (referred to as "cluster crosstalk" or "nanoball crosstalk").

"Color channel" means a set of optical elements for sensing and recording an electromagnetic signal from a sequencing reaction. Examples of optical elements include lenses, filters, mirrors, and cameras.

"Spectral band" or "spectral region" means a continuous wavelength range in the electromagnetic spectrum.

Headings are included herein for reference and to aid in locating the various sections. These headings are not intended to limit the scope of the concepts described with respect to the headings.

The description and examples should not be construed as limiting the scope of the invention to the embodiments and examples described herein, but as encompassing all modifications and alternatives falling within the true scope and spirit of the invention Encoded Dual-Probe Endonuclease Assays The invention provides encoded assays for detection of target analytes in a sample. At a high level, in an encoded assay, a target analyte ("target") is detected based on association of the target with a code and detection of the code is a surrogate for detection of the analyte.

In various embodiments, an encoded assay may include a recognition event in which a target is uniquely recognized by a recognition element. The recognition event may be effected by submitting targets of a set of targets to a recognition event, in which each target is uniquely recognized by and bound to a recognition element associated with a code, thereby yielding a set of coded targets comprising the target and the recognition element.

In various embodiments, an encoded assay may include a transformation event, in which a high-fidelity molecular transformation of the recognition element associated with a code produces a modified recognition element. The transformation event may be effected by submitting each recognition element of the set of coded targets to a transformation event, in which a molecular transformation of each recognition element produces a modified recognition element, thereby yielding a set of modified recognition elements comprising the code.

In various embodiments, an encoded assay may include a decoding event, which identifies the code as a surrogate for detection of the analyte, e.g., by identifying the presence of the code (and optionally other elements). The decoding event may include an amplification step in which each code of the set of modified recognition elements is amplified, thereby yielding a set of amplified codes. Amplified codes of the set of amplified codes may have their sequences determined using a variety of techniques, including for example, microarray detection, or nucleic acid sequencing. In some cases, the detection step may be integrated with the amplification step, e.g., as in amplification with intercalating dyes.

In one embodiment, the method may include:
(i) submitting each target of a set of targets to a recognition event, in which each target is uniquely recognized by and bound to a recognition element associated with a code, thereby yielding a set of coded targets comprising the target and the recognition element;
(ii) submitting each recognition element of the set of coded targets to a transformation event, in which a molecular transformation of each recognition element produces a modified recognition element, thereby yielding a set of modified recognition elements comprising the code;
(iii) submitting each code of the set of modified recognition elements to an amplifying event, in which each code is amplified, thereby yielding a set of amplified codes;
(iv) submitting each amplified code of the set of amplified codes to a decoding event.

In one embodiment, the method may include:
(i) a recognition event in which the target is uniquely recognized by a recognition element, which associates a code (and optionally other elements) with the target via the recognition element;
(ii) a transformation event, in which a high-fidelity molecular transformation of the recognition element produces a modified recognition element that produces a readable code;
(iii) a decoding event, which identifies the presence of the code as a surrogate for detection of the analyte.

As described in more detail herein, the recognition event, transformation event, and the decoding event may occur sequentially, or combinations of the steps may occur simultaneously, e.g., as a single combined step. For example, the transformation event and the coding event may be simultaneous, such that the sequential process involves (i) recognition event, followed by (ii) transformation event/coding event, followed by (iii) decoding event.

To further illustrate the encoded assays:
(i) In the recognition event, the target may be detected by a targeted molecular binding event, such as binding of the target by a complementary sequence or a polypeptide binder.
(ii) In the transformation event, a ligation or a gap-fill ligation may produce the modified recognition element, i.e., a version of the recognition element that is ligated or gap-fill ligated.
(iii) In the coding event, a code reagent may be associated with the modified recognition element based on recognition of the modified recognition element. For example, the novel coded probes of the invention may be configured with a sequence that recognizes the modified recognition element and circularize only if the modified recognition element is present.
(iv) In the decoding event, the decoding may involve any means of determining the presence of or the sequence of the code (and optionally other elements).

The codes may be error corrected and thus easy to distinguish from each other, so they can be detected a low abundance and in the presence of high level of background and in the presence of many other codes.

Since many assays can be converted into codes, the invention provides for multi-omic assays where a sample is analyzed in multiple parallel workflows that are analyte-dependent and then converge codes that can be then detected simultaneously in a single platform. Parallel assay workflows may be merged into a single workflow, where multiple targets and target-types (e.g., nucleic acids and polypeptides) may be detected simultaneously in a single workflow and also read simultaneously within the same readout platform.

Following recognition and transformation, the codes may be detected and matched to targets for identification and/or quantification of targets present in the sample.

Code Design and Decode

The encoded assays of the invention make use of codewords or codes. The codes may be detected as surrogates in the place of direct analysis of target analytes. As an example, a target analyte may be a particular nucleic acid fragment (e.g., a nucleic acid fragment with a specific mutation); in the assays of the invention, a codeword may be associated with the nucleic acid fragment and the codeword may be read to identify the presence of the nucleic acid fragment in the sample.

For example, a code may be a predetermined sequence ranging from about 3 to about 100 nucleotides or about 3 to about 75 nucleotides. Codes may have sequences selected to avoid inadvertent interaction with other assay components, such as targets, probes, or primers. Code sequences may be selected to ensure that codes differ from each other to permit unique identifiability during the decoding process.

The invention includes a dataset or database of codes generated using the methods of the invention. The dataset or database may associate the codes with other assay elements, such as primers or probes linked to the probes. The invention also includes a method of making a probe set comprising synthesizing probes having the sequences set forth in the dataset or database.

Homopolymer-Free Encoding

In one embodiment, the codes are homopolymer-free codes. For standard genomic applications that use a full 4-ary nucleotide alphabet of {ACGT}, the method uses a 4-state encoding trellis with 3 transitions per state.

As illustrated in FIG. 1, the current state is the last mapped nucleotide, and the next state is the next (to-be) mapped nucleotide. By forbidding a transition from the current state (say, the 'A' state) in the present trellis section (of 4 states), to the analogous same state (of 'A') in the next trellis section (of 4 states), a repeated mapping to the same nucleotide base—in any generated sequence—is avoided. An 'A' state can only transition to a 'C', 'G', or 'T' state in the next trellis section. Since this involves 3 transitions per state, the mapping trellis is mated to an underlying 3-ary (i.e., ternary-) alphabet error correction code that drives transitions through trellis sections. The underlying (ternary) error correction code is the mechanism that guarantees all generated codewords differ in multiple sequence positions.

A similar method may apply to 3-ary alphabets (where only 3 of the four nucleotide bases, say {CGT} are used), and 5-ary or higher alphabets, where the underlying correction code uses an alphabet of order one less than the mapping alphabet.

In one embodiment, codes for the set of codes are selected using a 4-ary alphabet, avoid homopolymers, and every code in the set is different from every other code in the set. The codes may be generated using the trellis method.

In one embodiment, codes for the set of codes are selected using a 3-ary alphabet, avoid homopolymers, and every code in the set is different from every other code in the set. The codes may be generated using the trellis method.

(i) In another embodiment, a homopolymer-free code composed from a 4-ary nucleotide alphabet of {ACGT} may be generated as follows:
(ii) From GF(4) (i.e., the quaternary algebraic alphabet), select an error correction code that will deliver many more codewords than necessary (because some of the generated codewords will later be eliminated);
(iii) Generate all of the codewords for the code;
(iv) Assess the number of repeated symbol locations in each codeword;
(v) Re-order the list of codewords, sorting by the number of base-repeat instances in each codeword.
(vi) From the re-ordered sort, keep only the top K codewords, where K is the desired library size of codewords (this will eliminate the codes with the highest number of polymer-repeats; each repeat will require subsequent fixing that weakens the overall code.)
(vii) For each codeword in the list of survivors, 'smart fix' the repeat positions in each codeword with the following procedure:
  a. Start from the beginning base position in a codeword, and find the first repeat instance of a base;
  b. Go to the second base in the first repeat instance, its base assignment will require change;
  c. If the second base is not at the end of a codeword, look ahead one base position in the codeword, and assess the assignment there;
  d. For the second base (in the repeat), choose a new base assignment that is also different from the base assigned one sample ahead; n that, in addition to removing a length-2 run, this step will also fix a length-3 run;
  e. Process the revised codeword at each remaining repeat location, fixing the second base in each repeat using the process outlined in steps c-d.

This method will eliminate all repeats. The same method can be applied to generate homopolymer codes for 3-ary alphabets (e.g., {C, G, T}), and larger 5-ary+ alphabets (such as oligopolymers).

Codes optimized for pyrosequencing and similar cyclic serial dispensation schemes The invention provides a locus code-encoding approach for pyrosequencing or similar serial (rather than pooled) primer dispensation methods. The method generates homopolymer-free codes.

When the locus code is encapsulated between header and tail bases, all generated codewords finish decoding at the same time. The technique avoids unexpected spurious incorporations that change how long in time that a codeword needs to finish its decoding. This is important because then a sequencer only need sample for a prescribed number of samples to obtain complete data for decoding the samples, regardless of the underlying codeword. This also keeps all codewords candidates aligned, so that the theoretical design distances between codewords are maintained.

The previously mentioned synchrony ensures that soft decision block decoding techniques (c.f., disclosures 9 and 10) can be applied during the decoding of its blocks of samples. This soft decision decoding guarantees that SNR requirements are improved by at least 2 dB—and sometimes by many factors-more when the signal strength significantly fades during the reception of codeword samples.

In pyrosequencing, nucleotides are dispensed sequentially (and non-overlappingly) in a cycle, such as G, C, T, A, G, C, T, A, G, C, . . . etc. This encoding is quite original because it doesn't directly encode bases; instead, it encodes base POSITIONs within G, C, T, A cycles. Each cycle element can be either populated, or unpopulated—and multiple elements within a cycle can be populated. For this to be implemented, the underlying code must be derived from a binary alphabet, with 1s and 0s. To emphasize, with these codes, more than one base can be incorporated within a single G, C, T, A dispensation cycle. This also implies that sequencing, though serial in nature, can be fast. And with the underlying {0,1} alphabet that underpins and drives the encoding of the populated/unpopulated cycle positions, all codewords are guaranteed to be of the same length—and to finish decoding in the same amount of time.

To provide coding gain, the sequence of 0s and 1s that compose each codeword are derived from constructions of optimal binary error correction codes. Such codes possess many redundant parity bits, and these parity bits are designed such that each codeword varies from each other in multiple positions. This quality results in strong error correction capabilities.

Figure 2:
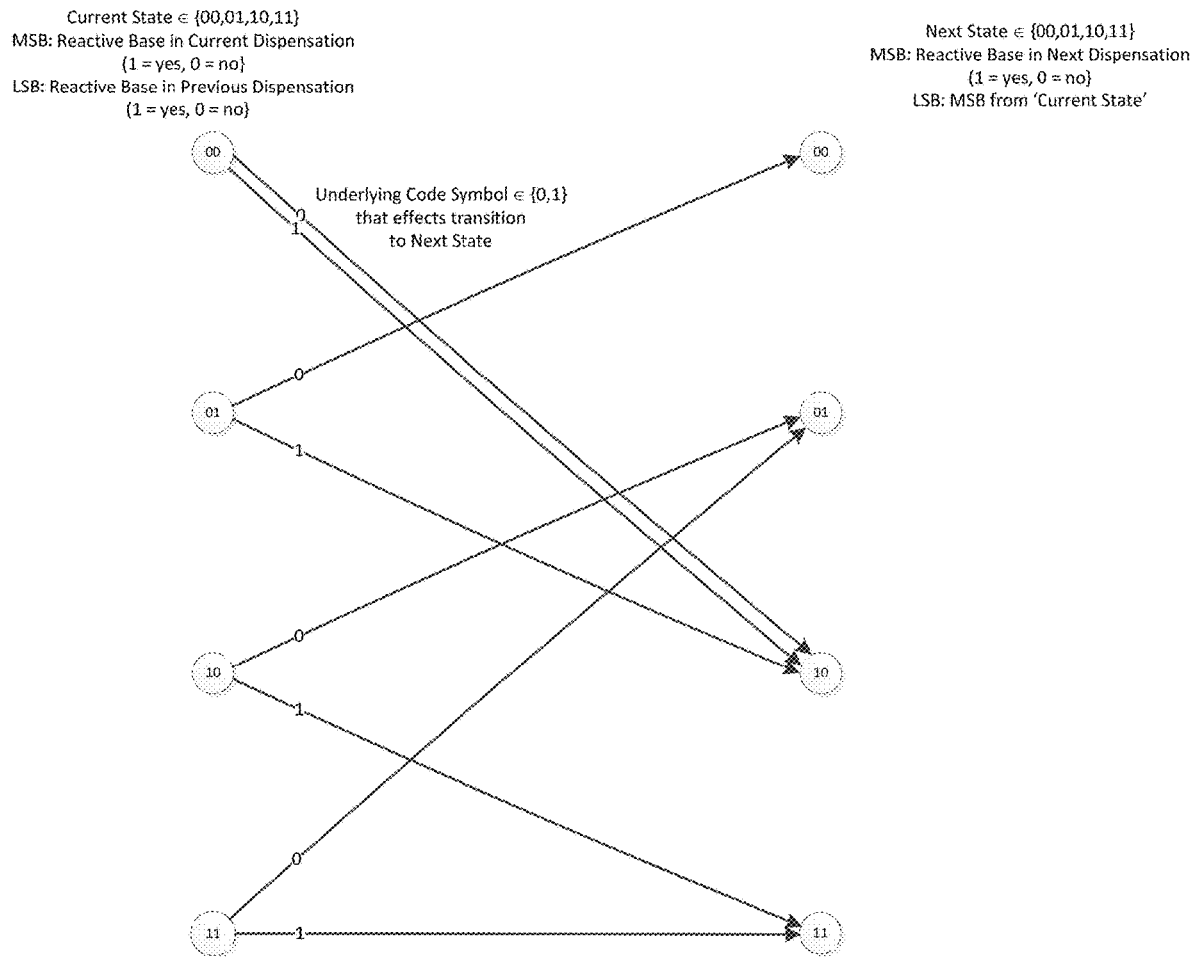
FIG. 2 is a diagram illustrating an encoding trellis for a 4-bases-per-cycle pyrosequencing.

FIG. 2 illustrates an encoding trellis for a 4-bases-per-cycle pyrosequencing. The techniques may be used for encoding 3-cycle, 3-base-alphabet, and 5+-cycle, 5-and-higher-alphabet oligo-polymer hybrid schemes.

Note the use of 4 states in the trellis. Each state represents previous mappings of that last two positions:
  (i) both unpopulated, (00);
  (ii) both populated, (11);
  (iii) newest-populated and older-unpopulated, (10);
  (iv) newest-unpopulated and the older populated, (01).

Transitions to next states indicate an update which either does not populate or does populate the next position in a sequence.

Four (4) states are used to correctly implement a pyrosequencing scheme that is homopolymer-free; one position is populated every 3 positions. Note that if 3 consecutive positions were allowed to be unfilled, then the 4th position would need to be filled (because an unzipped hybrid will have an opening to at least one of the four nucleotides). That 4th position being filled would result in generation of a homopolymer (repeat) of bases in a sequence—since the last filled base was the same base in the cycle before.

This aforementioned restriction explains the double transition from the 00 state to the 10 state in the trellis diagram. A current state of 00 transitioning to a next state of 00 would imply 3 positions in a row were unfilled.

Optimal error correction codes are constructed in maximize distance between their sets of codewords. They are not constrained to disallow runs of three consecutive zeros. That would reduce the degrees of freedom they use to maximize distance. By contrast, the mappings to pyro-sequenced positions comply with homopolymer-free and pyrosequencing constraints.

All other transitions in the picture design trellis are natural results of populating a position with a '0' or a '1' and updating the next state to reflect that transition. Since 7 of the 8 transitions in the trellis perfectly express the underlying error correction code's structure, such a code can be quite effective and powerful.

Weakening transitions occur when the underlying code has 3 consecutive zeros. One way to reduce those appearances is to use the sorting methodology described above. This method modestly reduces the library of codes. This method also ensures that the pyro-mapped codewords that best reflect the underlying binary code's structure are faithfully reproduced, while those least reflective are not.

Another method to improve the weakening due to transitions involves breaking up strings of zeros by interleaving the code. Within a code, the (systematic) information section of bits—which precede the redundant section of parity bits—are the bits where the most consecutive zeros are usually seen. One way to eliminate those strings of zeros is to interleave the entire code design, so that the parity and information bits are intermingled. All codewords may be intermingled by the same interleaving pattern. The interleaving technique does not help for the all-zeros codeword, which is generated by almost all linear codes. The all-zeros codeword can be excluded from the codeword set.

Figure 3:
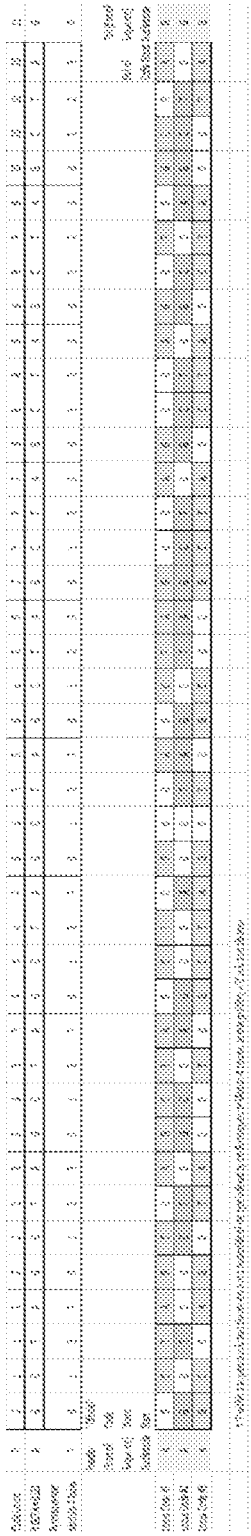
FIG. 3 is a diagram illustrating a pyro-code example, followed by a snapshot from a spreadsheet with relevant parameters.

FIG. 3 shows a pyro-code example, followed by a snapshot from a spreadsheet with relevant parameters. The code is a 10-cycle, 40 position code that maps {GCTA} in cycles. It possesses a huge minimum distance between codewords and is an example code accommodating three codewords. Note that the number of bases assigned to each codeword is not the same, although, clearly, from the illustration, all codewords are of the same time duration, and would finish decoding at the same time. Also observe the usage of populated 'header' and 'tail' positions. These are used to encapsulate the codeword and ensure that it is homopolymer free throughout. These terminating positions may be butted-up against the ends of the codewords for effective encapsulation.

Amplifying and Reading Codes

In an encoded assay, a target is detected based on association of the target with a code, and detection of the code is used as a surrogate for detection of the analyte. A variety of techniques may be used to amplify and read the codes. Examples include nanoballs, oligo clusters, oligo amplicons, bead-attached oligos, patterned oligos, and microarrays.

In one embodiment, codes of the invention are amplified using rolling circle amplification (RCA) to produce nanoballs that include many duplicates of the code. An RCA reaction may include one or more rounds of amplification to produce the nanoball product. A nanoball may be from about 10,000 to about 1,000,000 nucleotides in length. A nanoball may include from about 100 to about 10,000 copies of the amplified code.

In one embodiment, the codes of the invention are amplified using an exponential PCR amplification reaction to generate double stranded DNA amplicon products.

In one embodiment, codes of the invention are amplified using bridge amplification to produce clusters of oligos on a surface.

In one embodiment, codes of the invention are amplified on bead surfaces to produce bead-attached oligos.

In one embodiment, the amplified codes are read in a sequencing reaction. Any sequencing technology may be used to sequence. Examples of sequencing technologies that may be used include sequencing by synthesis (e.g., pyrosequencing; sequencing by reversible terminator chemistry (Illumina)), avidity sequencing (Element Biosciences), sequencing by hybridization, sequencing by ligation, and nanopore sequencing.

In one embodiment, the amplified codes are read using oligonucleotide probes in a hybridization-based reaction.

In one embodiment, codes of the invention are detected using a patterned array, such as a microarray comprising oligos which are complementary to the codes.

In one embodiment, codes of the invention are detected in situ, i.e., in a cell or tissue.

In one embodiment, in situ detection comprises reading the code in a sequencing reaction.

In one embodiment, codes of the invention are detected using an electronic/electrical sensing mechanism.

A variety of techniques and models may be used to identify a nucleic acid code of the invention. In one embodiment, the invention provides models that make use of hard decision decoding methods or models. In another embodiment, the invention provides models that make use of soft decision decoding methods or models.

When using soft decision decoding techniques, it is not necessary for the model to identify each base specifically. For example, signals generated during each nucleotide addition cycle of a sequencing process may be detected and recorded to produce a data set that may be used as input into a model of the invention to calculate a probability that a specific code is present without requiring a hard decoding model. Although it is not necessary in a soft decision decoding model to make a hard decision about the identity of each nucleotide, a model developed according to the methods of the invention may nevertheless include a model for assigning a probability or identity to each nucleotide in the sequence of a code.

Data gathered during a sequencing process may, for example, include intensity readings for signals produced by the sequencing chemistry in various spectral bands. For example, in some cases the data is collected across a set of spectral bands that corresponds to part or all of the spectral bands expected to be produced by a series of nucleotide extension steps during a sequencing process.

In some embodiments, it is not necessary to filter light from each nucleotide extension step in order to distinguish between the nucleotides. Instead, a set of intensity readings may be detected, stored and used as input into a model of the invention for determining a probability that a particular code is present. In other embodiments, one or more filters may be used to refine signals from a sequencing process.

A model may be developed or trained using sequencing data from known codes, such as signal intensity data across a predetermined spectrum, during a sequencing process. The model may be used to calculate a set of probabilities across a set of one or more codes, indicating, for example, for each code, a probability that it is present in a sample.

In some cases, the model is developed or trained using data corresponding to color intensity signals across multiple color channels. In some cases, the model is developed or trained using data corresponding to color intensity signals across four color channels, each generally corresponding to the signal produced by addition of one of the four nucleotides A, T, C or G during a sequencing process. As discussed elsewhere in this specification, the channels may experience color crosstalk.

A model may be built using data obtained using multiple light sensing channels. Each channel may be specific for a specific frequency bandwidth. In some cases, the model may be built using four channels, wherein the bandwidth of each channel may be selected for signals produced by addition of one of the four nucleotides A, T, C or G. In other cases, more or less than four channels may be used to collect data used to produce the model.

Figure 4:
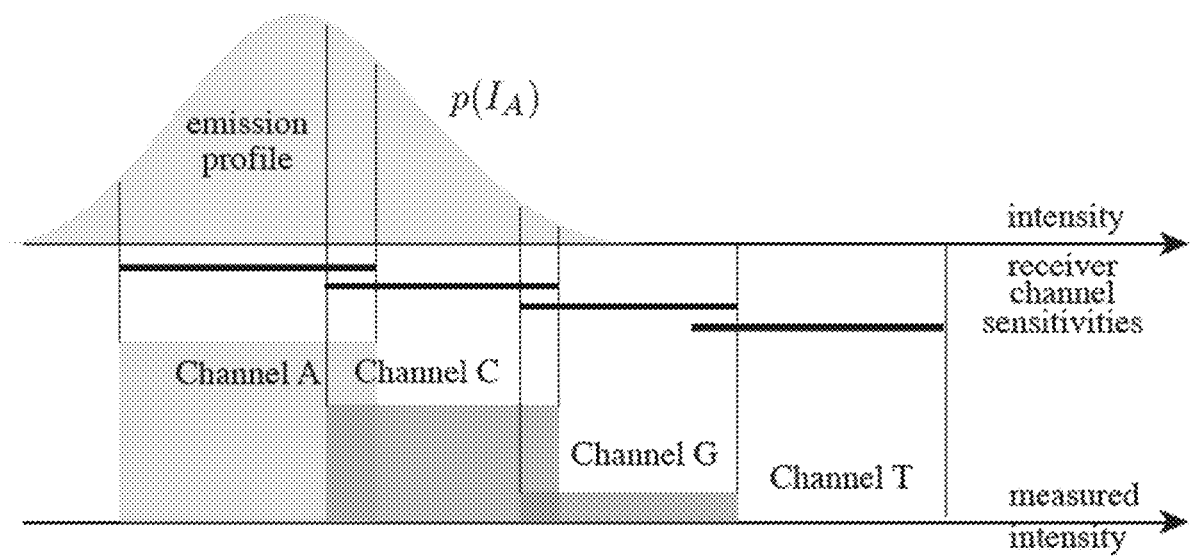
FIG. 4 shows a hypothetical emission spectrum, which is detected at varying intensities by Channel A, Channel C and Channel G, and not detected by Channel T.

In certain embodiments of the invention, each channel detects a bandwidth region of a fluorescence signal produced by addition of one of the four nucleotides. Nevertheless, the bandwidth of the signal produced by addition of one of the four nucleotides may be spread across a spectral band that overlaps with other channels. This effect is illustrated in FIG. 4. FIG. 4 shows a hypothetical emission spectrum, which is detected at varying intensities by Channel A, Channel C and Channel G, and not detected by Channel T.

As will be discussed in the examples below, a color crosstalk model may be empirically developed and used as input into the model of the invention for producing a probability that a code is present. Relative coefficient strength may be experimentally determined across color channels for signal produced by addition of each nucleotide (A, T, C, G) from empirically produced test data.

Other factors that may be included in a statistical model according to the invention for calculating a probability that a code is present include signal phasing, signal droop, color cross-talk values, fluctuations in in color cross-talk values, noise, amplitude noise, gaussian amplitude models, and base calling algorithms.

The model of the invention may also account for various sources of noise and error, such as variability in the concentration of the active molecules in the assay, variability in color channel response due primarily to limited ability to estimate the color channel responses individually for each cluster, and background and random error noise sources. A concentration noise model may be used to model the variable density of active molecules for a given cluster. A transduction noise model may be included to model variability in the color crosstalk matrix.

Accurately modeling the biochemical opto-mechanical processes in DNA sequencing is a complex process. Furthermore, to derive the inputs for a soft decision probabilistic signal estimator requires estimating the parameters driving the model, as well as having strong confidence that the model is accurate. Under these two assumptions, metrics can be computed that work directly with the received signals. In the commercially available base call algorithms, channel distortion effects are compensated for before the decision process; however, in soft decision decoding of the invention it is not necessary to compensate for distortions before decoding. Embodiments which do not compensate for distortions before decoding will have the advantage of avoiding information loss compensations, such as inversions.

The probability that a particular code is present may be indicative of the probability that a particular target associated with the probe is present. Data indicating the probability that a particular target is present may be used, for example, to calculate probabilities relevant to diagnosis or screening of various medical conditions, or selection of drugs for treatment of various medical conditions.

The disclosure provides encoded probes that can be decoding using soft decision decoding methods or models. The codes may be generated using the trellis method and the codes may be referred to as "trellis codes". A probe of the invention may be a dual probe that includes a soft decodable code, such as a trellis code. A probe of the invention may be a single probe that include a soft decodable code, such as a trellis code.

The disclosure provides assays that make use of encoded probes that may be decoded using soft decision decoding ("soft decoding"). In various embodiments, the assays make use of mixtures of probes, each with a soft decodable code. A mixture may include 100s, 1000s, or 10000s of encoded probes.

In some instances of the methods of the invention, determining the presence of or the sequence of the code is performed without making a specific base call for each nucleotide in the code.

In some embodiments, a hybridization-based detection method may be used to determine the code. In one embodiment, the amplified codes are determined using oligonucleotide probes in a hybridization-based reaction. The amplified codes may be determined using sequencing by hybridization. In one example, the hybridization-based detection method uses fluorescently labeled oligonucleotide probes. The code data may then be used as a digital count of the target-specific decoding events.

Assays

The encoded assays make use of recognition elements and encoded probe sequences ("encoded probes") for detecting a panel of target nucleic acids.

An encoded assay may be performed in a plate-based format, such as a multi-well plate. The multi-well plate may include, for example, an array of nanowells.

An encoded assay may be performed on a microfluidics device.

An encoded assay may be a solution-based assay.

An encoded assay may be a surface-bound assay.

An encoded assay may be a hybrid assay that includes a surface-bound component and a solution-based component.

Dual Probe Recognition Elements

An encoded probe may be a dual probe that includes a recognition element associated with a code. The code may be a soft decodable code, such as a trellis code.

Thus, for example, the disclosure provides a dual probe in which one probe comprises a mismatch sequence and a soft decodable code is provided in the mismatch sequence. Similarly, the disclosure provides a dual probe in which one probe comprises a mismatch sequence and a trellis code is provided in the mismatch sequence. The disclosure provides a set of 10 or more dual probes in each of which (A) one probe comprises a mismatch sequence and (B) a soft decodable code is provided in the mismatch sequence. The disclosure provides a set of 100 or more dual probes in each of which (A) one probe comprises a mismatch sequence and (B) a soft decodable code is provided in the mismatch sequence. The disclosure provides a set of 1000 or more dual probes in each of which (A) one probe comprises a mismatch sequence and (B) a soft decodable code is provided in the mismatch sequence. The disclosure provides a set of 10,000 or more dual probes in each of which (A) one probe comprises a mismatch sequence and (B) a soft decodable code is provided in the mismatch sequence. In certain embodiments, the foregoing sets are provided in the absence of any dual probes that do not include the soft decodable codes. In certain embodiments, the foregoing sets are provided with codes that are homopolymer-free and soft decodable.

The disclosure provides a set of 10 or more dual probes in each of which (A) one probe comprises a mismatch sequence and (B) a trellis code is provided in the mismatch sequence. The disclosure provides a set of 100 or more dual probes in each of which (A) one probe comprises a mismatch sequence and (B) a trellis code is provided in the mismatch sequence. The disclosure provides a set of 1000 or more dual probes in each of which (A) one probe comprises a mismatch sequence and (B) a trellis code is provided in the mismatch sequence. The disclosure provides a set of 10,000 or more dual probes in each of which (A) one probe comprises a mismatch sequence and (B) a trellis code is provided in the mismatch sequence. In certain embodiments, the foregoing sets are provided in the absence of any dual probes that do not include the trellis codes. In certain embodiments, the foregoing sets are provided with codes that are homopolymer-free trellis codes.

In various embodiments, the assays make use of sets of probe pairs (i.e., dual probes) as recognition elements ("dual probe recognition element" or "recognition element") and an endonuclease cleavage reaction for detecting a set of target nucleic acids. The endonuclease cleavage reaction may be a structure-specific endonuclease cleavage reaction. In one example, the structure-specific endonuclease may be a flap endonuclease. The flap endonuclease may catalyze hydrolytic cleavage of the phosphodiester bond at the junction of single- and double-stranded DNA complex (i.e., a ternary nucleic acid complex).

A dual probe may include a first probe (e.g., an upstream probe) and a second probe (e.g., a downstream probe) that overlap at a target site (nucleotide) of interest. For example, the first probe may be complementary to a sequence upstream of the target site and end with a non-complementary base at the nucleotide of interest. The second probe may be complementary to a sequence downstream of the target site and extend 5' of the target site overlapping the upstream probe. The second probe includes a base that is the complement of the nucleotide at the target site. The second probe may include a non-complementary "mismatch" sequence (i.e., the mismatch sequence does not hybridize to the target sequence). The two probes may recognize and hybridize to a single-stranded target to form a ternary nucleic acid complex. A structure-specific endonuclease i.e., a flap endonuclease or cleavase (e.g., FEN1), may then be used to cleave the ternary nucleic acid complex and release a recognition element fragment from the second probe if there is a match between the second probe and the target site. The released recognition element fragment includes the mismatch sequence and the base that is the complement of the target site of interest. The recognition element fragment is a target-specific sequence. In the presence of a mismatch at the target site, no cleavage occurs.

The melting temperatures for the first and second probes in a dual probe recognition element may be selected to provide for multiple rounds of target recognition and recognition element fragment release in a recognition event. For example, the melting temperatures for the first and second probes in a target-specific probe pair may be selected such that the second probe may be released from a target at a certain temperature, while the first probe remains bound. For example, for each target specific probe pair, the second probe has a lower melting temperature than the first probe. This difference in melting temperatures may be used to increase (i.e., amplify) the number of recognition element fragments released from the recognition element in the recognition event.

In some embodiments, the mismatch sequence in the second probe may include a code associated with the target of interest. In this case, the second probe is an encoded probe.

The mismatch sequence in an encoded probe may include other functional sequences such as adapter sequences or common regions that are common to all encoded probes in a set of encoded probes. An adapter sequence and/or common region may include, for example, universal hybridization sequences (e.g., splint hybridization sequences), sequencing primer sequences, one or more amplification primer sequences, unique identifier sequences (UMIs), flow cell adapter sequences for generating clusters and sequencing, and sample indexes.

In some embodiments, sequencing primer sequences, one or more amplification primer sequences, unique identifier sequences (UMIs) and sample indexes may be provided on a separate "splint" oligonucleotide, wherein the sequences are incorporated into a detection product by gap-fill extension and ligation reactions.

In one embodiment, an encoded assay may include: (i) a recognition event, in which a target is uniquely recognized and bound by a recognition element (i.e., an encoded dual probe) to form a ternary nucleic acid complex that may be cleaved to release a fragment from the recognition element (i.e., a recognition element fragment), wherein the released fragment associates a code with the target; (ii) a transformation event, in which a molecular transformation of the released recognition element fragment produces a modified recognition element (e.g., a circular modified recognition element) comprising the code that may be used to provide a measure of the presence or absence of the target; and (iii) a decoding event, that uses the code as a surrogate for detection of the target, e.g., by identifying the presence of the code (and optionally other elements).

The transformation event may include a ligation reaction or a gap-fill extension/ligation reaction to produce the modified recognition element fragment comprising the code.

In some embodiments, a third oligonucleotide probe that includes sequences complementary to a released recognition element fragment may be used to associate a code with the target of interest. In this case, the dual probe recognition element does not include a code and the third oligonucleotide probe is the encoded probe.

In one embodiment, the third oligonucleotide probe may be a linear probe that includes a target-specific code and sequences for recognizing and hybridizing to a recognition element fragment (i.e., a mismatch sequence).

In one embodiment, the third oligonucleotide probe may be a circular probe that includes a target-specific code and sequences for recognizing and hybridizing to a recognition element fragment (i.e., a mismatch sequence).

The third oligonucleotide probe or "coded oligonucleotide probe" may include other functional sequences such as one or more amplification primer sites (e.g., an RCA primer site), index sequences, unique molecular identifier (UMIs), and other primer sites (e.g., for reading out index sequences or UMIs).

In one embodiment, an encoded assay may include: (i) a recognition event, in which a target is uniquely recognized and bound by a recognition element (i.e., dual probe) to form a ternary nucleic acid complex that may be cleaved to release a fragment from the recognition element (i.e., a recognition element fragment), wherein the released fragment is associated with the target; (ii) a transformation event, in which a third oligonucleotide probe comprising a code is used to associate a code with the recognition element fragment to produce a modified recognition element (e.g., a circular modified recognition element) comprising a hybrid complex that includes the recognition element fragment and the oligonucleotide probe that may be used to provide a measure of the presence or absence of the target; and (iii) a decoding event, that uses the code as a surrogate for detection of the target, e.g., by identifying the presence of the code (and optionally other elements).

In some embodiments, the transformation event may include a ligation reaction to produce the modified recognition element comprising the code. In the transformation event, unreacted recognition elements (i.e., un-cleaved, full-length probes that include the mismatch sequence) may template ligation of the coded third oligonucleotide probes. In this case, unreacted full-length probes may be separated from the released recognition element fragments using a clean-up strategy.

In some embodiments, the recognition element that includes the mismatch sequence (i.e., the second probe (downstream probe)) may be a biotinylated probe. After cleavage of the probe, a streptavidin pull-down process may be used to remove the unreacted, full-length probes prior to the transformation event. For example, biotinylated recognition element fragments and full-length probes will both include 3'-biotin. However, released recognition element fragments will terminate in a 3'-OH which will not be pulled down by streptavidin.

In one embodiment, the biotinylated second probe (downstream probe) may be immobilized on a bead prior to the recognition event.

In one embodiment, a panel of biotinylated reverse complements to the recognition element may be used in a streptavidin bead pull-down process to separate the unreacted full-length probes from the released recognition element fragments. In one embodiment, unreacted probes may be isolated and removed using any bead or surface modified with the reverse complement to the probes.

In one embodiment, 5' PS probes and exonuclease digestion of cleavase (flap endonuclease) products may be used to separate the unreacted full-length probes from the released recognition element fragments.

In various embodiments, a decoding event may include an amplification step in which the code sequence (among other elements) is amplified. Amplification may be by any method of amplification, including for example, on-surface PCR, isothermal amplification, rolling circle amplification, and/or ultrarapid amplification. Surface based amplification may be performed using PCR with surface-anchored primers (e.g., Illumina bridge amplification technology) or recombinase polymerase amplification (RPA) (e.g., ExAmp technology).

In one embodiment, the amplification step comprises a rolling circle amplification reaction (RCA) to generate a nanoball product. For example, a circular modified recognition element may be amplified in an RCA reaction to generate a nanoball product.

In one embodiment, the amplification step comprises a polymerase chain reaction (PCR) process to generate linear amplicons for detection.

In the decoding event, identifying the code may involve any means of determining the presence of the code associated with the target.

In some embodiments, the amplified code may be sequenced to identify the presence of the code or assign a probability that the code associated with the target is present. Any sequencing technology may be used to sequence. Examples of sequencing technologies that may be used include sequencing by synthesis (e.g., pyrosequencing; sequencing by reversible terminator chemistry (Illumina)), avidity sequencing (Element Biosciences), sequencing by hybridization, sequencing by ligation, and nanopore sequencing.

In some embodiments, a sequencing library may be generated from a set of modified recognition elements comprising the codes. The library may be sequenced to determine the code associated with a target of interest. The code data may then be used as a digital count of the target-specific decoding events.

In one embodiment, a sequencing library comprising the code (among other elements) may be generated from a circularized probe.

In one embodiment, a sequence library comprising the code (among other elements) may be generated from a nanoball product.

In one embodiment, a nanoball or a portion of the nanoball that includes the code (and optionally other elements) may be directly sequenced to determine the code associated with the target of interest. The code data may then be used as a digital count of the target-specific detection.

In some embodiments, a hybridization-based detection method may be used to determine the code. In one embodiment, the amplified codes are determined using oligonucleotide probes in a hybridization-based reaction such as, for example, sequencing by hybridization. In one example, the hybridization-based detection method uses fluorescently labeled oligonucleotide probes. The code data may then be used as a digital count of the target-specific detection.

Single Probe Recognition Elements

An encoded probe may be a single probe that includes a recognition element associated with a code. The code may be a soft decodable code, such as a trellis code.

Thus, for example, the disclosure provides a single probe comprising a mismatch sequence and a soft decodable code is provided in the mismatch sequence. Similarly, the disclosure provides a single probe comprising a mismatch sequence and a trellis code is provided in the mismatch sequence. The disclosure provides a set of 10 or more single probes in each of which (A) the probe comprises a mismatch sequence and (B) a soft decodable code is provided in the mismatch sequence. The disclosure provides a set of 100 or more single probes in each of which (A) the probe comprises a mismatch sequence and (B) a soft decodable code is provided in the mismatch sequence. The disclosure provides a set of 1000 or more single probes in each of which (A) the probe comprises a mismatch sequence and (B) a soft decodable code is provided in the mismatch sequence. The disclosure provides a set of 10,000 or more single probes in each of which (A) the probe comprises a mismatch sequence and (B) a soft decodable code is provided in the mismatch sequence. In certain embodiments, the foregoing sets are provided in the absence of any single probes that do not include the soft decodable codes. In certain embodiments, the foregoing sets are provided with codes that are homopolymer-free and soft decodable.

The disclosure provides a set of 10 or more single probes in each of which (A) the probe comprises a mismatch sequence and (B) a trellis code is provided in the mismatch sequence. The disclosure provides a set of 100 or more single probes in each of which (A) the probe comprises a mismatch sequence and (B) a trellis code is provided in the mismatch sequence. The disclosure provides a set of 1000 or more single probes in each of which (A) the probe comprises a mismatch sequence and (B) a trellis code is provided in the mismatch sequence. The disclosure provides a set of 10,000 or more single probes in each of which (A) the probe comprises a mismatch sequence and (B) a trellis code is provided in the mismatch sequence. In certain embodiments, the foregoing sets are provided in the absence of any single probes that do not include the trellis codes. In certain embodiments, the foregoing sets are provided with codes that are homopolymer-free trellis codes.

In various embodiments, the assays make use of sets of single probes as recognition elements and a PCR amplification/5' nuclease cleavage reaction for detecting a set of target nucleic acids. The PCR amplification/5' nuclease cleavage reaction makes use of a DNA polymerase that includes a structure-specific 5' nuclease (5' endonuclease) activity to simultaneously amplify a target nucleic acid and release a recognition element fragment that is associated with a target site of interest. In one example, the DNA polymerase may be Taq DNA polymerase.

A single probe recognition element ("single probe") may include a sequence that is complementary to a target nucleic acid and a base that is the complement of a target site of interest. The single probe may include a 5' non-complementary mismatch sequence (i.e., the mismatch sequence does not hybridize to the target sequence). The single probe may recognize and bind (hybridize) to a single-stranded target to form a single-stranded/double-stranded forked structure (ss-ds forked structure) that includes a 5'-single stranded region comprising the non-complementary mismatch sequence and a double-stranded (i.e., hybridized) region comprising the probe and target sequence.

A DNA polymerase having 5' nuclease activity (e.g., Taq DNA polymerase) may then be used to amplify the target sequence and cleave the ss-ds forked structure and release a recognition element fragment from the single probe if there is a match between the probe and the target site. The released recognition element fragment may include the mismatch sequence and the base that is the complement of the target site of interest. The site of cleavage may also be 5' or 3' of the matched base. In the presence of a mismatch, the probe is not recognized by the DNA polymerase and no cleavage occurs.

In some embodiments, the mismatch sequence in the single probe may include a code associated with the target of interest. In this case, the single probe is an encoded probe.

In certain embodiments, the encoded single probe may include other functional sequences such as adapter sequences or common regions that are common to all encoded probes in a set of encoded probes as described above for encoded dual probes.

In certain embodiments, sequencing primer sequences, one or more amplification primer sequences, unique identifier sequences (UMIs) and sample indexes may be provided on a separate "splint" oligonucleotide as described above for encoded dual probes.

In one embodiment, an encoded assay may include: (i) a recognition event, in which a target is uniquely recognized and bound by a single probe recognition element to form a ss-ds forked structure that may be cleaved in an amplification reaction to release a fragment from the recognition element (i.e., a recognition element fragment), wherein the released fragment associates a code with the target; (ii) a transformation event, in which a molecular transformation of the released recognition element fragment produces a modified recognition element (e.g., a circular modified recognition element) comprising the code that may be used to provide a measure of the presence or absence of the target; and (iii) a decoding event, that uses the code as a surrogate for detection of the target.

In some embodiments, the single probe does not include a code and a second oligonucleotide probe (e.g., a linear probe or a circular probe) comprising a code may be used to associate a code with the target as described above for encoded dual probes.

The coded oligonucleotide probe may include other functional sequences such as one or more amplification primer sites (e.g., an RCA primer site), index sequences, unique molecular identifier (UMIs), and other primer sites (e.g., for reading out index sequences or UMIs).

In one embodiment, an encoded assay may include: (i) a recognition event, in which a target is uniquely recognized and bound by a recognition element (i.e., single probe) to form a ss-ds forked structure that may be cleaved in an amplification reaction to release a fragment from the recognition element (i.e., a recognition element fragment), wherein the released fragment is associated with the target; (ii) a transformation event, in which an oligonucleotide probe comprising a code is used to associate a code with the recognition element fragment to produce a modified recognition element (e.g., a circular modified recognition element) comprising a hybrid complex that includes the recognition element fragment and the oligonucleotide probe that may be used to provide a measure of the presence or absence of the target; and (iii) a decoding event, that uses the code as a surrogate for detection of the target.

In a single probe encoded assay, the transformation event and decoding event may be as described above for encoded assays that use a dual probe recognition element.

Index Sequences

Index sequences, such as sample barcodes, allow differentiation among different samples, experiments, etc. during the decoding event. Indexes may be added to a probe using a variety of strategies.

Indexes may be added during the synthesis of a probe. In this case, for every probe manufactured, the number of probes is N×P, where N is the number of indices and P is the plexity of the probe pool.

Indexes may be added after probe synthesis as part of manufacturing or at a site of use as a step prior to performing an encoded assay. In this case, only one synthesis is required for each probe and additional functional elements. Additional functional elements may be added to a probe to enable insertion of an index. Examples of functional elements that may be added include (i) non-natural nucleotides (e.g., biotin, amine, etc.) and (ii) polynucleotides that enable biochemical transformation of the probe to contain an index sequence such as adapters for ligations or extension ligations, restriction endonuclease recognition sites, and transposome binding sites.

Indexes may be added during an encoded assay. For example, a ligation reaction to insert an index can occur at the same time as ligation of the probe at the target site of interest to generate a circularized probe (i.e., the transformation event). In some cases, the ligation reaction may be a gap-fill extension/ligation reaction.

Indexes may be added after ligation of the probe and RCA by including modified nucleotides during the RCA reaction. The modified nucleotides may then be coupled to an index sequence. In cases where there is a covalent or non-covalent interaction, either moiety can be linked to the index sequence or incorporated during RCA.

Examples of coupling strategies include: (i) ligand protein pairs such as biotin-streptavidin, antigen-antibody, CLIP tag and SNAP tag pair (i.e., O6-benzylguanine derivatives coupling to O6-alkylguanine-DNA-alkyltransferase, wherein either the protein or the substrate may be bound to the probe), carbohydrate-protein pairs (e.g., lectins), and digoxigenin-DIG-binding protein; (ii) peptide-protein pairs (e.g., SpyTag-SpyCatcher); and (iii) hybridizing indexes to a common sequence on the RCA product.

Indexes may be added to RCA products by restriction endonuclease cleavage followed by index ligation.

Indexes may be added to RCA products using a transposase enzyme that fragments and indexes the RCA products.

Surface Attachment

The encoded assays of the invention may be performed on a surface. For example, a target may be immobilized on a surface for conducting assays of the invention. The probes of the invention may be immobilized on a surface for conducting assays of the invention. DNA nanoballs of the invention may be immobilized on a surface for conducting assays of the invention. Various intermediate assemblies of molecules of the assays of the invention may be immobilized on a surface for conducting assays of the invention.

Various steps of the invention may be performed on a surface, such as target capture, recognition events, transformation events, amplification, and/or decoding events, i.e., determination of the absence or presence of the code (e.g., by sequencing or hybridization-based detection).

Thus, for example, the disclosure provides a surface having a probe as described herein immobilized on the surface. The disclosure provides a surface having a nanoball as described herein immobilized on the surface. The disclosure provides a surface having a target immobilized on the surface. The disclosure provides a surface having a target immobilized on the surface with a probe as described herein hybridized to the target. The disclosure provides a surface having a probe immobilized on the surface with a target as described herein hybridized to the probe. The disclosure provides a surface having a target nucleic acid immobilized on the surface, and a protein or peptide bound to the target nucleic acid. The disclosure provides a surface having a target nucleic acid immobilized on the surface, and an antibody, aptamer, binder, or antibody fragment bound to the target nucleic acid. The disclosure provides a surface having a ligand that has affinity for any of the foregoing immobilized on the surface. For example, the ligand may have affinity for a probe as described herein, a nanoball as described herein, or a target as described herein. The ligand may, for example, be a protein, peptide, antibody, aptamer, binder, or antibody fragment.

A variety of surfaces may be used for the surface attachments described herein. In various embodiments, the surface includes an oxide, a nitride, a metal, an organic or an inorganic polymer (e.g., hydrogel, resin, plastic or other).

The surface may take a variety of forms, e.g., it may be flat or curved. It may be beads or particles. In some cases, the surface is the surface of a flow cell. Beads or other particles may in some embodiments range in size from less than 100 nm up to several centimeters.

Various surface modifications may be used to permit attachment of various components of the assays of the invention to a surface. For example, various anchoring ligands may be used (e.g., streptavidin, biotin, aptamers, antibodies, etc.). Chemical handles, such as click chemistry handles, may be used. Examples include azides, alkynes, unsaturated bonds, amines, carboxylic acids, NHS, DBCO, BCN, tetrazine, epoxy and the like. Single- or double-stranded oligonucleotides may be used. Size ranges of the oligonucleotides may, in some cases, be from about 10 to about 200 nucleotides. Proteins or peptides may be used for surface attachment. Charge-based molecules or polymers may be used, e.g., polyethylenimine.

Various techniques may be used to prepare a surface for binding to a target or to a component of an assay of the invention. In one example, a flow cell with primers may be used. A splint DNA segment that comprises a segment complementary to the primer and a segment that is complementary to the target, or the component of the assay may be hybridized to the primer. A variety of splints may be used on a surface, with various subsets of the splints having different segments complementary to different components of the invention or different targets. Specific splints may be arranged on different regions of a surface. For example, splints may be arranged in a manner that permits the identification of distinct regions of a surface targeted to specific analytes or components of the assays.

In various embodiments, amplification of a nucleic acid may occur on the surface. The nucleic acid may be a target or any nucleic acid component of an assay of the invention. For example, a target analyte may be amplified on a surface, or a probe of the invention may be amplified on a surface, and/or a fragment of any of the foregoing may be amplified on a surface. The amplification may be performed on a bead or particle, or on a flat surface, such as on the surface of a flow cell.

It should also be noted that DNA may be amplified in solution, e.g., in an aqueous suspension or emulsion, such as in microdroplets. Solution-based amplification may be performed, for example, in an open environment, such as the well of the microtiter plate, in a nanowell, or in an enclosed space, droplet in an emulsion, or on a flow cell or other microfluidic device.

Amplification may be by any method of amplification, including for example, PCR, isothermal amplification and/or ultrarapid amplification.

Attachment for immobilization of components of the assays or of targets may be covalent or non-covalent (e.g., Coulombic in nature), temporary or permanent, and/or rendered labile when subject to a particular stimulus.

Examples of mechanisms of lability include:
Enzymatic—protease, restriction endonuclease, CRISPR-Cas9
Chemical—reduction, hydrolysis, nucleophilic attack, displacement, reducing of a disulfide bond
Temperature—melting of duplexed hybridized DNA, thermodynamically unfavorable conditions (Positive deltaG)
pH—hydrazone, carbonate, etc.
Light—O-nitrobenzyl or derivatives where absorption of light of a particular wavelength(s) can cause bond rearrangements or cleavage. Light sensitive groups include nitro-benzene derivatives
Ligand mediated—competitive competition for binding site (see examples below)
- Peptide-tagged oligos with protein interactions—e.g., Spy-catcher. The moiety may be the ligand or the protein.
- Peptide-tagged oligo with heavy metal interactions—e.g., Hexa-histidine—to Cu. The moiety may be the ligand or the protein.
- CLIP tag and SNAP tag pair—i.e., 06-benzylguanine derivatives coupling to 06-alkylguanine-DNA-alkyltransferase. Either the protein or the substrate may be bound to the oligo.
- Carbohydrate-protein pairs, e.g., lectins
- The moiety may be a ligand (e.g., biotin, digoxigenin) coupled to a fluorescently-tagged protein (e.g., avidin, streptavidin, DIG-binding protein)

Cleavage can be performed by cleaving a moiety dangling on a nucleotide, or a nucleotide or a nucleobase within the oligo sequence or the di-nucleotide linkage, e.g., uracil and USER cocktail (uracil-N-deglycosylase (UNG)) followed by Endonuclease VIII or FPG (Formamidopyrimidine DNA Glycosylase with Bifunctional DNA glycosylase with DNA N-glycosylase and AP lyase activities)

Cleavage can be performed by an enzyme

Surface-Based Workflows

A variety of surface-based workflows are possible within the scope of the assays disclosed. In some embodiments, a surface-based workflow may use a probe that includes a recognition element associated with a code. The code may be a soft decodable code, such as a trellis code. In some embodiments, a surface-based workflow may use a dual probe that includes a recognition element associated with a code (e.g., a trellis code) and a cleavage reaction to release a recognition element fragment. In some embodiments, a surface-based workflow may use a single probe that includes a recognition element associated with a code (e.g., a trellis code) and a cleavage reaction to release a recognition element fragment.

In some embodiments, a surface-based workflow may include immobilizing a target on a surface and hybridizing a probe to the target. In one embodiment, a surface-based workflow may include:
(i) immobilizing the target on a surface;
(ii) hybridizing a probe to the immobilized target;
(iii) releasing a recognition element fragment; and
(iv) circularizing the recognition element fragment to produce a circular modified recognition element; and In some embodiments, the target may be a nucleic acid, e.g., DNA. In this case, immobilization of the nucleic acid target (e.g., DNA) may be at an end of the target or via a side chain or internal segment of the target.

In some embodiments, the circular modified recognition element may be amplified in an RCA reaction to produce a nanoball product.

In some cases, the RCA reaction may be performed in a solution that remains in contact with the surface on which the target is immobilized (e.g., in the same container, well, reservoir, liquid volume or droplet). In some cases, the solution comprising the modified recognition element may be transferred to a separate container prior to performing the RCA reaction. In some cases, the solution comprising the modified recognition element may be transferred to a different surface prior to performing the RCA reaction.

In some embodiments, the immobilized target (e.g., DNA) may be used to prime the RCA reaction. In one embodiment, a surface-based workflow may include:
(i) immobilizing the target on a surface;
(ii) hybridizing a probe to the target;
(iii) releasing a recognition element fragment;
(iv) circularizing the recognition element fragment to produce a circular modified recognition element; and
(v) using the target to prime an RCA reaction to generate a nanoball product, e.g., by rehybridizing the circular modified recognition element to the target.

In some embodiments, a surface-based workflow may include immobilizing a probe (or a part thereof) on a surface and using the immobilized probe to capture a target. In one embodiment, a surface-based workflow may include:
(i) immobilizing the probe (or a part thereof) on a surface;
(ii) hybridizing a target to the probe;
(iii) releasing a recognition element fragment; and
(iv) circularizing the recognition element fragment to produce a circular modified recognition element.

In some embodiments, the circular modified recognition element is amplified in an RCA reaction to generate a nanoball product. In some cases, the RCA reaction may be performed in a solution that remains in contact with the surface on which the probe was anchored (e.g., in the same container, well, reservoir, liquid volume or droplet). In some cases, the solution comprising the circular modified recognition element may be transferred to a separate container prior to performing the RCA reaction.

In some cases, the solution comprising the circular modified recognition element may be transferred to a different surface prior to performing the RCA reaction. In one embodiment, oligonucleotides bound to the new surface may be used as capture moieties to immobilize the circular modified recognition element on the surface and to initiate the amplification reaction. In one embodiment, the target may be immobilized on the new surface and used to initiate the amplification reaction.

A surface-based workflow may use a dual probe as a recognition element. In one embodiment, a surface-based workflow using a dual probe may include:
(i) immobilizing a first probe on a surface;
(ii) providing a second probe in a solution;
(iii) hybridizing a target to the first probe and the second probe;
(iv) releasing a recognition element fragment; and
(v) circularizing the recognition element fragment to produce a circular modified recognition element.

In some embodiments, the first probe and the second probe may both be immobilized on the surface.

A probe may be anchored on a surface by an anchor element. In one example, the anchor element may be a surface bound primer. The surface may, for example, be the surface of a flow cell.

The disclosure provides a process for preparing a surface for binding to a target or to a component of an assay of the invention. Surface modifications may serve a dual purpose. For example, a surface modification may (i) capture the target of interest and (ii) initiate the amplification of a probe or a portion thereof on the surface. In another example, a surface modification may (i) capture a component of the assay (e.g., a circular modified probe), and (ii) initiate an RCA reaction to generate a nanoball product.

A surface bound primer may be enzymatically modified to include a capture sequence. A capture sequence may be a target-specific probe, such as the dual probe and single probe recognition elements of the invention.

A capture sequence may be a capture probe that is specific for a component of an assay. For example, a capture probe may be a splint oligonucleotide that may be used to hybridize to a recognition element fragment and template a ligation event to produce a circular modified recognition element. In another example, a capture probe may be a bridge oligonucleotide that may be used to hybridize to a recognition element fragment and a separate coded oligonucleotide, and template a ligation event to produce a circular modified recognition element.

A surface bound primer may be enzymatically modified to include a probe or a portion thereof (e.g., a probe arm or a primer binding site). For example, a splint oligonucleotide that includes a segment that is complementary to a surface bound primer and a segment that is complementary to a probe (or a portion thereof) may be hybridized to the primer and used to template the synthesis of a surface bound probe. In one example, the surface bound probe is one arm of a dual probe.

Figure 5:
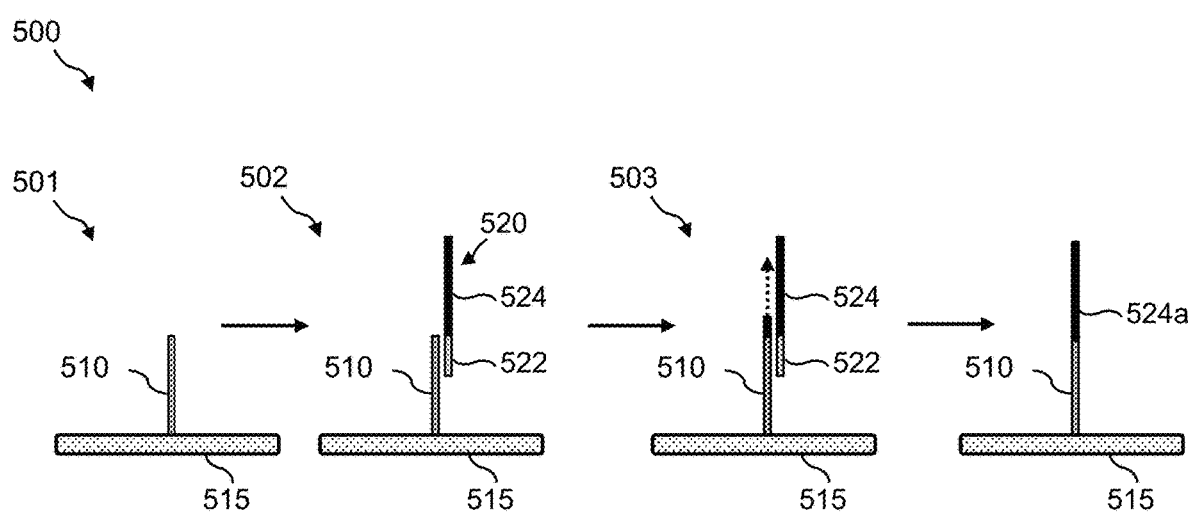
FIG. 5 is a schematic diagram illustrating an example of a process for synthesizing a surface bound probe using a splint oligonucleotide.

FIG. 5 is a schematic diagram illustrating an example of a process 500 for synthesizing a surface bound probe using a splint oligonucleotide. Process 500 may include, but is not limited to, the following steps.

In a step 501, a surface is provided with a surface bound primer. For example, a primer 1110 is bound to a surface 515. Surface 515 may, for example, be the surface of a flow cell.

In a step 502, a splint oligonucleotide is hybridized to the surface bound primer. For example, a splint 520 that includes a segment 522 that is complementary to primer 510 and a capture segment 524 is hybridized to primer 510. In one example, capture segment 524 is one arm of a dual capture probe.

In a step 503, a primer extension reaction is performed to synthesize the surface bound probe. For example, in the primer extension reaction, splint 520 is used to template the synthesis of a capture segment 524 extending from primer 510 to produce a surface bound probe 524a.

Amplification Strategies

Amplification may be by any method of amplification, including for example, on-surface PCR, isothermal amplification, rolling circle amplification, and/or ultrarapid amplification.

Surface based amplification may be performed using PCR with surface-anchored primers (e.g., Illumina bridge amplification technology) or recombinase polymerase amplification (RPA) (e.g., ExAmp technology).

Clonally amplified material may be a nanoball or a DNA cluster (e.g., Illumina surface-based amplification).

An amplification strategy may include adding a surface adapter to a probe. A surface adapter may be complementary to a second primer on a flow cell surface (e.g., a bridge amplification primer). The surface adapter may, for example, be added to a probe during the ligation or gap-fill ligation event or added separately by PCR or through its own ligation to a probe. For example, an amplification strategy may include using the splint ligation approach described with reference to FIG. 5 to add a surface adapter to a surface bound probe to facilitate bridge amplification. Bridge amplification may be used to create clusters for sequencing.

An amplification strategy may include adding a restriction enzyme site in a probe or in a modified recognition element. For example, the modified recognition element may include a restriction enzyme site that when hybridized with a complementary oligonucleotide provides a double-stranded site for a restriction endonuclease to cleave the modified recognition element, rendering a linear strand. The linear strand may be amplified for downstream processing, e.g., for sequencing. For example, the linear strand may be captured on a flow cell and amplified by bridge amplification (e.g., Illumina bridge amplification technology) or recombinase polymerase amplification (RPA) (e.g., ExAmp technology).

The probe or modified recognition element may include surface primers or surface adapter sequences that are complementary to surface bound primers of a flow cell. The adapter sequences may be linked to or adjacent to the restriction site, so that when the site is cut by a restriction enzyme the linear strand is ready for sequencing. As noted, other forms of cleavage are possible, such as CRISPR mediated cleavage or any other double-stranded break inducing protein.

Figure 6:
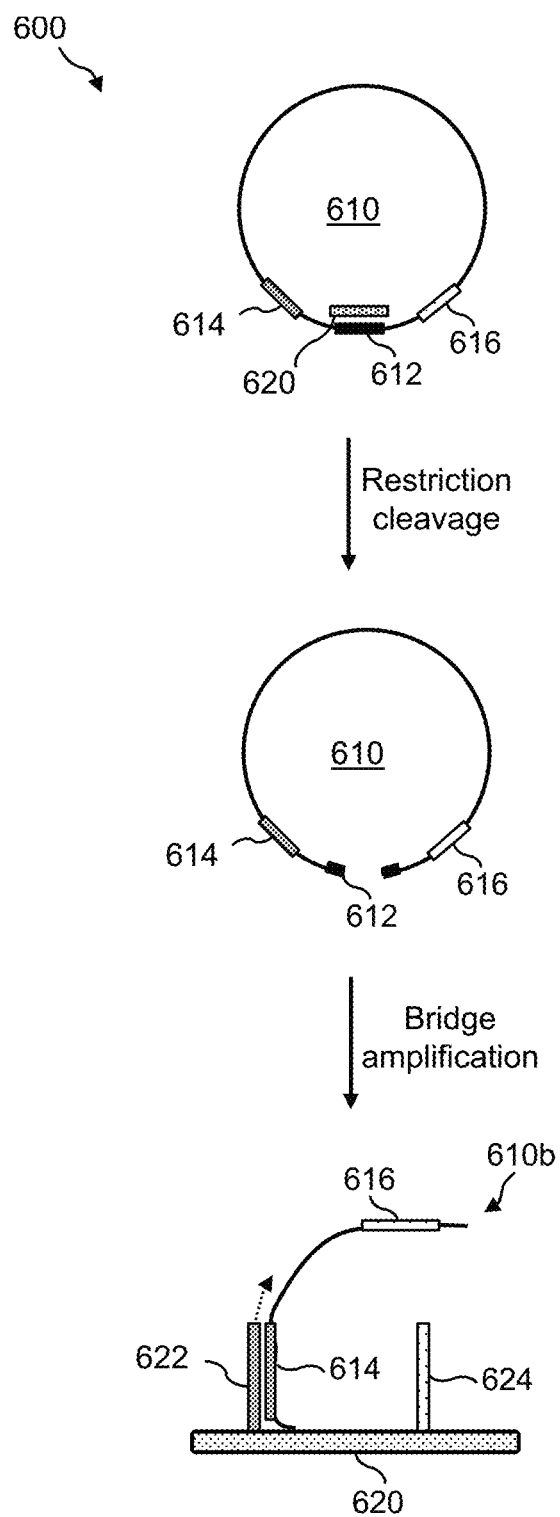
FIG. 6 is a schematic diagram illustrating an example of a circular modified recognition element that includes a restriction enzyme site that may be used to linearize the element for capture on a flow cell for bridge amplification prior to sequencing.

FIG. 6 is a schematic diagram illustrating an example of a circular modified recognition element that includes a restriction enzyme site that may be used to linearize the element for capture on a flow cell for bridge amplification prior to sequencing. For example, a modified recognition element 610 may include a restriction site 612. Restriction site 612 may be linked to a first surface adapter 614 and a second surface adapter 616. An oligonucleotide 620 that is complementary to restriction site 612 may be hybridized to modified recognition element 610 to provide a double-stranded site for restriction endonuclease cleavage. Cleavage at restriction site 612 generates a linear recognition element 610b. Linear recognition element 610b may be loaded on a surface 620 (e.g., a flow cell surface) that includes a first primer 622 and a second primer 624 immobilized thereon. Hybridization of adapter 614 to primer 622 may be used to initiate a bridge amplification reaction to generate clusters for sequencing.

Similarly, a nanoball may include surface primers or sequencing adapters linked to or adjacent to a restriction site, so that when the site is cut by a restriction enzyme the linear strands are released ready for sequencing. As noted, other forms of cleavage are possible, such as CRISPR mediated cleavage.

In another embodiment, a nanoball with adapter sequences complementary to surface bound primers may be seeded directly onto the surface without cleaving. Amplification may proceed through bridge amplification (e.g., Illumina bridge amplification technology) or recombinase polymerase amplification (RPA) (e.g., ExAmp technology) initiated directly.

Rolling circle amplification (RCA) may be used to produce nanoballs as part of the assays of the invention. An RCA reaction may be performed as a surface-bound reaction. For example, RCA may be initiated by an oligonucleotide bound to a surface (e.g., beads, flow cells, microwell, or nanowells). Any method may be used to bind the oligonucleotide to the surface. In one example, the oligonucleotide may be covalently bound to the surface. FIG. 7 is a schematic diagram illustrating an example of a process of using a surface-bound oligonucleotide to initiate an RCA reaction (indicated by the arrow). An oligonucleotide 710 may be covalently attached to a surface 715. Oligonucleotide 710 may include an RCA primer sequence that is complementary to an RCA primer site on a modified recognition element 720. Oligonucleotide 710 may be used to capture modified recognition element 720 by hybridization of the complementary sequences and initiate the RCA reaction. Because oligonucleotide 710 is covalently bound to the surface, the surface-bound RCA reaction generates a nanoball 725 that is covalently attached to the surface.

In another example, a cation-coated surface (e.g., beads, flow cells, microwells, or nanowells) may be used to capture nanoballs. In one example, the cation-coated surface may be a polylysine-coated surface. FIG. 7B is a schematic diagram illustrating an example of capturing a nanoball on a cation-coated surface. A surface 715 may be coated with a polylysine coating 730. An RCA reaction may be performed in the presence of the polylysine coated surface, resulting in simultaneous immobilization and amplification of a nanoball 735. RCA primers may be supplied in solution (panel A) or bound to the polylysine-coated surface prior to performing the RCA reaction (panel B).

In another example, a streptavidin-coated surface (e.g., beads, flow cells, microwells, or nanowells) may be used to capture nanoballs. In this approach, biotin-linked deoxynucleotides may be incorporated into the nanoballs during RCA. The nanoballs will then be bound to the surface by a biotin-streptavidin linkage. FIG. 7C is a schematic diagram illustrating an example of capturing a nanoball on a streptavidin-coated surface. A surface 715 may be coated with a streptavidin coating 740. An RCA reaction may be performed in the presence of the streptavidin coated surface using biotin-linked deoxynucleotides to produce a nanoball 745 that includes biotin moieties 750 resulting in simultaneous immobilization and amplification of nanoball 745.

In another embodiment, biotin linked RCA primers may be bound to a surface by a streptavidin-biotin linkage and used to initiate an RCA reaction as described above with reference to FIG. 7A. An example of using a biotin-streptavidin linkage to perform a surface-bound RCA reaction is shown in FIG. 7D. A surface 715 may be coated with a streptavidin coating 740. An oligonucleotide 760 that includes a biotin moiety 762 may be attached to surface 715 through a biotin-streptavidin linkage. Oligonucleotide 716 may include an RCA primer sequence that is complementary to an RCA primer site on a modified recognition element 765. Oligonucleotide 760 may be used to capture modified recognition element 765 by hybridization of the complementary sequences and initiate the RCA reaction (indicated by the arrow) to produce a nanoball. Amplification in the presence of the streptavidin coated surface further anchors nanoball to the surface.

Following the formation of a nanoball, a determination may be made with respect to the identity of the code. Prior to making the determination, various secondary processing steps are possible within the scope of the assays described herein. The probe may include various elements that facilitate secondary processing steps. Examples include restriction endonuclease sites and CRISPR sites.

The nanoball may be converted to double-stranded DNA (dsDNA) prior to fragmentation. The dsDNA nanoball may be fragmented. In one embodiment, the probe includes restriction sites which are replicated in the nanoball, and the nanoball is fragmented using a restriction enzyme having specificity for the restriction sites.

CRISPR may be used to fragment the nanoball at specific sites.

Random fragmentation of nanoballs may be performed, using known fragmentation techniques.

Tagmentation may be performed on the nanoball, and the tagmentation may be used to add sequencing adapters.

Sequencing Preparation

This disclosure provides a variety of techniques for amplifying and preparing circularized recognition elements for sequencing. In certain embodiments, amplification and preparation for sequencing may be performed sequentially (e.g., PCR+primer ligation). In certain embodiments, amplification and preparation for sequencing may be performed in a single reaction (e.g., adapter addition via PCR). Addition of sequencing adapters may be performed with or without RCA amplification of circularized recognition elements.

In one embodiment, sequencing adapters are added via PCR. In this case, amplification and preparation for sequencing may be a single step. Depending on the probe design, the code, UMI, and index may be read in a single step or in two separate reads with a dehybridization step.

In one embodiment, RCA products (nanoballs) may be fragmented with restriction endonucleases (RE) to yield a multitude of code-containing single stranded nucleic acids. The single-stranded nucleic acids (i.e., the RE reaction products) may then be prepared for sequencing by ligation to adapter sequences.

In one embodiment, sequencing adapters may be added by transposomes that simultaneously fragment double-stranded DNA and add adapters.

As discussed elsewhere in the application, the assays of the invention include a transformation step. Typically, the transformation involves circularization of a recognition element fragment that is released from a probe when a target is present (e.g., by ligation or gap-fill ligation).

Figure 8A:
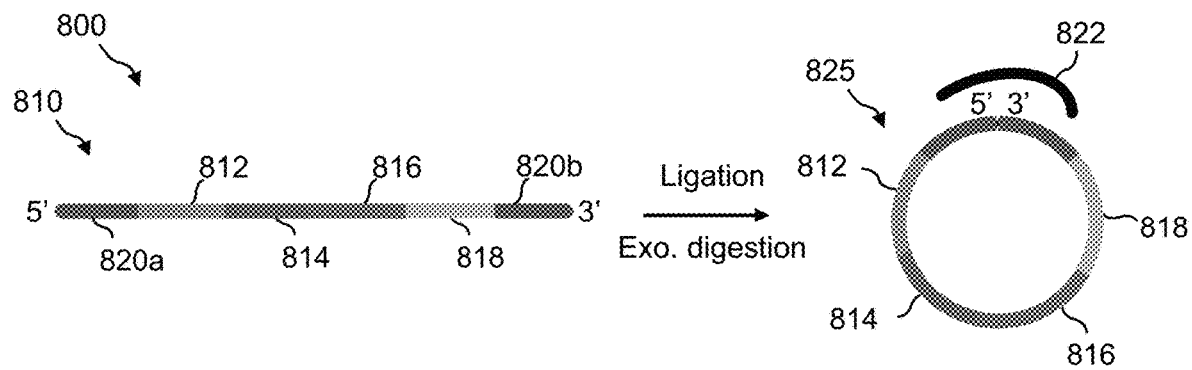
FIG. 8A is a schematic diagram of a transformation process for circularizing a linear recognition element fragment to form a circular modified recognition element for RCA.

FIG. 8A is a schematic diagram of a transformation process 800 for circularizing a linear recognition element fragment to form a circular modified recognition element for RCA. In this example, a recognition element fragment 810 may include a UMI sequence 812, a code 814, an SBS primer 816, and an index primer 818 all situated between a 5' common adapter region 820a and a 3' common adapter region 820b. A splint oligonucleotide 822 is hybridized to recognition element fragment 810 and is used to template the circularization of the recognition element fragment in a ligation reaction to yield a circular modified recognition element 825. The ligation reaction may be followed by an exonuclease digestion step to remove unligated recognition element fragments 810 and splint oligonucleotide 822.

Figure 8B:
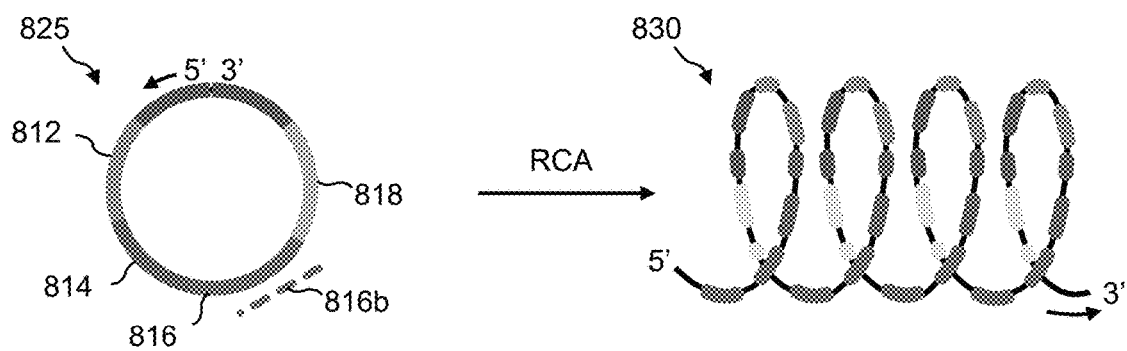
FIG. 8B is a schematic diagram showing RCA amplification of the circular modified recognition element to yield a nanoball product.

The circular modified recognition element shown in FIG. 8A may, in some cases, be amplified in a rolling circle amplification to form a nanoball product. FIG. 8B is a schematic diagram showing RCA amplification of the circular modified recognition element to yield a nanoball product. For example, in an RCA reaction an SBS primer 816b that is the reverse complement to SBS primer 816 may be hybridized to circular modified recognition element 825 and used to initiate the RCA reaction to generate a nanoball 830. Nanoball 830 is a polymeric molecule (concatemer) that includes multiple repeated copies of circular modified recognition element 825, wherein each copy includes SBS primer 816, code 814, UMI sequence 812, common adapter regions 820, and index primer 818. In this example, the complement (i.e., copy) of modified recognition element 825 is indicated by the dashed line.

In some embodiments, the RCA products (nanoballs) may be sequenced directly. In some embodiments, sequencing adapters may be added by PCR amplification, followed by clustering and sequencing.

Figure 8C:
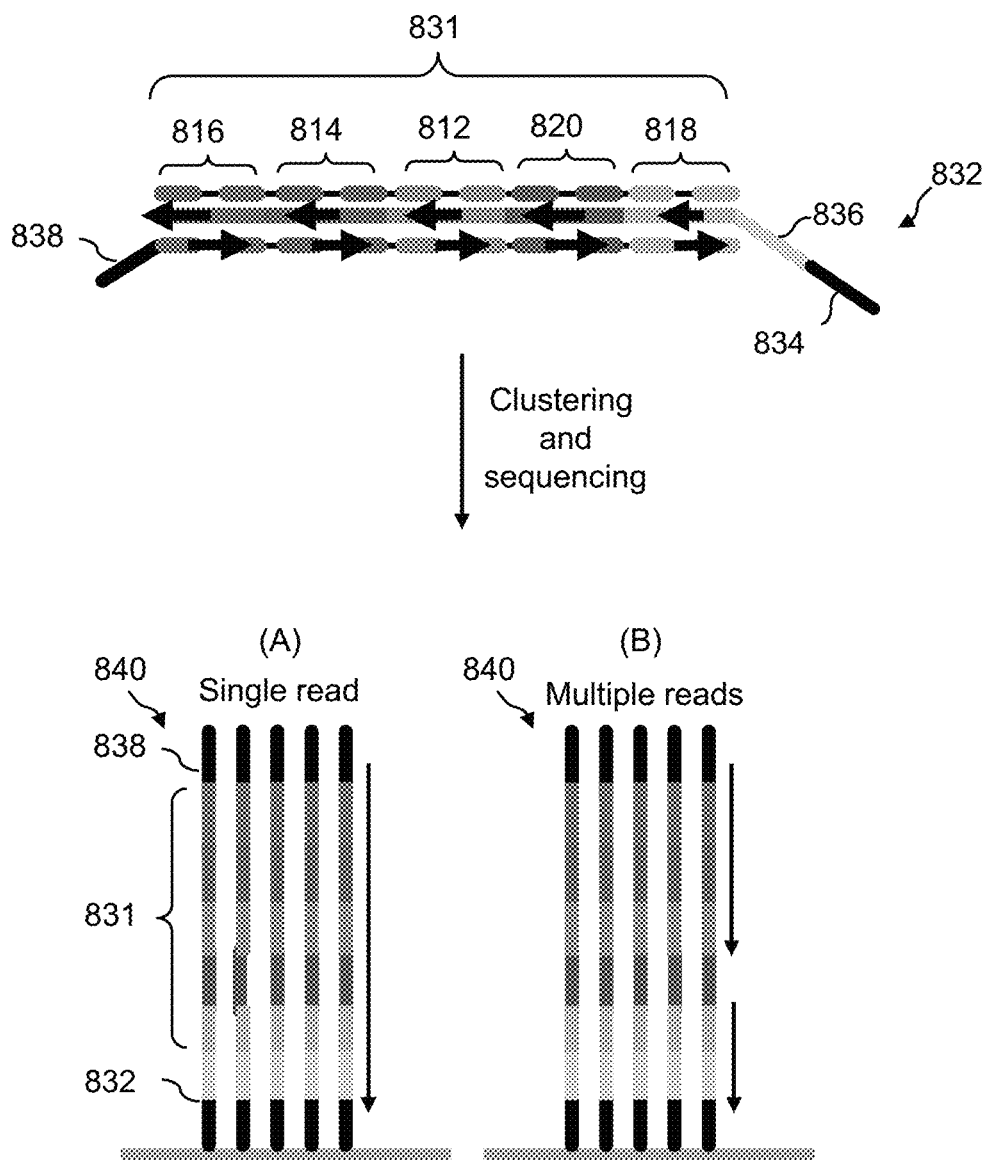
FIG. 8C is a schematic diagram showing the addition of sequencing adapters to a nanoball concatemer for subsequent clustering and sequencing.

FIG. 8C is a schematic diagram showing the addition of sequencing adapters to a nanoball concatemer for subsequent clustering and sequencing. The PCR reaction may use a pair of amplification primers 832 and 838. Amplification primer 832 may include a sequencing adapter sequence 834 (e.g., a P7 adapter sequence) and an index sequence 836 (e.g., a sample index sequence). Amplification primer 838 may include a second sequencing adapter sequence (e.g., a P5 adapter sequence). Amplification primers 832 and 838 are used in the PCR reaction to initiate amplification of nanoball 830 to generate multiple single probe copies 840 of modified probe 825 that now include the adapter sequences and the index sequence. In this example, a single probe copy 831 (indicated by the dashed lines) of the sequences in the original circular modified probe 825 is shown. A bridge amplification reaction may then be performed to generate a clonal cluster 840 for sequencing. Sequencing may be performed as a single read (A) or as multiple reads (B). Sequencing as a single read provides the UMI sequence, the code sequence, and the index sequence. Sequencing as multiple reads may include, for example, one read to provide the UMI and code sequences, and a second read to provide the index sequence.

In another embodiment, the probes of the invention may include restriction sites. The probes may be designed with restriction sites, or the restriction sites may be added to the probes as part of the assay process. The restriction sites will be amplified into the nanoball and will provide multiple sites at which to cut the nanoball into fragments.

Figure 9:
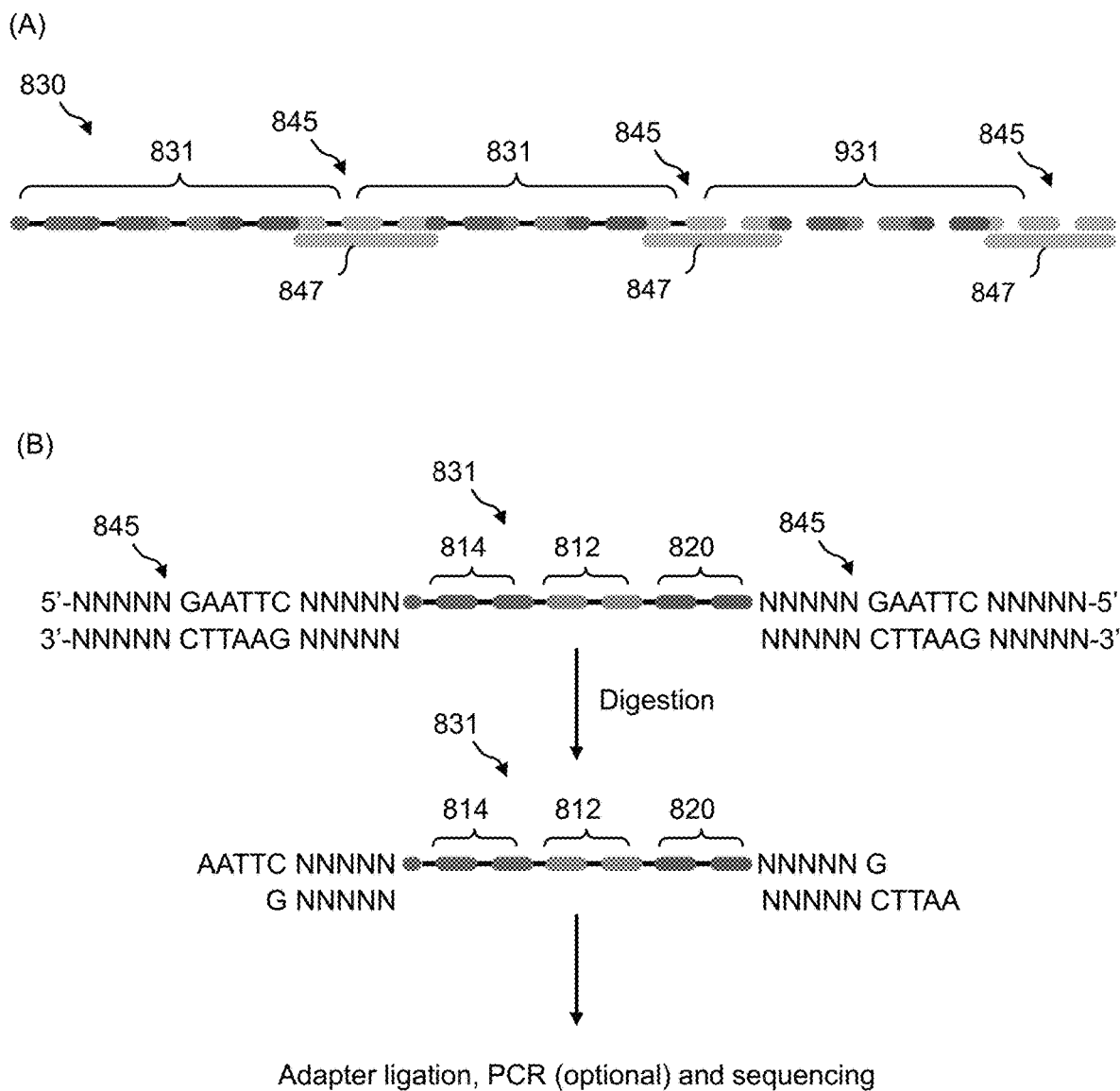
FIG. 9 is a schematic diagram of an example of a portion of the nanoball of FIG. 8 that includes restriction sites that may be used to separate repeated copies of the probe in the nanoball.

FIG. 9 is a schematic diagram of an example of a portion of nanoball 830 of FIG. 8 that includes restriction sites that may be used to separate repeated copies of the probe in the nanoball. Referring to panel "A", in this example, nanoball 830 includes three recognition element copies 831 that may be separated by cleavage at a restriction endonuclease site 845. A restriction site (RS) complementary sequence 847 may be hybridized to restriction sites 845 to provide a double-stranded region for cleavage.

Referring to panel "B", restriction sites consist of a recognition sequence and flanking bases to ensure that strands remain hybridized after cleavage. Flanking sequences (NNNNNN) may be of length ranging from about 5 to about 50 bases and can be designed to minimize interactions with other probe components and tune the melting temperature (Tm). In this example, the flanking sequences include five bases (N). The RS sequences can be used as an SBS primer such that sequencing begins with the code or may include a spacer region that is read prior to the code.

Digestion of nanoball 830 hybridized to RS complementary sequences 847 yields many code-containing DNA fragments with termini that contain single-stranded DNA overhangs or "sticky ends". The digestion products may be further processed for sequencing. For example, adapters may be ligated to the sticky ends resulting from the restriction digestion.

Alternatively, the ends may be blunt ended (i.e., the single-stranded overhangs removed) and prepared for ligation to adapters. Blunt ended fragments may then be processed via typical sequencing sample preparation protocols such as A-tailing and adapter ligation.

An additional embodiment includes using a primer and polymerase to create RCA products where the entire concatemer is double stranded. This structure can then be processed via the restriction endonuclease procedure described above.

Another embodiment includes employing hyperbranched RCA to create many double stranded, code-containing sequences that can be processed via the restriction endonuclease procedure described above.

In certain embodiments, the restriction endonuclease may be a member of the cas family of proteins or a derivative thereof. These proteins recognize longer sequences of DNA, making them more specific.

In an additional embodiment, circularized probes may be prepared for sequencing without RCA.

In certain embodiments, the nanoballs of the invention may be compacted prior to sequencing. Rolling circle amplification produces linear concatemers of single-stranded DNA. When the substrate for RCA is a circularized probe, these concatemers may contain 100s-1000s of copies of a code. When preparing RCA products for sequencing, it is useful to compact them. The compacting may produce spherical structures. The compacted structures can increase localization of signal.

Compaction of RCA products into spherical nanoballs can be accomplished by a variety of techniques. In one embodiment, cationic additives that condense high molecular weight DNA (e.g., spermidine, Mg ions, cationic polymers) may be used. The compactness of a spherical nanoball may be tuned by controlling the concentration of the cationic reagent used. The concentration of the cationic reagent used may be selected to avoid aggregation of multiple nanoballs.

In one embodiment, multivalent oligonucleotide sequences that crosslink sites on RCA products may be used to compact RCA products into spherical nanoballs. The RCA binding sites may be separated by a nucleic acid or polymeric linker to control the degree of compaction. The compactness of the spherical nanoball may, for example, be tuned by controlling the degree of crosslinking in the RCA product.

In one embodiment, incorporation of modified nucleotides followed by crosslinking may be used to compact RCA products into spherical nanoballs. Examples of modified nucleotides that may be used include biotinylated nucleotides that bind to streptavidin proteins and nucleotides that covalently react with multifunctional linkers (e.g., amino nucleotides and NHS-terminated linkers). The compactness of the spherical nanoball may, for example, be tuned by controlling the degree of crosslinking in the RCA product.

In certain embodiments, the assays of the invention make use of nanopore sequencing. A nanoball or a circular modified probe may be sequenced using nanopore sequencing. Various nanopore sequencing sample preparation techniques are known in the art. Amplification is optional. Various components required for other sequencing techniques, such as sequencing primers, may be omitted from the probe. Purification can be accomplished using, for example, SPRI beads or BluePippen. Oxford Nanopore Technologies, Inc. (Oxford, UK) provides kits for sample preparation. Examples include Ligation Sequencing Kit, Native Barcoding Kit 96, and Rapid Barcoding Kit.

In certain embodiments, it may be useful to further amplify RCA products prior to sequencing. For example, in applications that use cell-free DNA (cfDNA) as the input where the analyte number may be low, it may be useful to amplify the RCA product prior to sequencing. In one embodiment, a circle-to-circle amplification approach may be used to produce multiple RCA products from one initial RCA product by monomerization of the concatemer (i.e., cleavage to unit length fragments), recircularization of the unit length fragments (i.e., monomers) and amplification of the newly generated circles in a second RCA reaction to produce multiple RCA product copies for further processing or sequencing. The restriction enzyme approach described with reference to FIG. 9 may be used to digest the initial RCA product to unit length (i.e., monomers). In some cases, an end-to-end joining oligonucleotide plus an end-to-end ligation reaction may be used to circularize the unit size fragments.

Figure 10:
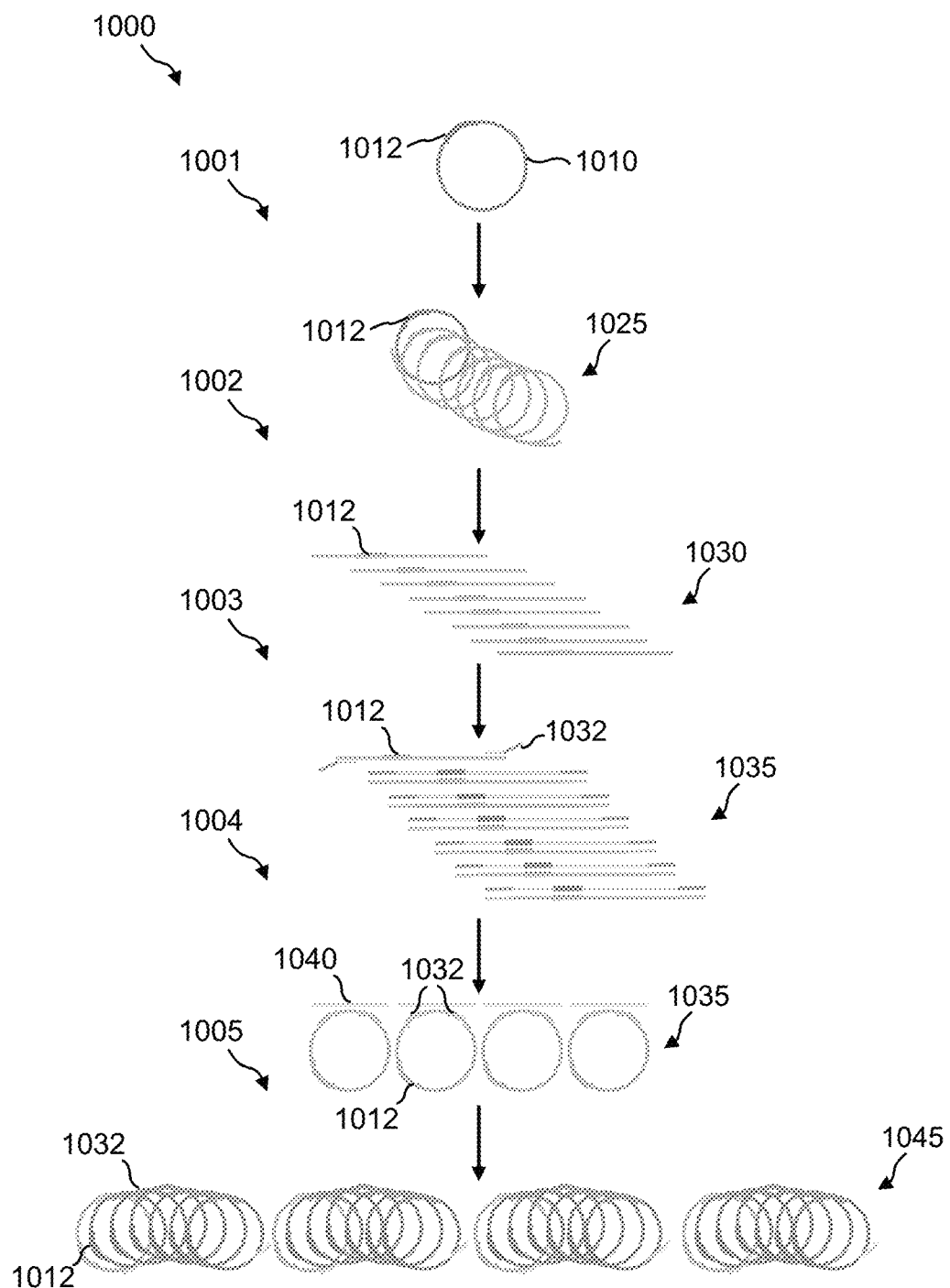
FIG. 10 is a schematic diagram of an example of a process for circularizing and amplifying unit length nanoball fragments to produce multiple RCA nanoball products.

FIG. 10 is a schematic diagram of an example of a process 1000 for circularizing and amplifying unit length nanoball fragments to produce multiple RCA nanoball products. Workflow 1000 may include, but is not limited to, the following steps.

In a step 1001, a circular modified recognition element is amplified to produce a nanoball product. For example, a modified recognition element 1010 that includes a code 1012, and a restriction site (not shown) is amplified in an RCA reaction to generate a nanoball product 1025. During amplification, the restriction site is amplified into the nanoball and provides multiple sites at which to cut nanoball 1025 into fragments.

In a step 1002, the nanoball product is cleaved to produce multiple unit sized fragments each comprising the code. For example, nanoball 1025 is cleaved at the restriction sites to produce multiple unit size fragments 1030 each comprising code 1012. The cleavage reaction may, for example, be performed as describe with reference to FIG. 9.

In a step 1003, the unit size fragments are amplified in a PCR reaction to generate multiple double-stranded fragments. For example, indexed amplification primers 1032 are hybridized to unit size fragments 1030 and a PCR reaction is performed to produce multiple unit size fragments 1035 that include code 1012 and the indexed amplification primer 1032.

In a step 1004, the amplified unit size fragments are circularized to generate circular unit size fragments. For example, an end-to-end joining oligonucleotide 1040 that is complementary to sequences in amplification primer 1032 is hybridized to unit size fragment 1030 and an end-to-end ligation reaction is performed to generate circular unit size fragments 1035 comprising the code.

In a step 1005, the circular unit size fragments are amplified in a second RCA reaction to produce multiple nanoball copies for further processing or sequencing. For example, circular unit size fragments 1035 are amplified in an RCA reaction to produce multiple nanoballs 1045 each comprising code 1012 and indexed amplification primers 1032.

In an embodiment of process 1000 of FIG. 10, the PCR amplification step 1003 may be omitted and the unit size fragments comprising the code may be re-circularized for subsequent amplification in a second RCA reaction.

Figure 11:
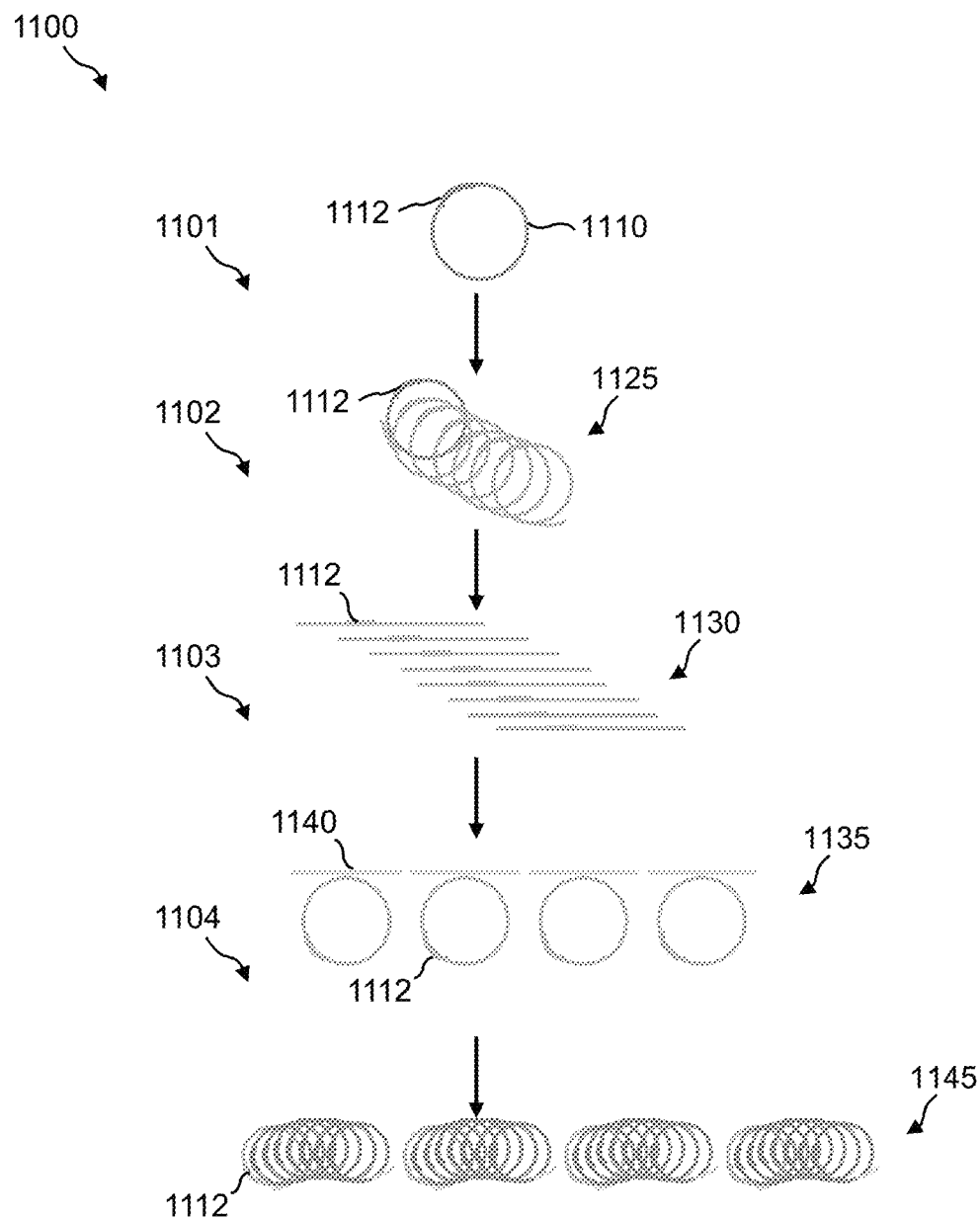
FIG. 11 is a schematic diagram of an example of an alternative process or circularizing and amplifying unit length nanoball fragments to produce multiple RCA nanoball products.

FIG. 11 is a schematic diagram of an example of an alternative process 1100 for circularizing and amplifying unit length nanoball fragments to produce multiple RCA nanoball products. Workflow 1100 may include, but is not limited to, the following steps.

In a step 1101, a circular modified recognition element is amplified to produce a nanoball product. For example, a modified recognition element 1110 that includes a code 1112, and a restriction site (not shown) is amplified in an RCA reaction to generate a nanoball product 1125. During amplification, the restriction site is amplified into the nanoball and provides multiple sites at which to cut nanoball 1125 into fragments.

In a step 1102, the nanoball product is cleaved to produce multiple unit sized fragments each comprising the code. For example, nanoball 1125 is cleaved at the restriction sites to produce multiple unit size fragments 1130 each comprising code 1112. The cleavage reaction may, for example, be performed as describe with reference to FIG. 9.

In a step 1103, the unit size fragments are circularized to generate circular unit size fragments. For example, a splint oligonucleotide 1140 that is complementary to common adapter regions (not shown) in unit size fragments 1130 is hybridized to the fragments and a ligation reaction is performed to generate circular unit size fragments 1135 comprising the code.

In a step 1104, the circular unit size fragments are amplified in a second RCA reaction to produce multiple nanoball copies for further processing or sequencing. For example, circular unit size fragments 1135 are amplified in an RCA reaction to produce multiple nanoballs 1145 each comprising code 1112.

Examples of sequencing techniques suitable for use with the assays disclosed herein include nanopore sequencing, next-generation sequencing, massively parallel sequencing, Sanger sequencing, sequencing by synthesis (SBS), pyrosequencing, sequencing by hybridization, single molecule real-time sequencing, SOLID, and sequencing by ligation.

In some embodiments, a process for circularizing a probe may include a gap-fill ligation reaction that may be used to circularize the probe and capture an unknown region of the target that may then be sequenced along with the code.

Target Analytes

In some embodiments, the target analytes are DNA targets. For example, in an encoded assay a panel of DNA sequences may be targeted for detection of a single nucleotide difference relative to a reference nucleotide.

A single nucleotide difference may be a change in the methylation status of a nucleotide at a target site of interest. In this case, the encoded assay is a methylation assay and targets may include a panel of methylation markers.

A single nucleotide difference may be a change in nucleotide usage at a target site of interest. In this case, the encoded assay is a genotyping assay and targets may include a panel of single nucleotide variants (SNVs).

In some embodiments, the target analytes are RNA targets.

In one embodiment, in an encoded assay a panel of RNA sequences may be targeted for reverse transcription to generate a panel of cDNA molecules that may be recognized and detected in an encoded assay.

In one embodiment, a panel of RNA targets may be targeted directly using DNA probes and the RNA: DNA complex detected in an encoded assay.

Assay Formats

Figure 12:
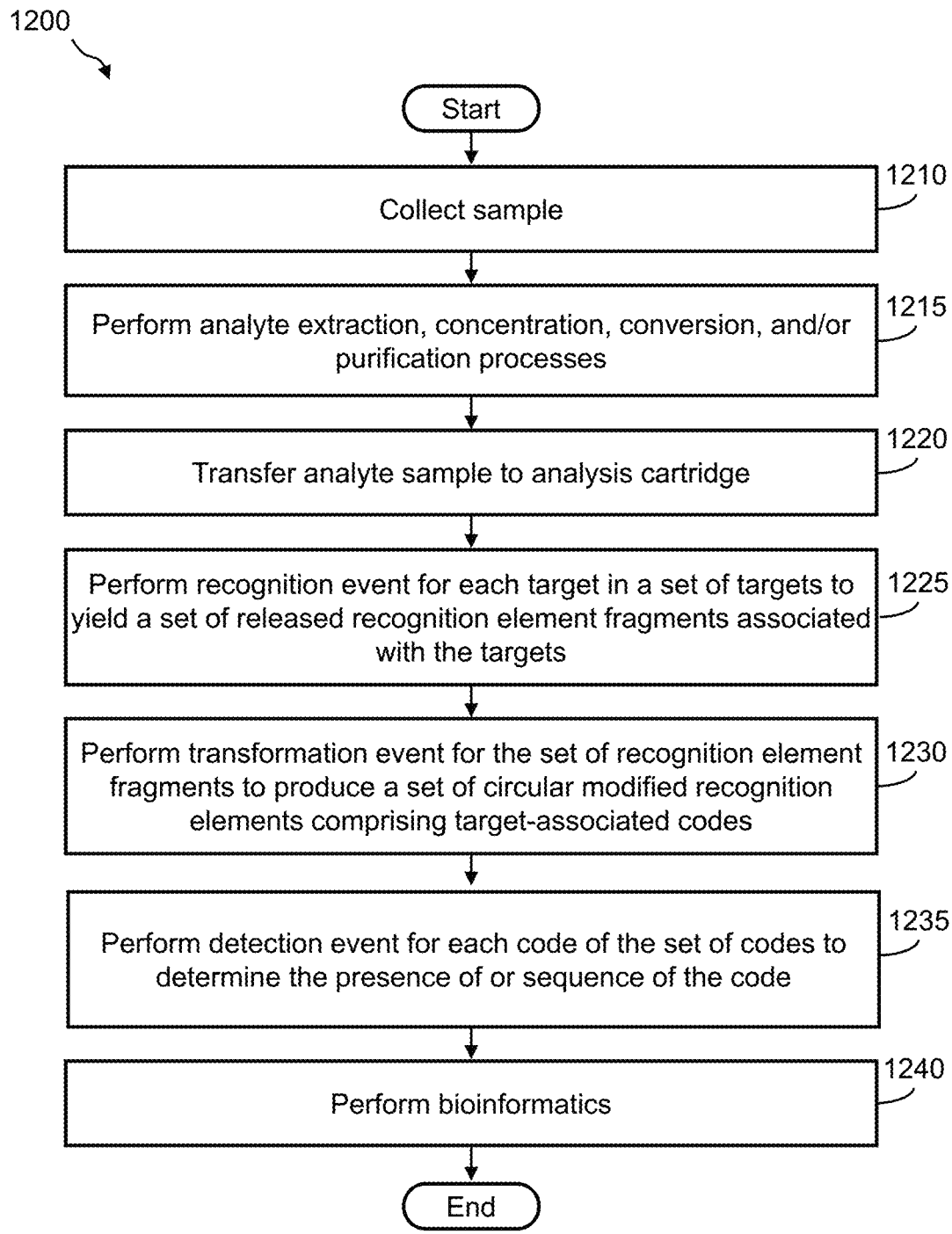
FIG. 12 is a flow diagram of an example of a targeted nucleic acid assay workflow for detecting a target site of interest.

FIG. 12 is a flow diagram of an example of a targeted nucleic acid assay workflow 1200 for detecting a set of target nucleic acids of interest. Nucleic acid assay workflow 1200 may include, but is not limited to, the following steps.

At a step 1210, a sample is collected. For example, a blood or saliva sample may be collected. In one example, a whole blood sample may be collected and processed to separate the plasma fraction from the cellular components of whole blood.

At a step 1215, analyte extraction, concentration, conversion, and/or purification processes are performed. In one embodiment, the analyte is DNA. For example, cell-free DNA (cfDNA) in a plasma sample may be extracted, purified, and concentrated for analysis. A proteinase K (ThermoFisher, Waltham, MA) digestion step may be used to digest proteins present in the plasma sample. In some cases, a heat denaturation step (e.g., 94-98° C. for 20-30 seconds) may be used to denature double-stranded DNA into single-stranded DNA. A bead-based extraction and concentration protocol may be used to capture single-stranded DNA in the plasma sample. In some embodiments, the bead-based extraction protocol uses magnetically responsive nucleic acid capture beads. The bead-bound DNA may be released from the capture beads using an elution buffer (or other elution means suitable to the capture bead used) to produce a processed DNA sample for analysis.

In one embodiment, the DNA sample may be further processed in a bisulfite conversion reaction for analysis of the methylation status of DNA sequences in the sample.

In some embodiments, the analyte is RNA. In one embodiment, the RNA sample may be further processed in a reverse transcription reaction to generate cDNA molecules for detection of splice variants of interest.

At a step 1220, the processed DNA sample is transferred into an analysis cartridge. In one example, the analysis cartridge includes an array of nanowells.

At a step 1225, a recognition event for each target in a set of targets is performed to yield a set of released recognition element fragments that are associated with the targets. In some embodiments, the recognition event may use a recognition element comprising a dual probe, wherein a first probe is hybridized to a sequence upstream of a target site and a second probe that includes a target-associated mismatch sequence is hybridized to a sequence downstream of a target site. If there is a match between the second probe and target site, a ternary nucleic acid complex is formed. A flap endonuclease may then be used to cleave the ternary nucleic acid complex and release the recognition element fragment associated with the target. The recognition element fragment includes the mismatch sequence and the base that is complementary to the target site of interest. In the presence of a mismatch at the target site, no cleavage occurs.

The melting temperatures for the first and second probes in a probe pair may be selected to provide for multiple rounds of target recognition and fragment release. Because multiple rounds of target recognition and fragment release may be performed the number of recognition element fragments released in the recognition event is increased (i.e., amplified).

In some embodiments, the second probe may be an encoded probe. In this case, in the presence of a match between the second probe and target site, a ternary nucleic acid complex is formed and cleaved by the flap endonuclease to release a recognition element fragment that associates a code with the target.

In some embodiments, the second probe is not an encoded probe. In this case, a third oligonucleotide probe that includes sequences complementary to a released recognition element fragment may be used to associate a code with the target of interest. In one example, the third oligonucleotide probe may be a linear probe that includes a target-specific code and sequences for recognizing and hybridizing to a target-associated recognition element fragment. In another example, the third oligonucleotide probe may be a pre-circularized probe (i.e., a circular probe) that includes a target-specific code and sequences for recognizing and hybridizing to a target-associated recognition element fragment.

In some embodiments, the recognition element comprises a single probe and a PCR amplification/5' nuclease cleavage reaction may be used to release the recognition element fragment associated with the target. The recognition element fragment includes the mismatch sequence and the base that is complementary to the target site of interest.

In some embodiments, the single probe recognition element may be an encoded probe.

In some embodiments, the single probe recognition element is not an encoded probe. In this case, a second oligonucleotide probe that includes sequences complementary to a released recognition element fragment may be used to associate a code with the target of interest.

At a step 1230, a transformation event for the set of recognition element fragments is performed to produce a set of modified recognition elements comprising target-specific codes. In some embodiments, the transformation event may include a ligation reaction or a gap-fill extension/ligation reaction to produce a set of circular modified recognition elements comprising the codes (i.e., a set of codes associated with the set of targets of interest).

In one embodiment, a recognition element fragment comprising a coded mismatch sequence may be transformed to a modified recognition element using a splint oligonucleotide in combination with a ligation or gap-fill extension/ligation reaction. For example, a splint oligonucleotide that is complementary to sequences in the mismatch sequence may be hybridized to the recognition element fragment, thereby bringing the ends of the fragment into proximity for ligation to generate a modified recognition element fragment comprising the code.

In some embodiments, a recognition element fragment does not include a code and a separate oligonucleotide probe comprising a code is used to associate a code with the recognition element fragment. In this case, the modified recognition element comprises a hybrid complex that includes the recognition element fragment and the oligonucleotide probe.

The coded oligonucleotide probe may be a linear probe or a circular probe that includes the target-specific code and sequences for recognizing and hybridizing to a target-specific recognition element fragment (i.e., a mismatch sequence).

At a step 1235, a decoding event for each code of the set of codes is performed to identify the presence of the code or assign a probability that the code is present. The decoding event may include an amplification step in which the code sequence (among other elements) is amplified. The amplified code may be identified to associate the code with the target nucleic acid. In one example, the code may be identified in a hybridization-based detection process using fluorescent oligonucleotide probes. In another example, the amplified code may be sequenced to identify the presence of the code or assign a probability that the code is present.

In some embodiments, the amplification step comprises a rolling circle amplification reaction (RCA) to generate a nanoball output product.

At a step 1240, using the decoded code information from step 435, bioinformatics may be performed.

A number of different assay formats for workflow 1200 may be used to detect a target site of interest in a set of target nucleic acids in a sample.

Dual Probe Recognition Element

In some embodiments of workflow 1200, a downstream probe (e.g., the second probe) in a dual probe recognition element may include a mismatch sequence comprising a target-specific code (among other elements).

Figure 13:
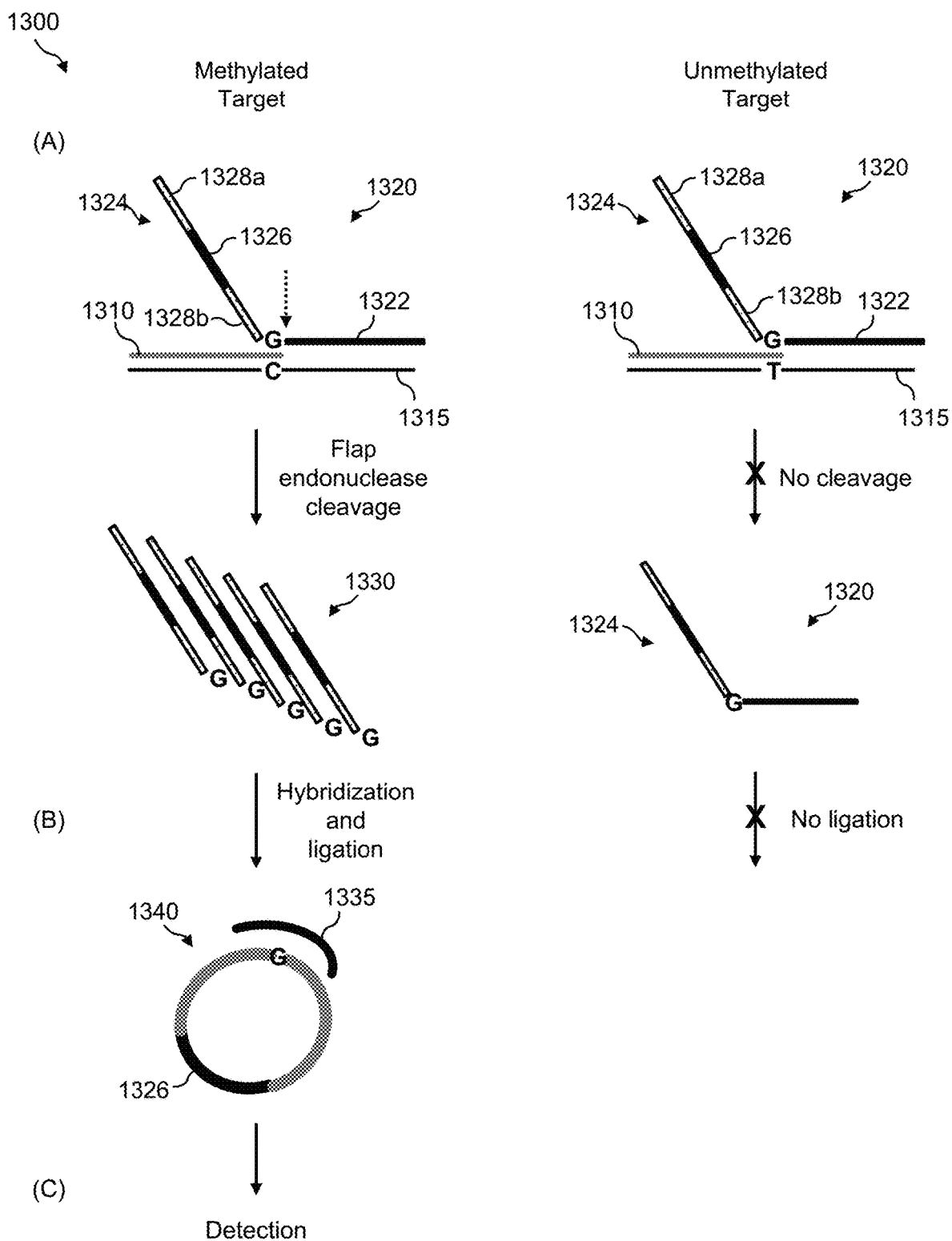
FIG. 13 is a schematic diagram illustrating an example of a process for detecting a target site of interest using an encoded dual-probe approach in combination with an endonuclease cleavage reaction.

FIG. 13 is a schematic diagram illustrating an example of a process 1300 for detecting a target site of interest using an encoded dual-probe approach in combination with an endonuclease cleavage reaction. In this example, the target site of interest is a methylated target site, however the steps of process 1300 may also be used in a genotyping assay as described below.

Sample preparation for input into process 1300 may, for example, be a performed as described for FIG. 12 starting from a whole blood sample (step 1210), performing the nucleic acid extraction, concentration, and/or purification processes (step 1215) including further processing the DNA sample in a bisulfite conversion reaction for analysis of the methylation status of DNA sequences in the sample, and transferring the nucleic acid sample to the analysis cartridge (step 1220). In FIG. 13, two different schemes (i.e., "Methylated Target" and "Unmethylated Target") are shown to highlight the different outcomes for detecting a methylated target that includes a target "C" versus an unmethylated target that includes a converted cytosine, referred to herein as "T", however both reactions may occur in a single sample and only the sequences that include the target site of interest are detected. Process 1300 may include, but is not limited to, the following steps.

In step A, a recognition event for each target in a set of targets is performed to yield a set of coded recognition element fragments. For example, an upstream probe 1310 and a downstream encoded probe 1320 are combined in a binding reaction with a target sequence 1315 and a flap endonuclease (not shown). Target sequence 1315 may include a methylated target site "C" or a converted nucleotide "T" in an unmethylated target sequence 1315.

Encoded probe 1320 may include a target-specific sequence 1322 and a mismatch sequence 1324. Mismatch sequence 1324 may include a code sequence 1326 that is associated with the target site of interest (i.e., "C" in target sequence 1315). Code sequence 1326 may be flanked by a pair of common adapters 528 (e.g., 1328a and 1328b). Common adapters 1328 may, for example, include splint hybridization sequences, sequencing primers, one or more amplification primer sequences, unique identifier sequences (UMIs) and sample indexes. Common adapters 1328 may be universal adapters that are common to all target-specific encoded probes 1320 in a set of target-specific encoded probes, thereby permitting multiplexed detection of multiple target sites in a sample. Sequences flanking code sequence 1326 may also be unique. Unique sequences flanking the code may, for example, be used to prevent the formation of concatemers.

Hybridization of upstream probe 1310 and encoded probe 1320 to the methylated target sequence 1315 with no mismatches forms a ternary nucleic acid complex that may be recognized and cleaved (indicated by the dashed arrow) by the flap endonuclease to release a recognition element fragment 1330. Recognition element fragment 1330 includes code sequence 1326 and the base that is complementary to the target site of interest, i.e., "G" in this example.

Hybridization of upstream probe 1310 and encoded probe 1320 to the unmethylated target sequence 1315 with a mismatch at the converted nucleotide site "T" does not form a ternary nucleic acid complex that may be recognized and cleaved by the flap endonuclease.

Multiple rounds of target recognition and fragment release may be performed to increase (i.e., amplify) the number of recognition element fragments 1330 released in the recognition event.

In step B, a transformation event for the set of recognition element fragments is performed to produce a set of circular modified recognition elements comprising target-associated codes. For example, a splint oligonucleotide 1335 that is complementary to sequences in common adapters 1328 may be hybridized to recognition element fragment 1330 thereby bringing the ends of the fragment into proximity for ligation to produce a circularized modified recognition element 1340.

Only when mismatch sequence 1324 is released by flap endonuclease cleavage (step A) to generate recognition element fragment 1330 can splint-mediated ligation occur.

In step C, a decoding event for each code of the set of codes is performed to identify the presence of the code or assign a probability that the code is present. The decoding event may include, for example, an amplification reaction wherein modified recognition element 1340 is amplified in a rolling circle amplification reaction to generate a nanoball detection product (not shown).

Figure 14:
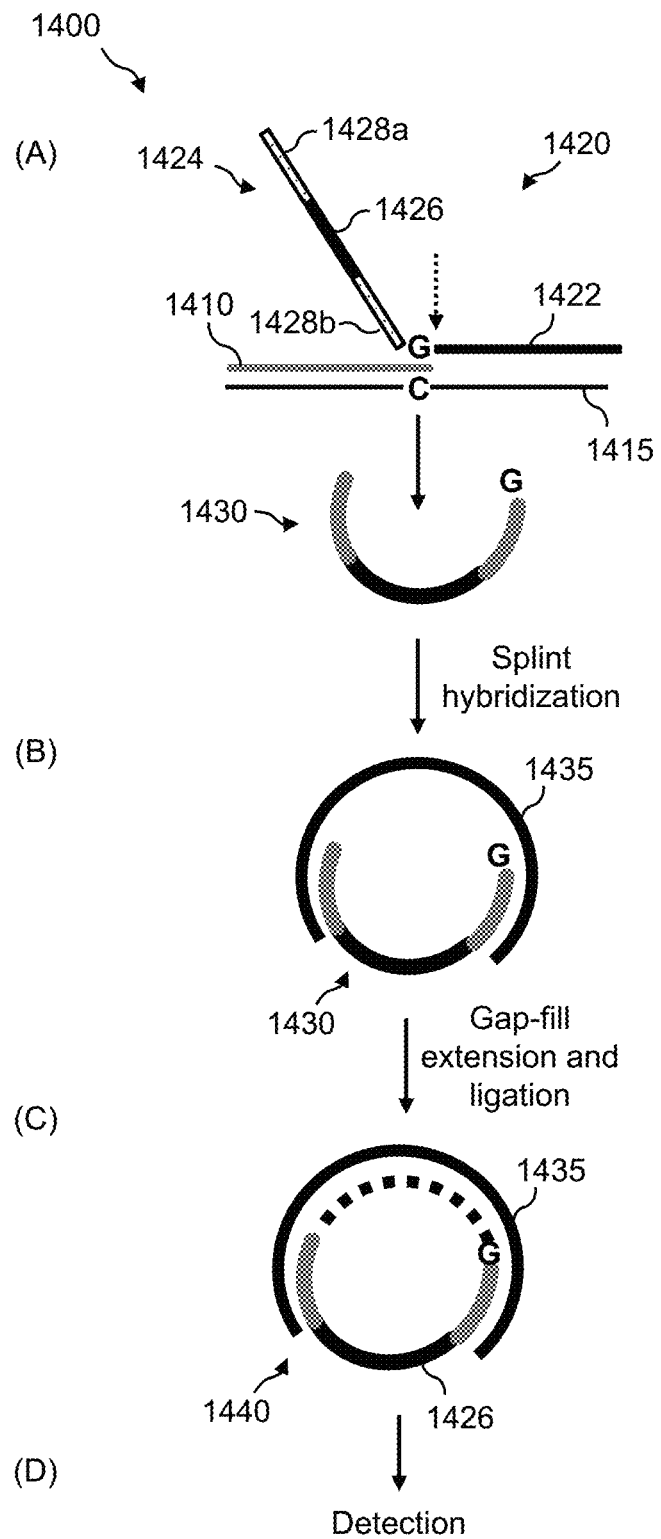
FIG. 14 is a schematic diagram illustrating a process for detecting a target site of interest using an encoded dual-probe and endonuclease cleavage in combination with gap-fill extension—ligation reaction.

In one embodiment of process 1300, a gap-fill extension reaction may be used in combination with a ligation reaction to generate a circularized modified recognition element for detection of a target site of interest. For example, FIG. 14 is a schematic diagram illustrating a process 1400 for detecting a target site of interest using an encoded dual-probe and endonuclease cleavage in combination with gap-fill extension-ligation reaction. The steps of process 1400 may, for example, be used in a methylation assay or a genotyping assay. Process 1400 may include, but is not limited to, the following steps.

In step A, a recognition event for each target in a set of targets is performed to yield a set of coded recognition element. For example, an upstream probe 1410 and a downstream encoded probe 1420 are combined in a binding reaction with a target sequence 1415 and a flap endonuclease (not shown). Encoded probe 1420 may include a target-specific sequence 1422 and a mismatch sequence 1424. Mismatch sequence 1424 may include a code sequence 1426 that is associated with the target site of interest (e.g., target site "C" in sequence 1415). Code sequence 1426 may be flanked by a pair of common regions 1428 (e.g., 1428a and 1428b). Common regions 1428 may, for example, include splint hybridization sequences (and optionally other elements) that are common to all encoded probes 1420, thereby permitting multiplexed detection of multiple target sites in a sample.

Hybridization of upstream probe 1410 and encoded probe 1420 to target sequence 1415 with no mismatches forms a ternary nucleic acid complex that may be recognized and cleaved (indicated by the dashed arrow) by the flap endonuclease to generate a released recognition element fragment 1430 as described above with reference to step A of FIG. 13. In this example, a single released recognition element fragment 1430 is shown, but any number of released fragments may be generated.

In step B and step C, a transformation event is performed to produce a set of circular modified recognition elements comprising target-associated codes. For example, in step B, a splint oligonucleotide 1435 that includes sequences that are complementary to sequences in common regions 1428 may be hybridized to recognition element fragment 1430 to provide a template for a gap-fill extension and ligation reaction. Splint oligonucleotide 1435 may, for example, include sequencing primer sites, one or more amplification primer sequences, unique identifier sequences (UMIs) and sample indexes that may be used in a subsequent detection process. Only when recognition element fragment 1430 is released by flap endonuclease cleavage can splint oligonucleotide 1435 hybridize to sequences in mismatch sequence 1430.

In step C, gap-fill extension and ligation reactions are performed to produce a circularized modified recognition element 1440.

In step D, a decoding event for each code of the set of codes is performed to identify the presence of the code or assign a probability that the code is present. A decoding event may include, for example, an amplification reaction wherein modified recognition element 1440 is amplified in a rolling circle amplification reaction to generate a nanoball detection product (not shown).

In some embodiments, a third oligonucleotide probe may be used to associate a code with the recognition element fragment to produce a hybrid complex comprising the recognition element fragment and the oligonucleotide probe. The third oligonucleotide probe may include the target-specific code and sequences for recognizing and hybridizing to the fragment released from the recognition element. In this case, the third oligonucleotide probe is the encoded probe.

In one embodiment, the third oligonucleotide probe may be a linear probe that includes a target-specific code and sequences for recognizing and hybridizing to a target-specific recognition element fragment (i.e., a mismatch sequence).

Figure 15:
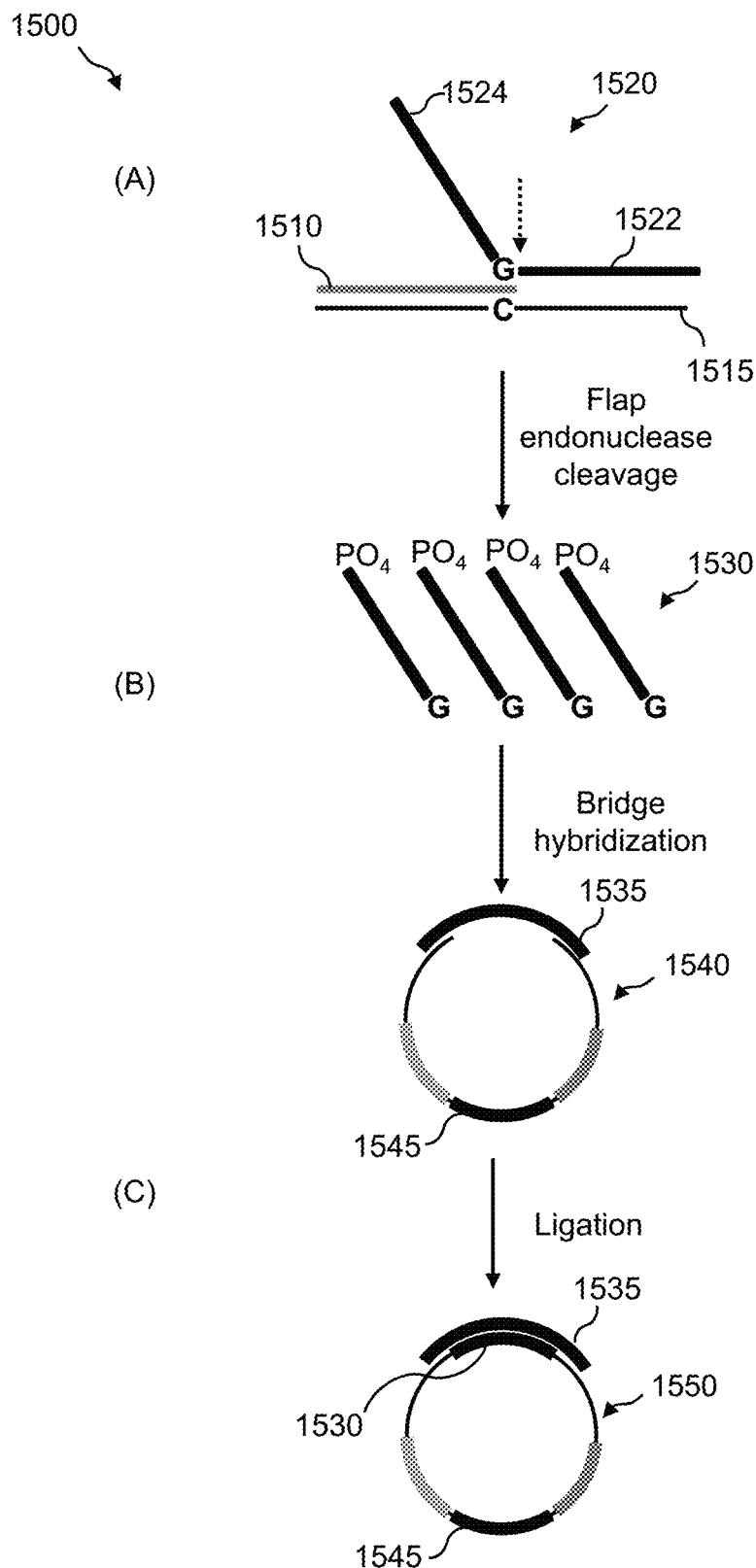
FIG. 15 is a schematic diagram illustrating an example of a process for detecting a target sequence using a third oligonucleotide probe to produce a modified recognition element comprising the code.

FIG. 15. is a schematic diagram illustrating an example of a process 1500 for detecting a target sequence using a linear third oligonucleotide probe to produce a hybrid complex comprising the recognition element fragment and the oligonucleotide probe. The steps of process 1500 may, for example, be used in a methylation assay or a genotyping assay.

Sample preparation for input into process 1500 may, for example, be performed as described for FIG. 12 starting from a whole blood sample (step 1210), performing the nucleic acid extraction, concentration, and/or purification processes (step 1215), and transferring the nucleic acid sample to the analysis cartridge (step 1220). Process 1500 may include, but is not limited to, the following steps.

In step A, a recognition event is performed for each target in a set of targets to yield a set of released recognition element fragments. For example, an upstream probe 1510 and a downstream probe 1520 are combined in a binding reaction with a target sequence 1515 and a flap endonuclease (not shown). Downstream probe 1520 may include a target-specific sequence 1522 and a mismatch sequence 1524. In this example, target sequence 1515 includes a target site of interest that is a "C" nucleotide.

Hybridization of upstream probe 1510 and downstream probe 1520 to target sequence 1515 with no mismatches forms a ternary nucleic acid complex that may be recognized and cleaved (indicated by the dashed arrow) by the flap endonuclease to release a recognition element fragment 1530. Recognition element fragment sequence 1530 includes mismatch sequence 1524 and the base complementary to the target site of interest, i.e., "G" in this example.

Multiple rounds of target recognition and fragment release may be performed to increase (i.e., amplify) the number of recognition element fragment 1530 released in the recognition event.

In step B and step C, a transformation event is performed to produce a set of modified recognition elements comprising hybrid complexes that include target-associated codes. In the transformation event, a bridge oligonucleotide may be used to mediate the ligation of a recognition element fragment to a coded third oligonucleotide probe to form a circular hybrid complex (i.e., modified recognition element) comprising the recognition element fragment and the third oligonucleotide probe. For example, a bridge oligonucleotide 1535 that includes sequences complementary to a coded third oligonucleotide probe 1540 and recognition element fragment 1530 may be used in a hybridization reaction to bring the ends of the third oligonucleotide probe and the recognition element fragment into proximity for ligation. In this example, a single set of recognition element fragments 1530, a coded third probe 1540, and a bridge oligonucleotide 1535 are shown, but any number of released fragment sets, coded third probes, and bridge oligonucleotides may be used.

The ligation of recognition element fragment 1530 to coded third probe 1540 yields a circularized hybrid complex 1550 comprising the code.

A decoding event (not shown) for circularized hybrid complex 1550 may include, for example, a rolling circle amplification event to generate a nanoball detection product as described above with reference to FIG. 13 and FIG. 14.

In one embodiment, the third oligonucleotide probe may be a circular probe that includes a target-specific code and sequences for recognizing and hybridizing to a target-specific recognition element fragment (i.e., a mismatch sequence).

Figure 16:
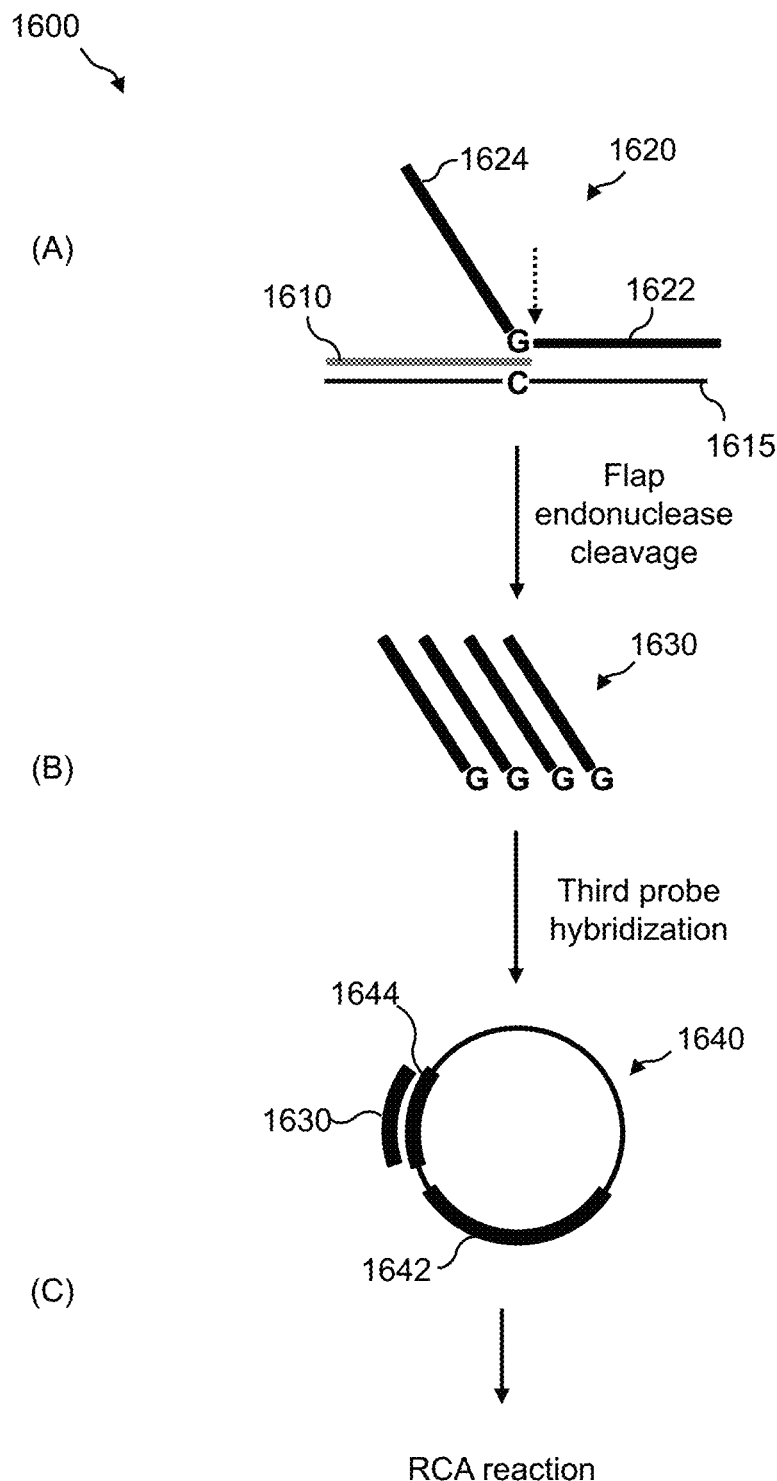
FIG. 16 is a schematic diagram illustrating an example of a process for detecting a target sequence using a circular third oligonucleotide probe to produce a modified recognition element comprising the code.

FIG. 16 is a schematic diagram illustrating an example of a process 1600 for detecting a target sequence using a circular third oligonucleotide probe to produce a circularized hybrid complex (i.e., modified recognition element) comprising the code. The steps of process 1600 may, for example, be used in a methylation assay or a genotyping assay.

In step A, a recognition event is performed for each target in a set of targets to yield a set of released recognition element fragments. For example, an upstream probe 1610 and a downstream probe 1620 are combined in a binding reaction with a target sequence 1615 and a flap endonuclease (not shown). Downstream probe 1620 may include a target-specific sequence 1622 and a mismatch sequence 1624. Mismatch sequence 11624 may include a sequence that is complementary to a pre-circularized third oligonucleotide probe comprising a target-associated code. In this example, target sequence 1615 includes a target site of interest that is a "C" nucleotide.

Hybridization of upstream probe 1610 and downstream probe 1620 to target sequence 1615 with no mismatches forms a ternary nucleic acid complex that may be recognized and cleaved (indicated by the dashed arrow) by the flap endonuclease to release a recognition element fragment 1630. Recognition element fragment sequence 1630 includes mismatch sequence 1624 and the base complementary to the target site of interest, i.e., "G" in this example.

Multiple rounds of target recognition and fragment release may be performed to increase (i.e., amplify) the number of recognition element fragment 1630 released in the recognition event.

In step B and step C, a transformation event for the set of recognition element fragments is performed to produce a set of circular modified recognition elements comprising hybrid complexes that include target-associated codes. In the transformation event, the recognition element fragment may be hybridized to a pre-circularized third oligonucleotide probe comprising a target-associated code and used to prime an RCA reaction to generate a nanoball detection product comprising the amplified code. For example, recognition element fragment 1630 may be hybridized to a pre-circularized third oligonucleotide probe 1640. Oligonucleotide probe 1640 includes, for example, a code sequence 1642 and a hybridization sequence 1644 that is complementary to recognition element fragment 1630. An RCA reaction using recognition element fragment 1630 as a primer sequence is then performed to generate the nanoball product (not shown) comprising the amplified target-associated code. In one example, Phi29 DNA polymerase may be used in the RCA reaction.

Unreacted (i.e., full-length) downstream probe 1620 that includes mismatch sequence 1624 may also hybridize to pre-circularized third probe 1640. In this case, 3' probe overhang of the unreacted probe may prevent priming of the RCA reaction. To prevent Phi29 exonuclease activity from degrading the 3' terminus of any unreacted probes different strategies may be used. In one example, an exo (−) Phi29 polymerase may be used in the RCA reaction. In another example, probes with 3' termini that are resistant to exonuclease degradation may be used (e.g., by including phosphorothioated nucleotides, alkyl linkers, or inverted bases).

In this example, a single set of recognition element fragments 1630 and pre-circularized third probe 1640 are shown, but any number of released fragment sets and encoded third probes may be used to generate a set of nanoballs for detection of the set of targets.

Single Probe Recognition Element

In some embodiments of workflow 1200, the recognition event (step 1225) may use a recognition element comprising a single probe and a PCR amplification/5' endonuclease cleavage reaction to release a recognition element fragment associated with the target.

In some embodiments, a single probe recognition element may include a mismatch sequence that does not include a code and a second oligonucleotide probe comprising a code may be used to associate a code with the target. The coded oligonucleotide probe may include, for example, sequences for recognizing and hybridizing to the fragment released from the recognition element and the target-specific code.

In one embodiment, the coded second oligonucleotide probe may be a pre-circularized probe that includes a target-specific code and sequences for recognizing and hybridizing to a target-specific recognition element fragment (i.e., the mismatch sequence).

Figure 17:
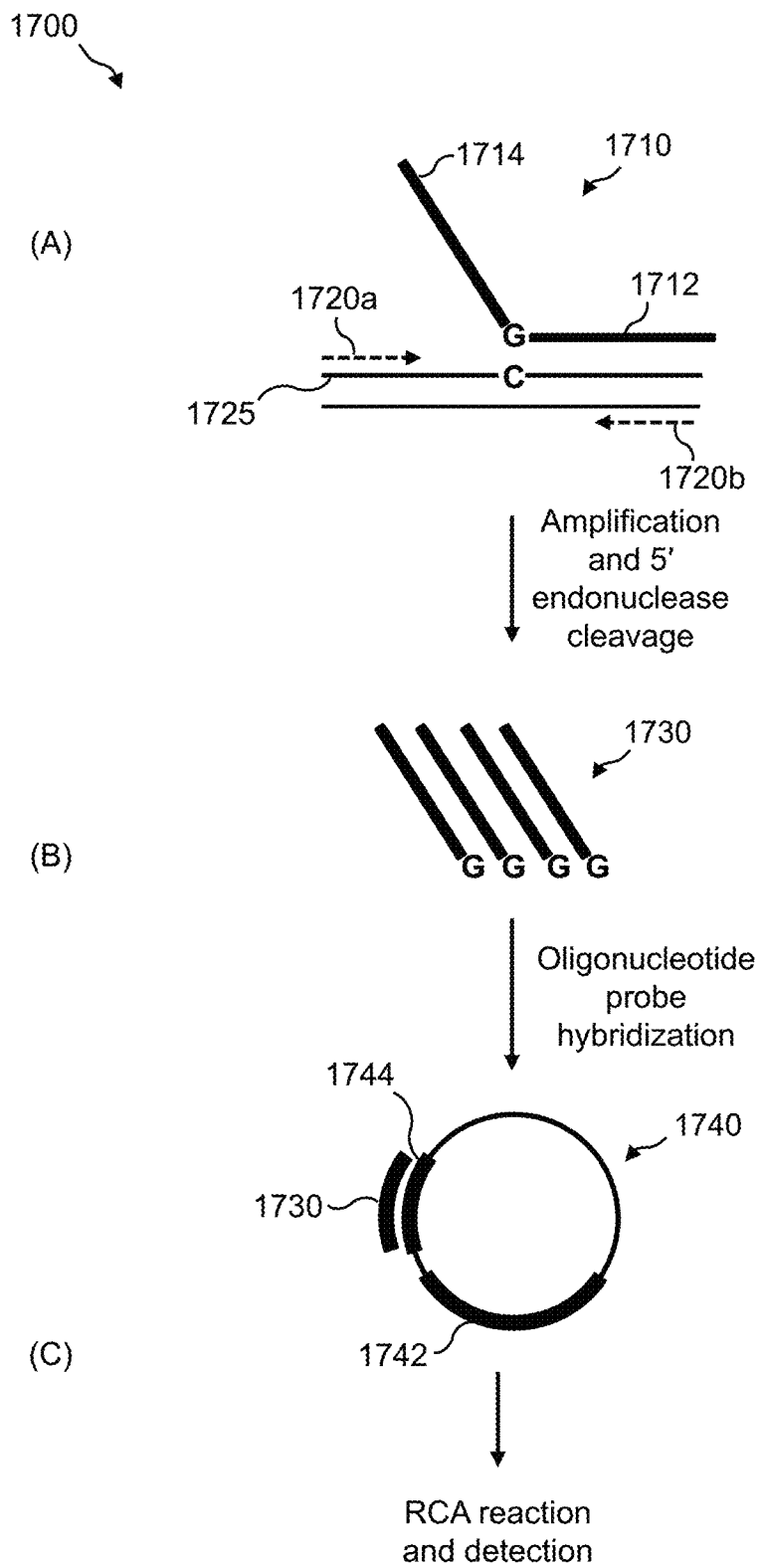
FIG. 17 is a schematic diagram illustrating an example of a process for detecting a target of interest using a pre-circularized encoded probe and a PCR amplification/5' endonuclease cleavage reaction.

FIG. 17 is a schematic diagram illustrating an example of a process 1700 for detecting a target of interest using a pre-circularized single probe recognition element and a PCR amplification/5' nuclease cleavage reaction. The steps of process 1700 may, for example, be used in a methylation assay or a genotyping assay.

Sample preparation for input into process 1700 may, for example, be performed as described for FIG. 12 starting from a whole blood sample (step 1210), performing the nucleic acid extraction, concentration, and/or purification processes (step 1215), and transferring the nucleic acid sample to the analysis cartridge (step 1220). Process 1700 may include, but is not limited to, the following steps.

In step A, a recognition event is performed for each target in a set of targets to yield a set of released recognition element fragments. For example, a single probe 1710 is combined in an amplification reaction with a forward primer 1720*a* and a reverse primer 1720*b* that are specific for a target sequence 1725 of interest, and a DNA polymerase having 5' nuclease activity (e.g., Taq DNA polymerase). Single probe 1710 may include a target-specific sequence 1712 and a mismatch sequence 1714. In this example, target sequence 1715 includes a target site of interest that is a "C" nucleotide.

Hybridization of single probe 1710 to target sequence 1715 forms a ss-ds forked structure that includes a double-stranded (i.e., hybridized) region comprising target sequence 1715 and a single-stranded region that includes the mismatch sequence 1714.

During amplification, the structure-specific 5' nuclease activity of the DNA polymerase cleaves the 5' terminus of the hybridized probe and releases the non-complementary mismatch sequence 1714 to yield a recognition element fragment 1730 that is associated with the target. Recognition element fragment 1730 may include mismatch sequence 1714 and the base that is the complement of the target site of interest, i.e., a "G". The site of cleavage may also be 5' or 3' of the matched base.

Multiple cycles of PCR amplification/5' nuclease cleavage may be performed to increase the number of recognition element fragments 1730 released in the recognition event.

In step B and step C, a transformation event for the set of recognition element fragments is performed to produce a set of circular modified recognition elements comprising hybrid complexes that include target-associated codes. In the transformation event, the recognition element fragment may be hybridized to a pre-circularized coded oligonucleotide probe comprising a target-associated code and used to prime an RCA reaction to generate a nanoball detection product comprising the amplified code as describe above with reference to FIG. 16. For example, recognition element fragment 1730 may be hybridized to a pre-circularized oligonucleotide probe 1740. Oligonucleotide probe 1740 includes, for example, a code sequence 942 and a hybridization sequence 1744 that is complementary to recognition element fragment 1730. An RCA reaction using recognition element fragment 1730 as a primer sequence is then performed to generate the nanoball detection product (not shown) comprising the amplified target-associated code.

In one embodiment of process 1700, the coded oligonucleotide probe may be a linear probe that includes a target-specific code and sequences for recognizing and hybridizing to a target-specific recognition element fragment (i.e., a mismatch sequence). In this case, in the transformation event, a bridge oligonucleotide may be used to mediate the ligation of the recognition element fragment to the coded oligonucleotide probe to form a circular hybrid complex (i.e., modified recognition element) comprising the recognition element fragment and the coded oligonucleotide probe as described above with reference to FIG. 15.

In some embodiments, a single probe recognition element may include a mismatch sequence comprising a target-specific code (among other elements). In this case, a recognition element fragment may be released from the single probe as described in step A of FIG. 9 and the transformation event may include a hybridization and ligation reaction as described above with reference to FIG. 13 and FIG. 14.

Methylation Assay

A target site of interest may be interrogated using a dual-probe approach in combination with a flap endonuclease cleavage reaction to detect the methylation status of a target site.

In some embodiments, a methylation assay may include: (i) a bisulfite conversion reaction to convert non-methylated cytosine to thymine (C→T); (ii) a recognition event, in which a target is uniquely recognized and bound by a dual probe recognition element to form a ternary nucleic acid complex that may be cleaved to release a fragment from the recognition element that is associated with the target; (iii) a transformation event, in which a molecular transformation of the recognition element fragment produces a modified recognition element comprising a code; and (iv) a decoding event, that uses the code as a surrogate for detection of the target, e.g., by identifying the presence of the code (and optionally other elements).

In a methylation assay using a dual probe recognition element, the recognition event and the transformation event may be performed as described above with reference to FIG. 13, FIG. 14, FIG. 15, or FIG. 16.

A target site of interest may be interrogated using a single probe recognition element in combination with a PCR amplification/5' endonuclease cleavage reaction to detect the methylation status of a target site.

In some embodiments, a methylation assay may include:
(i) a bisulfite conversion reaction to convert non-methylated cytosine to thymine (C→T);
(ii) a recognition event, in which a target is uniquely recognized and bound by a single probe recognition element to form a ss-ds forked structure that may be cleaved during a PCR amplification reaction to release a fragment from the recognition element that is associated with the target;
(iii) a transformation event, in which a molecular transformation of the recognition element fragment produces a modified recognition element comprising a code; and
(iv) a decoding event that uses the code as a surrogate for detection of the target, e.g., by identifying the presence of the code (and optionally other elements).

In a methylation assay using a single probe recognition element, the recognition event may be performed as describe above with reference to FIG. 17 and the transformation event may be performed as described above with reference to FIG. 13, FIG. 14, FIG. 15, or FIG. 17.

Genotyping Assay

A target site of interest may be interrogated using a dual-probe approach in combination with a flap endonuclease cleavage reaction to detect a single nucleotide variant (SNV) of interest. In one example, the single nucleotide change may be a single nucleotide polymorphism (SNP).

In some embodiments, a genotyping assay may use a dual probe in combination with a flap endonuclease cleavage reaction as describe above with reference to FIG. 13, FIG. 14, FIG. 15, or FIG. 16.

In some embodiments, a dual probe genotyping assay may include: (i) a first probe (i.e., upstream probe) that includes a sequence that is complementary to a sequence upstream of a target site, wherein the first probe ends with a non-matching base at the target site of interest; and (ii) a pool of four second probes (i.e., downstream probes), wherein each downstream probe includes a common target gene-specific code and ends with a terminal "N" nucleotide that is either an A, G, C, or T that may be complementary to a target site of interest. In this case, four different second probes are used in the genotyping assay, wherein each probe includes the code and ends with a 3'-base of either A, C, G, or T.

In one embodiment, a genotyping assay may include: (i) a recognition event, in which a target is uniquely recognized and bound by a dual probe recognition element to form a ternary nucleic acid complex that may be cleaved to release a fragment from the recognition element, wherein the recognition element fragment is associated with the target and ends with a 3'-base that corresponds to the variant of interest;
(ii) a transformation event, in which a molecular transformation of the recognition element fragment produces a modified recognition element comprising a code; and (iii) a decoding event, that uses the code as a surrogate for detection of the target, e.g., by identifying the presence of the code (and optionally other elements).

In some embodiments, a dual probe genotyping assay, may include: (i) a first probe (i.e., upstream probe) that includes a sequence that is complementary to a sequence upstream of the target site, wherein the first probe ends with a non-matching base at the variant of interest; (ii) a pool of four second probes (i.e., downstream probes), wherein each downstream probe ends with a terminal "N" nucleotide (N=A, G, C, or T) that may be complementary to a target site of interest; and (iii) a pool of four secondary oligonucleotides, wherein each secondary oligonucleotide includes a complement (N') to an N nucleotide in the pool of downstream probes and a base identifier sequence. In this case, the base identifier sequence may be used to discriminate and identify the nucleotide present at the target site.

Figure 18A:
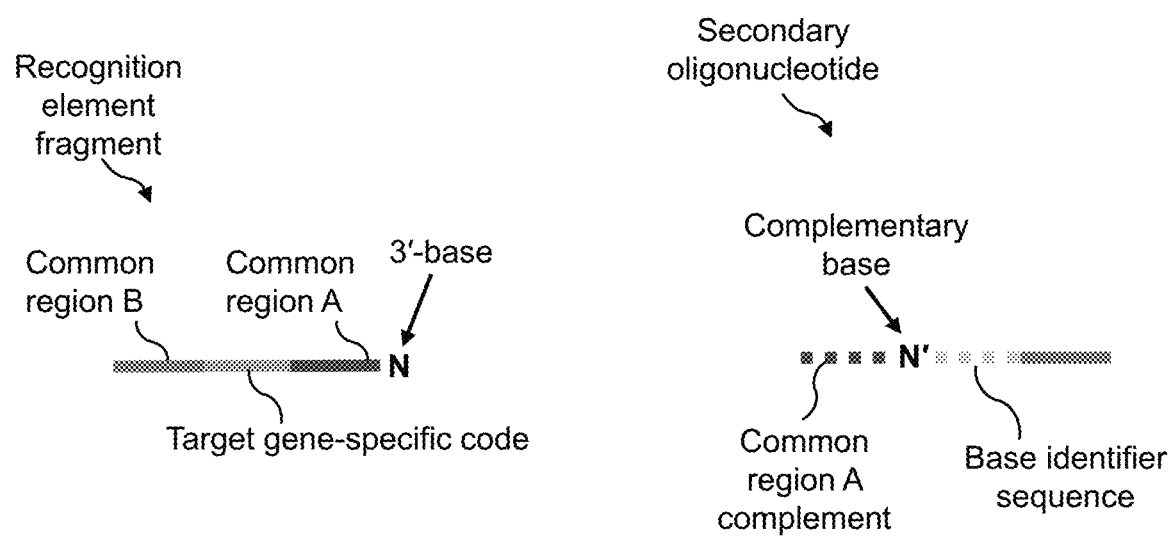
FIG. 18A is a schematic diagram illustrating an example of a recognition element fragment and a secondary oligonucleotide pair that may be used in a genotyping assay to detect an allele specific variant.
Figure 18B:
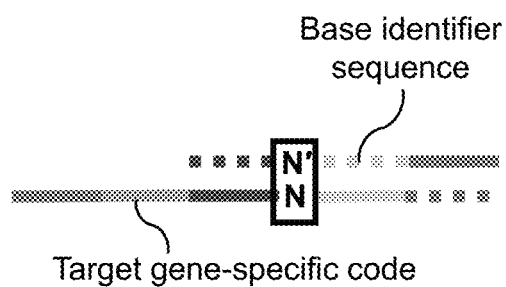
FIG. 18B is a schematic diagram showing a detectable product using the recognition element fragment and secondary oligonucleotide pair in the genotyping assay to detect an allele specific variant of FIG. 18A.

FIGS. 18A and 18B is a schematic diagram illustrating an example of a recognition element fragment and a secondary oligonucleotide pair that may be used in a genotyping assay to detect an allele specific variant and shows a process of generating a detectable product. In this example, a recognition element fragment that includes a 3'-base "N" would be generated in a dual-probe flap endonuclease assay only if a target site with a "N" variant of interest was interrogated. The recognition element fragment may further include a target gene-specific code that is flanked by two common regions A and B. To generate a detectable product, a secondary oligonucleotide may be used. In this example, the secondary oligonucleotide includes a base N' that is complementary to a terminal 3'-base (N) on the recognition element fragment. The secondary oligonucleotide may further include a base identifier sequence and sequences that are complementary to the common region A. The base identifier sequence may be used in the detection process to identify the variant detected. The secondary oligonucleotide may also include, for example, a flow cell adapter for code identification performed on a flow cell, or a splint sequence if an RCA reaction is used.

Figure 19:
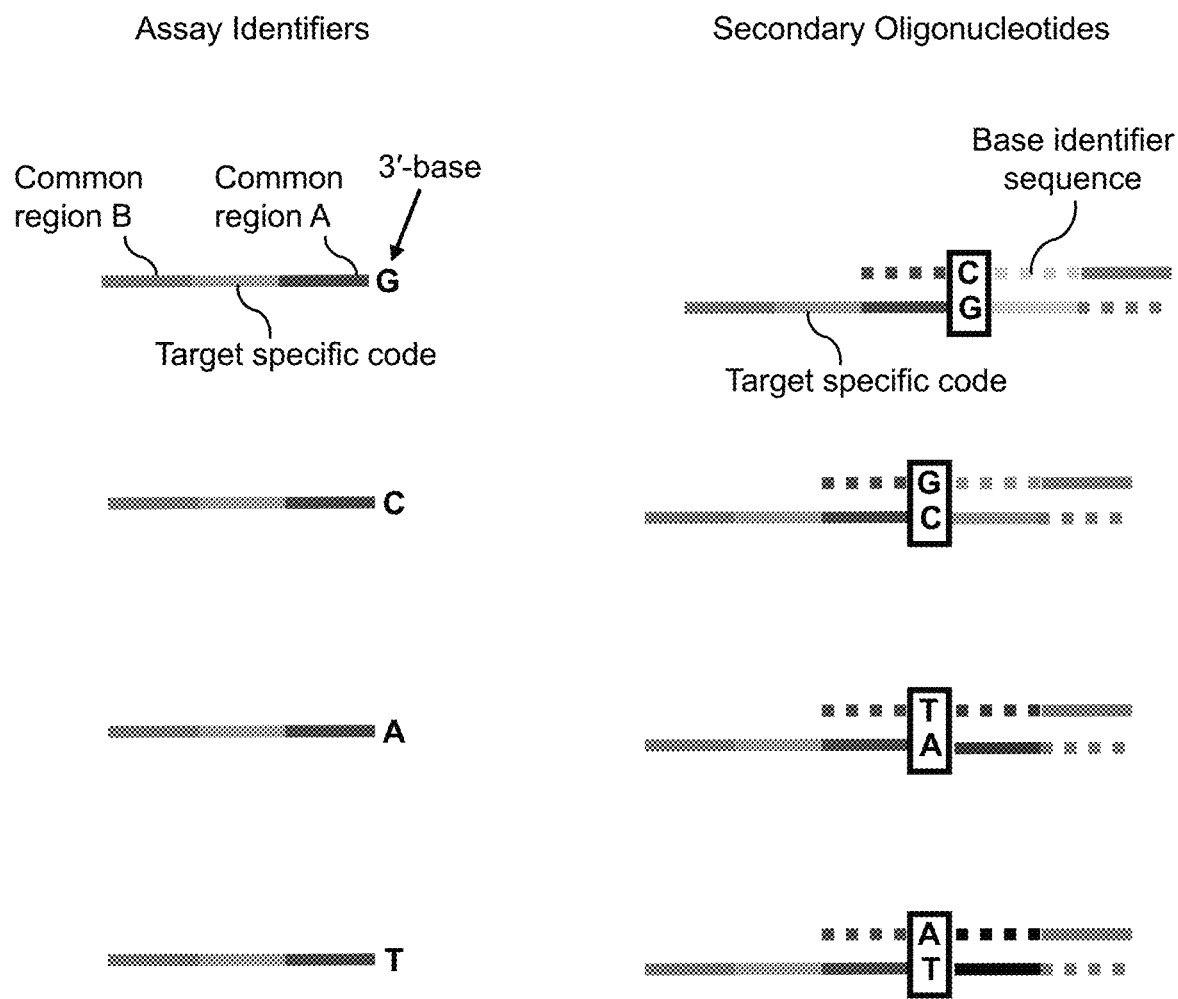
FIG. 19 is a schematic diagram illustrating an example of genotyping assay wherein a pool of four secondary oligonucleotides may be used to detect the four possible nucleotide usages at a target site of interest.

FIG. 19 is a schematic diagram illustrating an example of genotyping assay wherein a pool of four secondary oligonucleotides may be used to detect the four possible nucleotide usages at a target site of interest. For example, a possible assay identifier (i.e., recognition element fragment) may include at the terminal 3'-base a G, C, A, or T. The pool of four secondary oligonucleotides may include a sequence that is the complement to the common region A, either a 3'-base complement C, G, T, or A, and an associated base identifier sequence.

In the decoding event, the target gene-specific code and base identifier may, for example, be sequenced to identify the presence of, or the probability of the presence of, the code associated with the target allele and the variant usage at the targeted site. In one example, nanoball sequencing may be used identify the presence of the code associated with the target allele and the variant usage at the targeted site. In another example, sequencing by hybridization may be used to identify the presence of, or the probability of the presence of, the code associated with the target allele and the variant usage at the targeted site.

In some embodiments, a genotyping assay may use a single probe in combination with a PCR amplification/5' endonuclease cleavage reaction as describe above with reference to FIG. 9.

For example, a genotyping assay may include: (i) a recognition event, in which a target is uniquely recognized and bound by a single probe recognition element to form a fork-like structure that may be cleaved during a PCR amplification reaction to release a fragment from the recognition element that is associated with the target; (ii) a transformation event, in which a molecular transformation of the recognition element fragment produces a modified recognition element comprising a code; and (iii) a decoding event, that uses the code as a surrogate for detection of the target, e.g., by identifying the presence of the code (and optionally other elements).

In a genotyping assay using a single probe recognition element, the recognition event may be performed as describe above with reference to FIG. 17 and the transformation event may be performed as described above with reference to FIG. 13, FIG. 14, FIG. 15, or FIG. 17. Methods of conducting an encoded assay In some embodiments, the disclosure provides methods of conducting an encoded assay for detecting a nucleic acid target in a composition.

In one embodiment, the method uses a dual probe recognition element that includes a mismatch sequence comprising a code. The method may include the steps of:
- (i) providing a composition potentially comprising the nucleic acid target;
- (ii) binding a dual probe recognition element to the nucleic acid target, if present, to form a cleavable ternary nucleic acid complex, wherein
  - a. the dual probe recognition element includes two probes;
  - b. a probe of the dual probe recognition element includes a mismatch sequence comprising a code; and
  - c. binding the dual probe recognition element to the nucleic acid target with no mismatches causes the mismatch sequence to form a cleavable ternary nucleic acid complex;
  - d. binding the dual probe recognition element to a nucleic acid with mismatches does not cause the mismatch sequence to form a cleavable ternary nucleic acid complex;
- (iii) cleaving the ternary nucleic acid complex, if present, to release a recognition element fragment comprising the mismatch sequence and the code; and
- (iv) using the recognition element fragment, if present, to determine the presence of the code;
- wherein the presence of the code indicates the presence of the nucleic acid target in the composition, and absence of the code indicates absence of the nucleic acid target in the composition.

In one embodiment, the method uses a dual probe recognition element that does not include a mismatch sequence comprising a code. The method may include the steps of:
- (i) providing a composition potentially comprising the nucleic acid target;
- (ii) binding a dual probe recognition element to the nucleic acid target, if present, to form a cleavable ternary nucleic acid complex, wherein
  - a. the dual probe recognition element includes two probes;
  - b. a probe of the dual probe recognition element includes a mismatch sequence, wherein the mismatch sequence does not comprise a code; and
  - c. binding the dual probe recognition element to the nucleic acid target with no mismatches causes the mismatch sequence to form a cleavable ternary nucleic acid complex;
  - d. binding the dual probe recognition element to a nucleic acid with mismatches does not cause the mismatch sequence to form a cleavable ternary nucleic acid complex;
- (iii) cleaving the ternary nucleic acid complex, if present, to release a recognition element fragment comprising the mismatch sequence;
- (iv) binding the recognition element fragment to a complementary oligonucleotide probe, wherein
  - a. the oligonucleotide probe comprises a code; and
  - b. binding the recognition element fragment to the oligonucleotide probe produces a hybrid complex comprising the recognition element fragment and the oligonucleotide probe;
- (v) using the hybrid complex, if present, to determine the presence of the code;
- wherein the presence of the code indicates the presence of the nucleic acid target in the composition, and the absence of the code indicates absence of the nucleic acid target in the composition.

In some embodiments, the disclosure provides methods of conducting an encoded assay for detecting a set of nucleic acid targets in a composition that includes two or more nucleic acid targets.

In one embodiment, the method uses a dual probe recognition element that includes a mismatch sequence comprising a code. The method may include the steps of:
- (i) providing a composition potentially comprising a set of two or more nucleic acid targets;
- (ii) binding members of a set of two or more dual probe recognition elements to members of the set of two or more nucleic acid targets to form ternary nucleic acid complexes, wherein the set of two or more dual probe recognition elements includes members having affinity for different nucleic acid targets of the two or more nucleic acid targets;
- (iii) cleaving the ternary nucleic acid complexes to release recognition element fragments, each comprising a mismatch sequence and a code unique to a nucleic acid target; and
- (iv) using the recognition element fragments to determine the presence of each code;
- wherein the presence of a code unique to a nucleic acid target in the composition indicates the presence of the nucleic acid target in the composition, and thereby permits each unique nucleic acid target to be distinguished from other nucleic acid targets of the composition.

In one embodiment, the method uses a dual probe recognition element that does not include a mismatch sequence comprising a code. The method may include the steps of:
- (i) providing a composition potentially comprising a set of two or more nucleic acid targets;
- (ii) binding members of a set of two or more dual probe recognition elements to members of the set of two or more nucleic acid targets to form ternary nucleic acid complexes, wherein the set of two or more dual probe recognition elements includes members having affinity for different nucleic acid targets of the two or more nucleic acid targets;
- (iii) cleaving the ternary nucleic acid complex, if present, to release a recognition element fragment comprising the mismatch sequence;
- (iv) binding the recognition element fragment to a set of two or more complementary oligonucleotide probes to form hybrid complexes, wherein each member of the set of two or more oligonucleotide probes comprises a code unique to a nucleic acid target;

(v) using the hybrid complexes, if present, to determine the presence of the code;

wherein the presence of the code unique to a nucleic acid target in the composition indicates the presence of the nucleic acid target, and thereby permits each unique nucleic acid target to be distinguished from other nucleic acid targets of the composition.

Samples

Examples of tissues from which nucleic acid may extracted using the techniques described herein may include solid tissue, lysed solid tissue, fixed tissue samples, whole blood, plasma, serum, dried blood spots, buccal swabs, other forensic samples, fresh or frozen tissue, biopsy tissue, organ tissue, cultured or harvested cells, and bodily fluids.

In various embodiments, a sample may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes.

Targets

Targets may include any biological markers. Examples include biological markers for screening or diagnosing cancer. In one embodiment, targets include a panel of methylation markers for diagnosing cancer. Examples of panels of probes which may be targeted are set for the in WO2019195268, entitled "Methylation markers and targeted methylation probe panels," and WO2020069350A1, entitled "Methylation markers and targeted methylation probe panel," the entire disclosures of which (including without limitation the sequence listings) are incorporated herein by reference. Targets may be obtained from biopsies, circulating nucleic acid samples, or nucleic acids from other samples.

In one embodiment, targets include a panel of single nucleotide variants (SNV) for diagnosing cancer.

Diagnostics and Screening

The methods of the invention may be used for screening or diagnosing a subject for a disease, such as cancer or for selecting a therapy for treating a disease, such as selecting a therapy for treating a cancer.

Examples

Figure 20A:
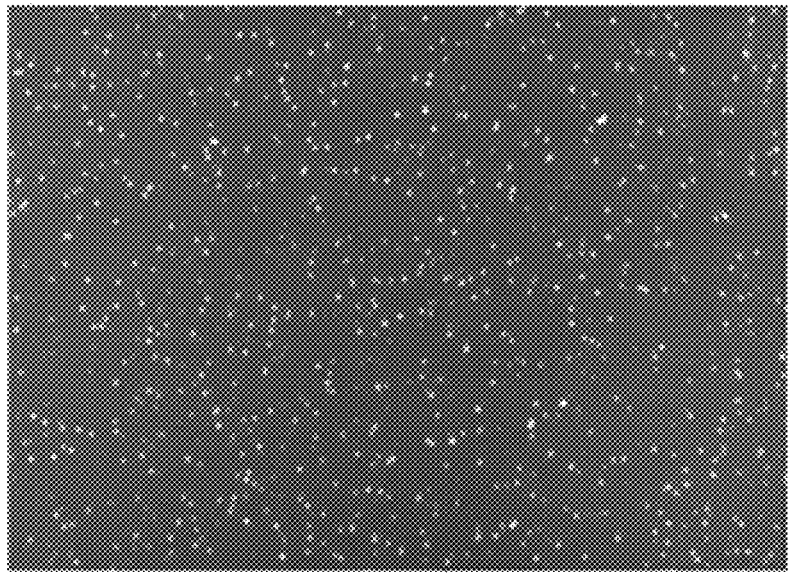
FIG. 20A is a photo showing the density, size and uniformity of nanoballs generated in an RCA reaction performed on a polylysine-coated MiSeq flow cell.
Figure 20B:
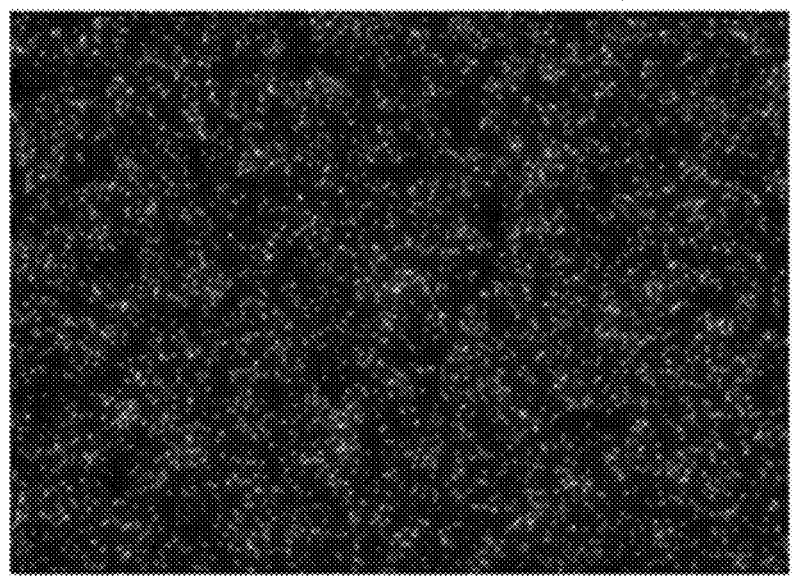
FIG. 20B is a photo showing the density, size and uniformity of nanoballs generated in an RCA reaction performed on a polylysine-coated microplate.

FIG. 20A and FIG. 20B are photos showing the density, size and uniformity of nanoballs generated in an RCA reaction performed on a polylysine-coated MiSeq flow cell or on a polylysine-coated microplate, respectively. In this example, RCA was performed as follows: RCA on Polylysine surface: MiSeq flowcells were washed to remove surface coatings before 0.01% poly-lysine (PLL) was applied, incubated for 30 minutes, washed and dried. PLL-coated microplates are assembled using purchased PLL-coated glass coverslips and plastic multi-well chambers. RCA reactions are prepared normally in tubes on ice containing phi29 polymerase, buffer, a primer and ligated purified probes, and the complete reaction is applied to the flowcell or microplate. The flowcell or microplate was incubated at 30 C for 6-8 hours, and then washed with Tris/EDTA to stop the reaction. NBs were detected with different methods. The NBs on the MiSeq flowcell were detected by SBS using a MiSeq instrument while the NBs on the microplate surface were hybridized with a fluorophore-labeled oligonucleotide probe and imaged on a Lionheart automated microscope.

Figure 21A:
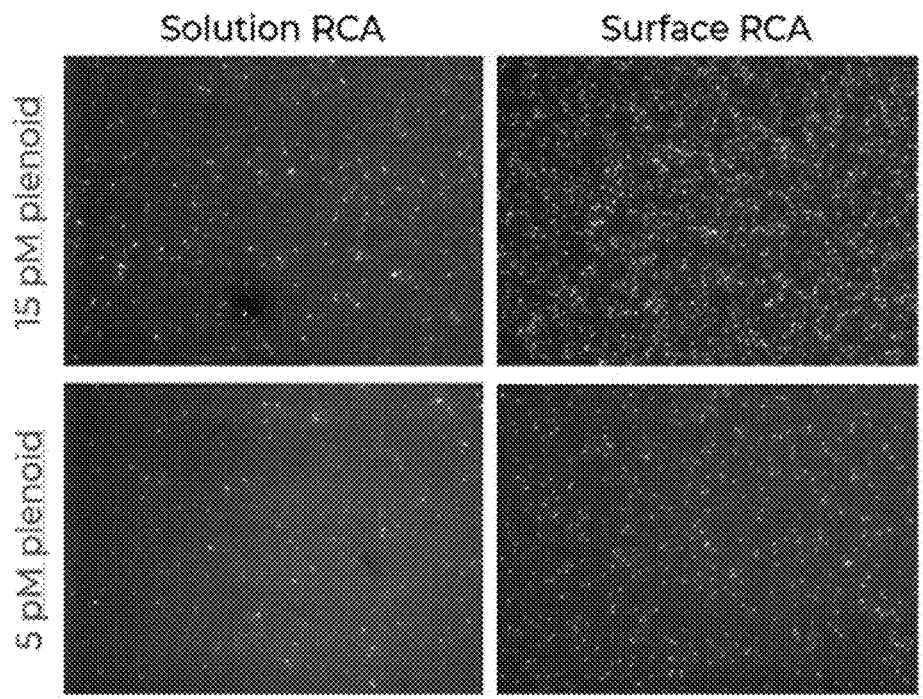
FIG. 21A is a panel of photos of a comparison of nanoballs generated on a polylysine surface to nanoballs absorbed to a surface after an RCA solution reaction.
Figure 21B:
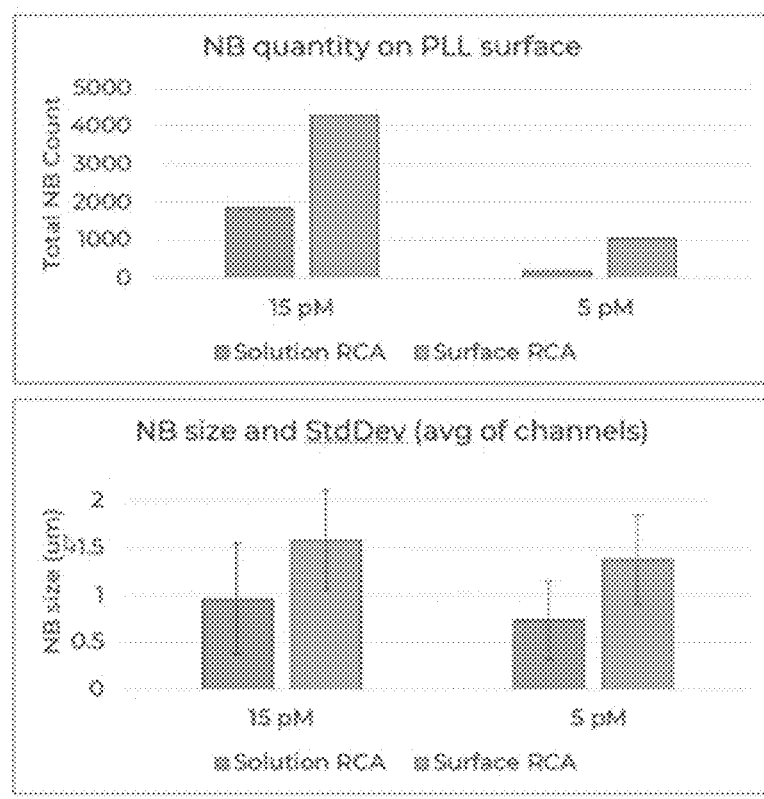
FIG. 21B is a pair of plots of a comparison of nanoballs generated on a polylysine surface to nanoballs absorbed to a surface after an RCA solution reaction.

FIGS. 21A and 21B are panel of photos and a pair of plots, respectively, of a comparison of nanoballs generated on a polylysine (PLL) surface to nanoballs absorbed to a surface after an RCA solution reaction. In this example, surface vs solution RCA reactions were performed as follows: RCA reactions were prepared normally in tubes on ice containing phi29 polymerase, buffer, a primer and either 5 pM or 15 pM ligated purified probes. A fraction of the RCA reactions was applied to different wells of a microplate with a PLL-coated bottom surface, and then the plate was incubated at 30 C for 4 hours. The remainder of the RCA reactions in tubes were placed at 30 C for 4 hours. The RCA reactions in the microplate were stopped by washing with Tris/EDTA. EDTA and TBS were added to the RCA reactions in tubes and fluorophore-labeled oligonucleotide probes were also added before the reactions were applied to the PLL-coated microplate and allowed to absorb for 1 hr. Fluorophore-labeled oligonucleotide probes in TBS were also applied to the wells in which the RCA was performed in the microplate for specific detection of NBs. After washing, all wells were imaged on a Lionheart automated microscope and analyzed with Lionheart software.

Soft Decoding

A soft decoding process may use decoding by hybridization (DBH).

Figure 22:
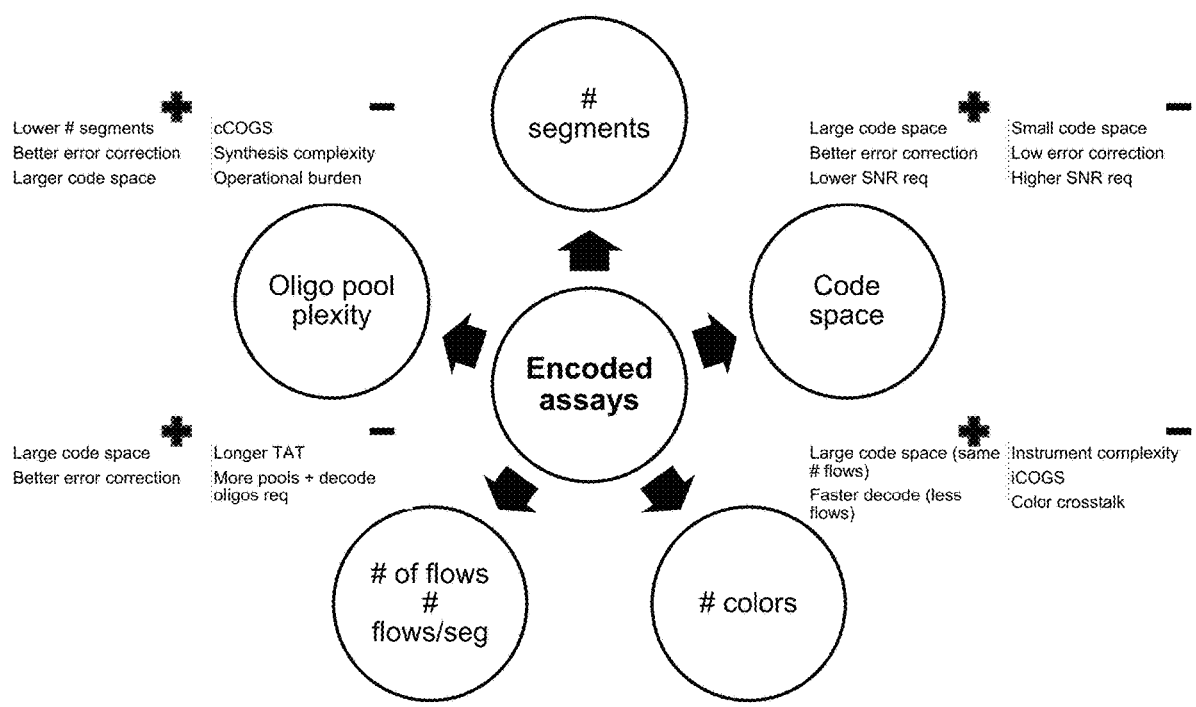
FIG. 22 is a schematic diagram illustrating some of the factors considered in the design of an encoded probe for decoding by hybridization.

FIG. 22 is a schematic diagram illustrating some of the factors considered in the design of an encoded probe for decoding by hybridization.

Figure 23A:
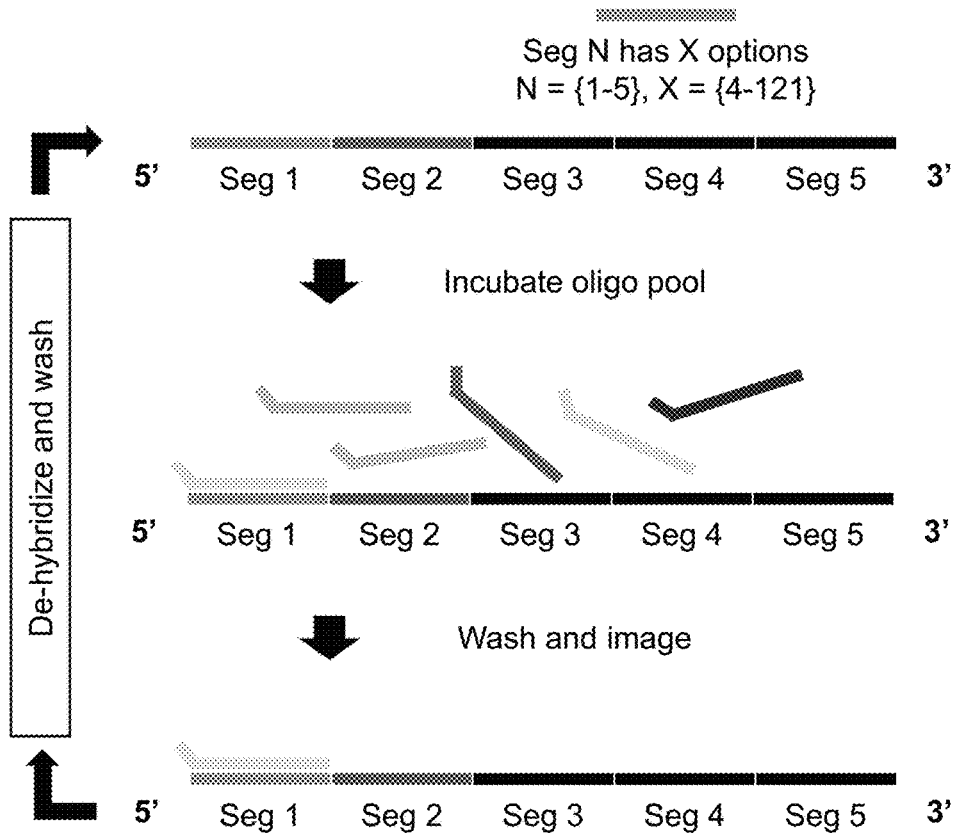
FIG. 23A is a schematic diagram illustrating an overview of process for decoding by hybridization.

FIG. 23A is a schematic diagram illustrating an overview of process for decoding by hybridization. For example, a code may include 5 segments and decoding may use 1 flow/segment, 4 colors or oligonucleotides in the oligo pool/flow. The decoding by hybridization process may include repeated cycles of hybridizing a code sequence with a decoding oligonucleotide pool (decoding oligos) comprising fluorescently labeled oligos, washing the hybridization reaction to remove unbound decoding oligos, imaging the decoding reaction to determine the identity of the hybridized decoding oligo, and de-hybridizing the code sequence to initiate a subsequent decoding cycle.

Figure 23B:
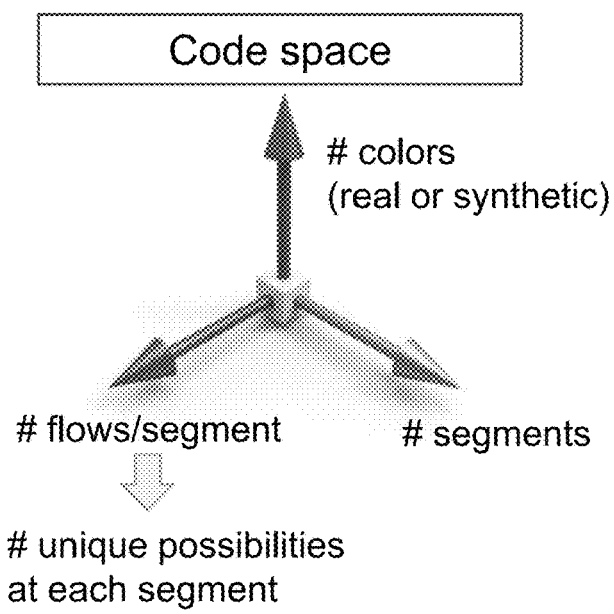
FIG. 23B is a schematic diagram illustrating the code space in decoding by hybridization.

FIG. 23B is a schematic diagram illustrating the code space in decoding by hybridization. For example, the code space may include the number of colors (real or synthetic), the number of flows per segment and the number of unique possibilities at each segment, and the number of segments in the code.

Figure 24:
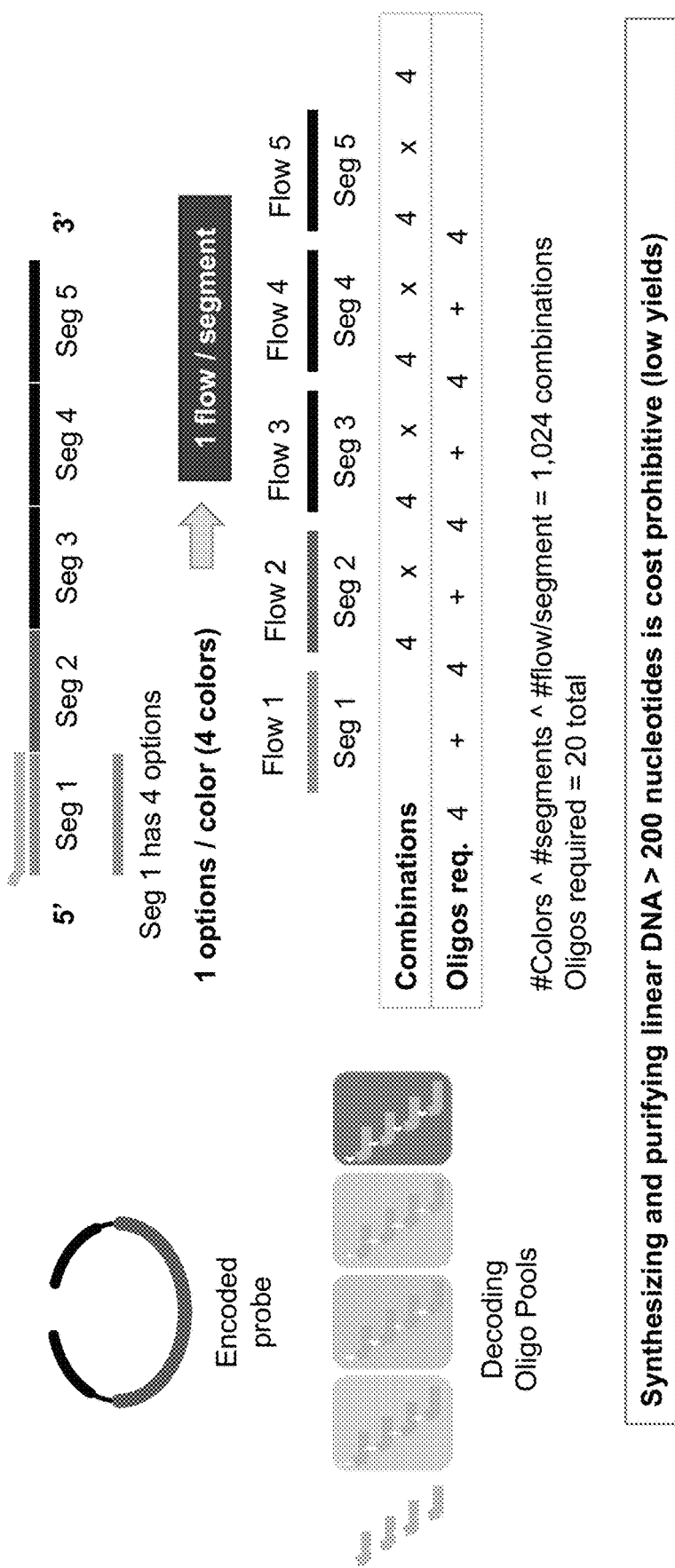
FIG. 24 is a schematic diagram of an example of a method for encoding symbols onto each segment of a code.

FIG. 24 is a schematic diagram of an example of a method for encoding symbols onto each segment of a code. In this example, the code comprises 5 segments (e.g., seg 1 through seg 5) which requires relatively few decoding oligos for decoding by hybridization. A code with 5 segments would require 5 decoding pools with 4 different labeled decoding oligos flowed for each segment decoded (i.e., 20 different decoding oligos are required).

Figure 25:
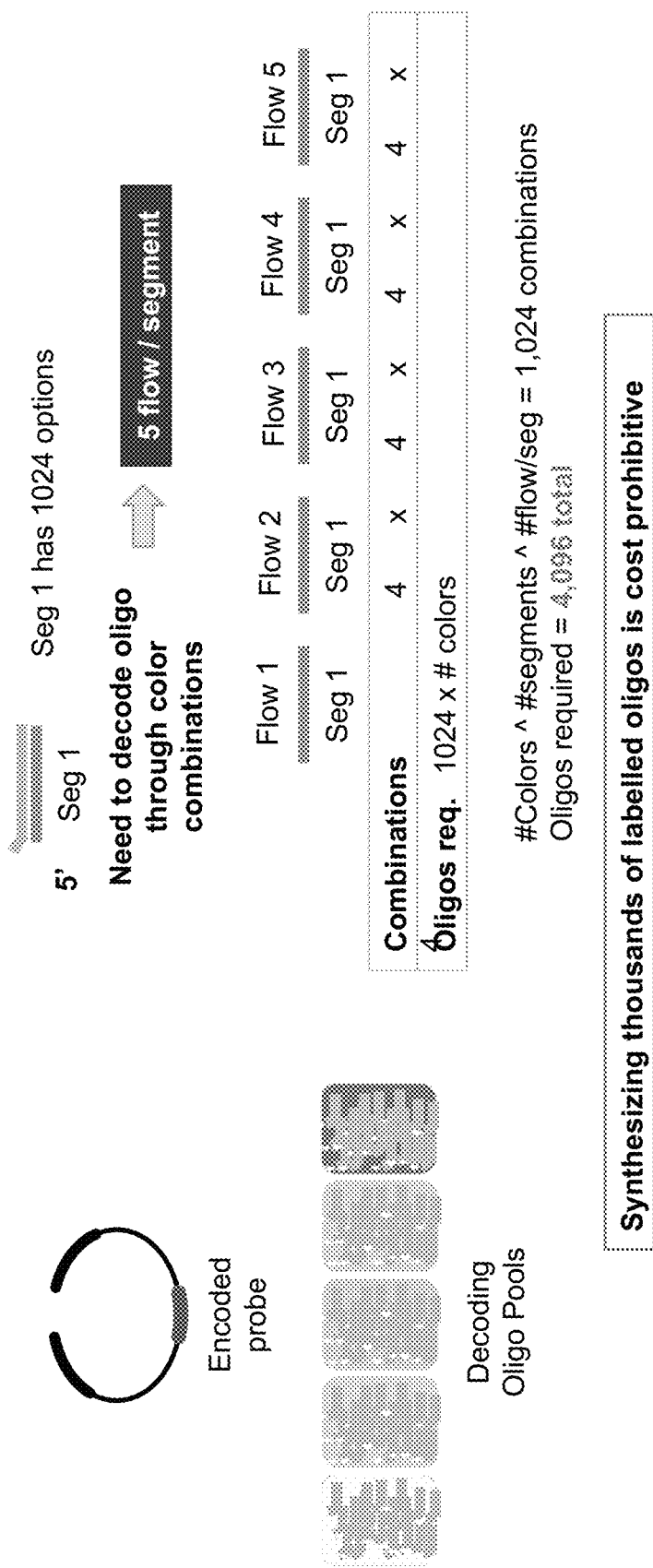
FIG. 25 is a schematic diagram of another example of a method for encoding symbols onto a code wherein the length of the code sequence comprises a single segment that requires a relatively large number of decoding oligos.

FIG. 25 is a schematic diagram of another example of a method for encoding symbols onto a code wherein the length of the code sequence comprises a single segment that requires a relatively large number of decoding oligos.

Figure 26:
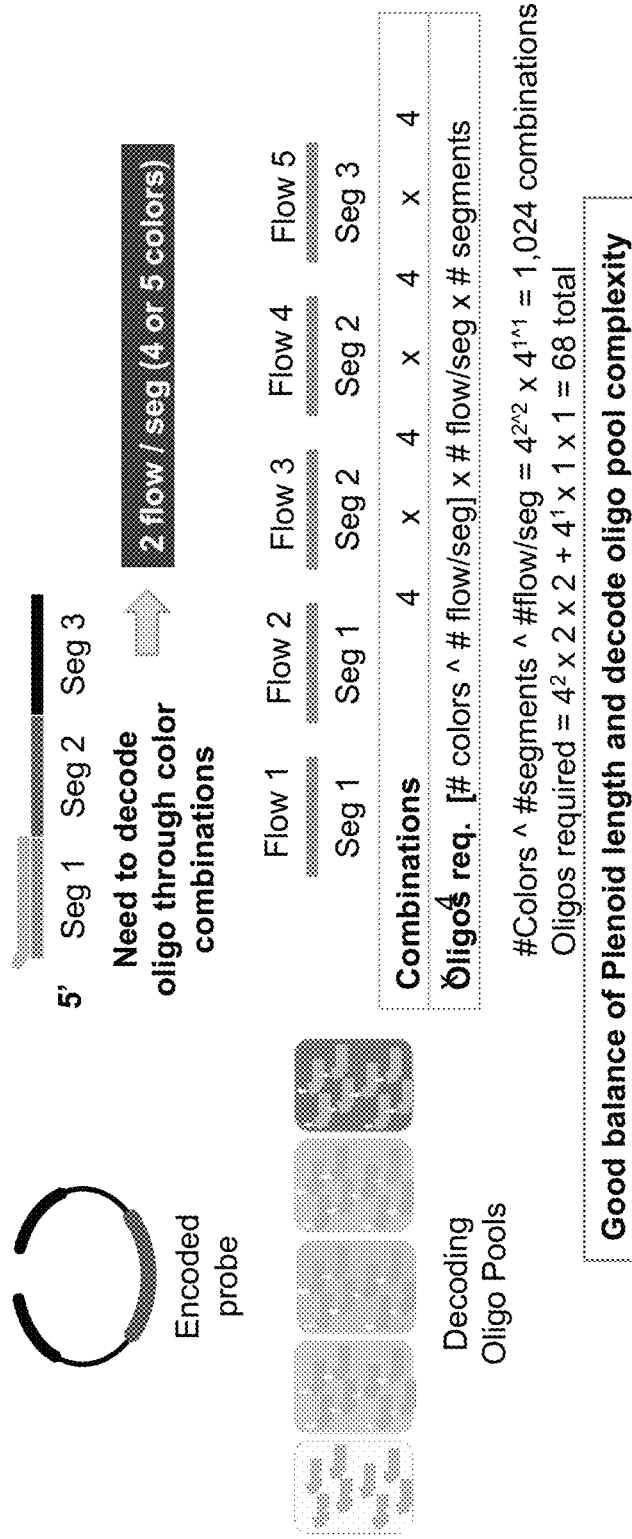
FIG. 26 is a schematic diagram of another example of a method for encoding symbols onto a code wherein a mix of segment number and flows/segment in the decoding process balances the length of a code and the complexity required in the decoding oligo pool.

FIG. 26 is a schematic diagram of another example of a method for encoding symbols onto a code wherein the mix of segment number and flows/segment in the decoding process balances the length of a code and the complexity required in the decoding oligo pool.

Figure 27:
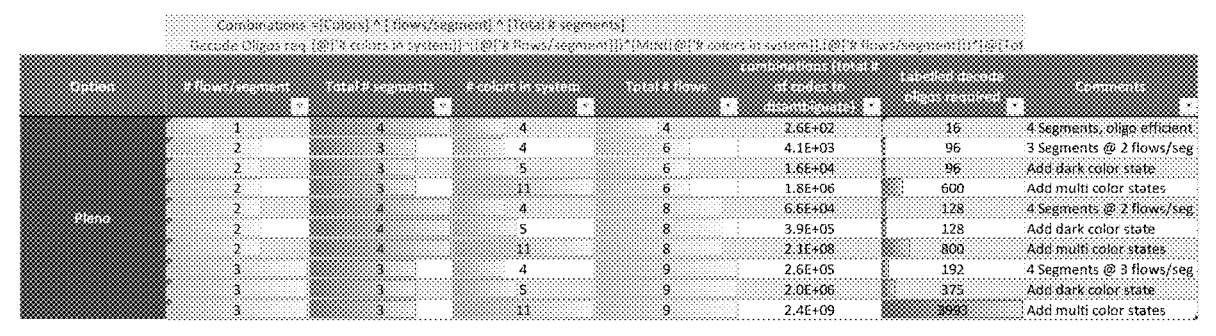

FIG. 27 is a screenshot of an example of the permutations (e.g., colors, flows/segment, total segments, and total flows) that may be used to achieve a relatively large combination space (codes pace) from which select a subset of codes.

Figures 28A, 28B:
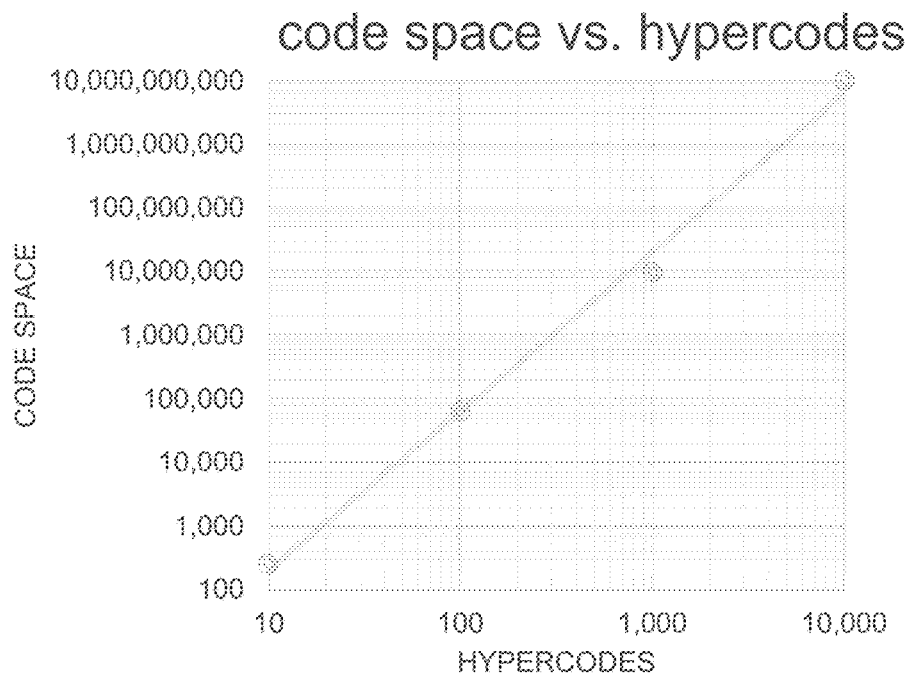
FIG. 28A is a plot showing the relationship of the number of codes in a code space.
FIG. 28B is a summary table of the number of segments, flows, and colors required for a given number of targets for detection.

FIG. 28A and FIG. 28B are a plot showing the relationship of the number of codes in a code space, and a summary table of the number of segments, flows, and colors required for a given number of targets for detection, respectively.

Figure 29:
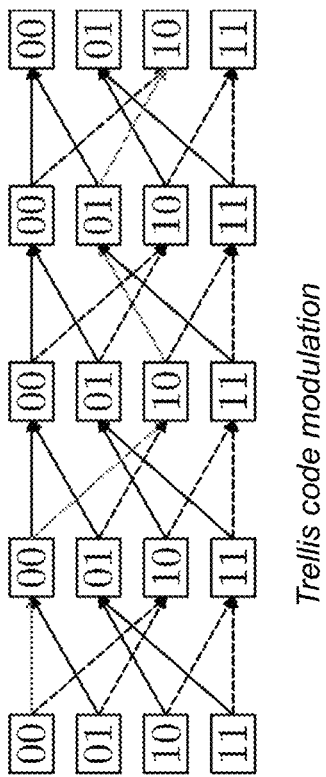
FIG. 29 is a schematic diagram of an example of a trellis code and a process of using the trellis code to select a set of codes with desired properties for an assay from a large code space.

FIG. 29 is a schematic diagram of an example of a trellis code and a process of using the trellis code to select a set of codes with desired properties for an assay from a large code space. In this example, a 4-color system is used, which enables error correction in the system to maximize decoding sensitivity and minimize the overall error rate.

Figure 30A:
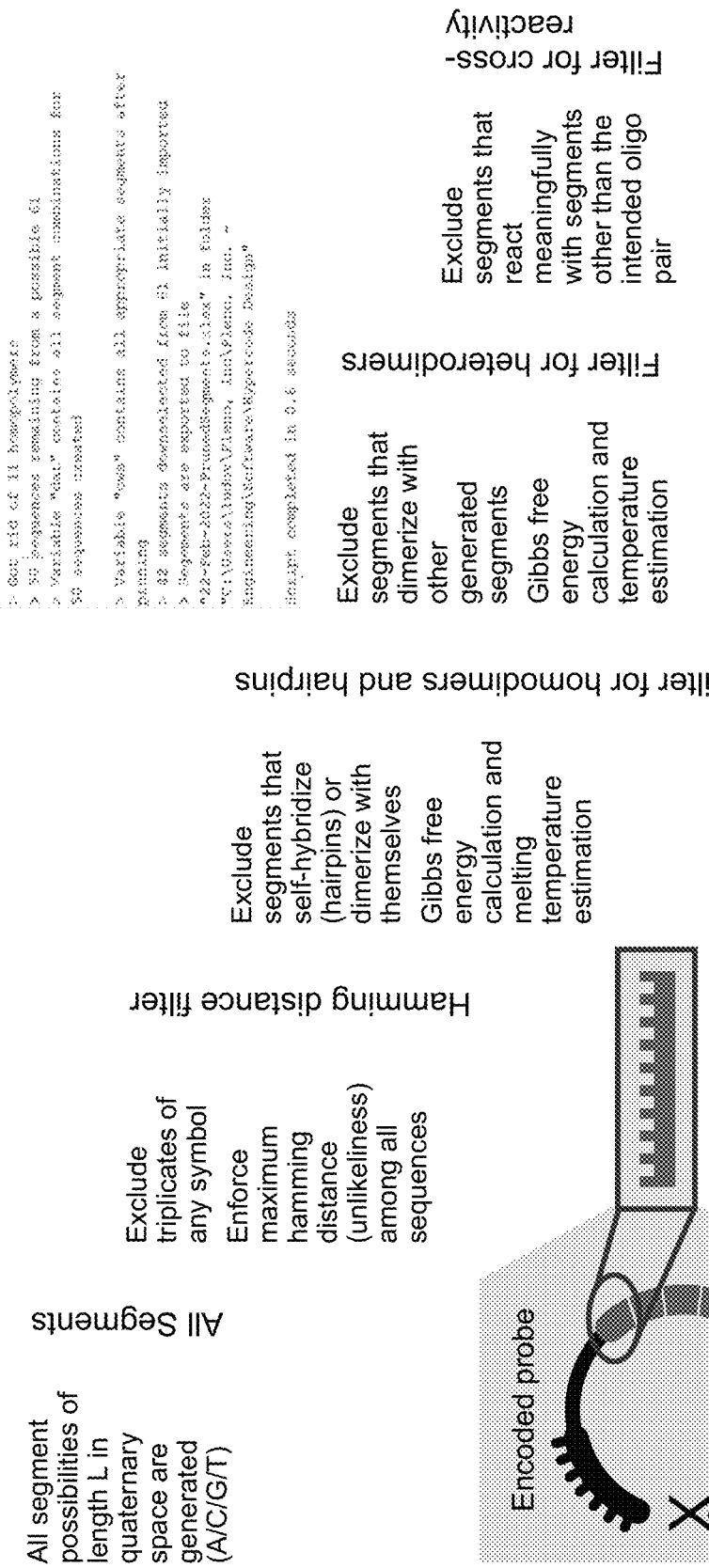
FIG. 30A is a representation of a strategy for designing oligo segments on a probe that will encode for the symbols that make up the trellis code (or other type of code).

FIG. 30A and FIG. 30B are a representation of a strategy for designing oligo segments on a probe that will encode for the symbols that make up the trellis code (or other). The strategy may include translating the symbol from the code into the DNA backbone of the probe, either through 1 DNA base if sequencing, or decoding by (may be more than 1 base), or many bases if using decoding by hybridization (e.g., between 10-20 bases, though longer and shorter are possible).

FIG. 31 is a representation of an overview of a decoding process comparing hard decoding vs. soft decoding.

Figure 32:
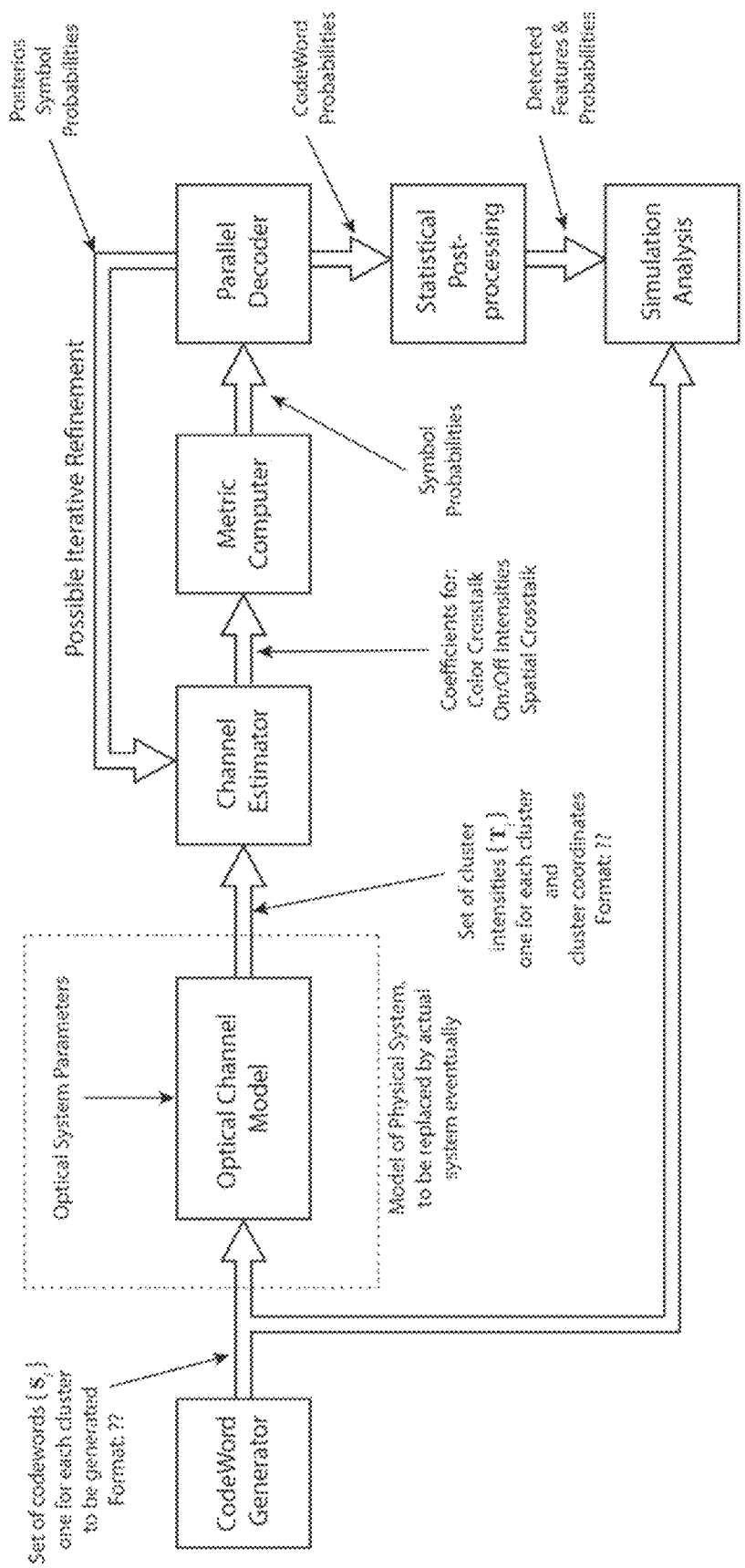
FIG. 32 is a schematic diagram of an example of a soft decoding process that may be used in the assays of the invention.

FIG. 32 is a schematic diagram of an example of a soft decoding process that may be used in the assays of the invention.

FIG. 33 is a summary of a channel model for a base calling algorithm that may be used in a soft decoding process. The model may include, for example, parameters for signal decay, amplitude noise, color crosstalk, signal leakage in time and system noise.

Figure 34:
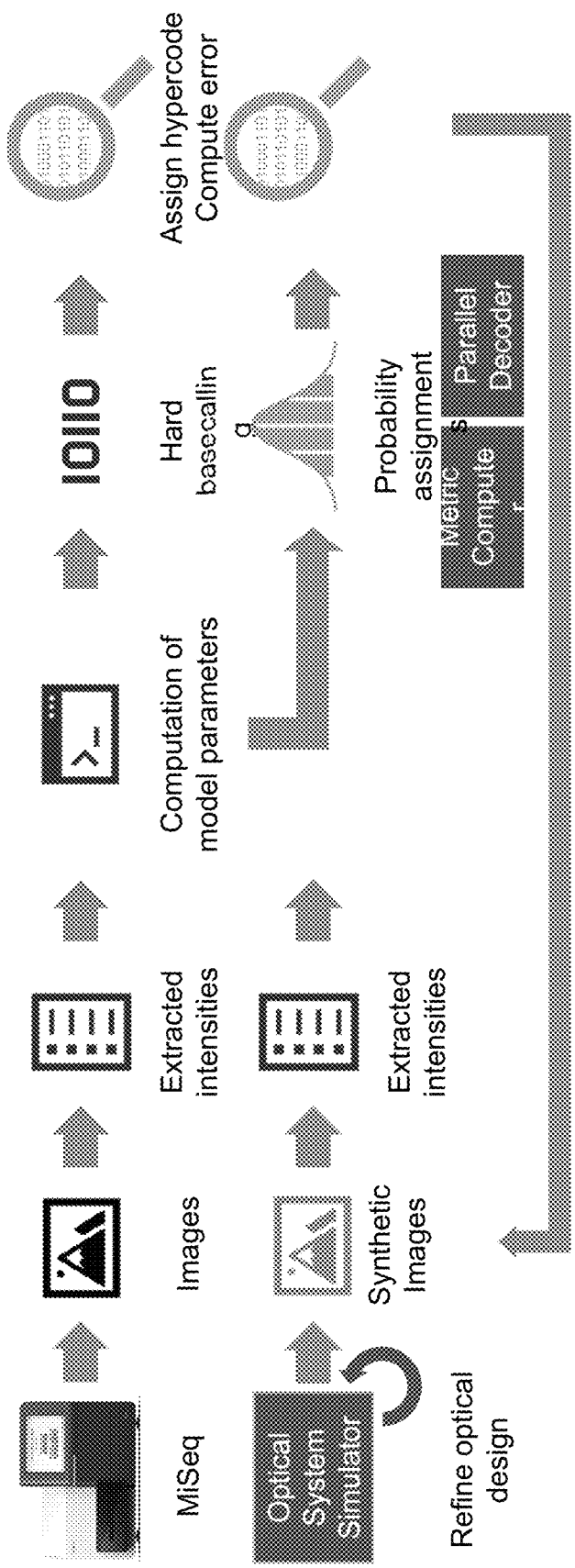
FIG. 34 is a flow chart illustrating aspects of the disclosed methods.

FIG. 34 is a schematic diagram illustrating an overview of an encoded assay analysis process.

In the methods of the invention, the targets may be detected by decoding the codes that are amplified (e.g., determining the presence of or the sequence of the codes).

In some embodiments, each code includes at least one segment encoding one or more symbols that correspond to a sequence of one or more nucleotides. Determining the presence of the codes or decoding the codes may include recording signal produced in response to interrogation of each segment of the codes and, upon completion of the interrogation, determining a probably of the presence of each of the codes by applying a soft-decision probabilistic decoding algorithm to the recorded signal.

The signal produced in response to interrogation of each segment of the codes may include signal from one or a combination of nanopore sequencing, next-generation sequencing, massively parallel sequencing, Sanger sequencing, sequencing by synthesis (SBS), pyrosequencing, sequencing by hybridization, decoding by hybridization, single molecule real-time sequencing, SOLID, and sequencing by ligation.

In some instances, each segment of the codes of the invention may include one symbol corresponding to one nucleotide. Each of the codes may include up to 50 segments for a length of each code comprising up to 50 nucleotides. Interrogation of the up to 50 segments having one symbol corresponding to one nucleotide may be performed by sequencing by synthesis (SBS).

In other instances, each segment may include one symbol corresponding to more than one nucleotide.

In various embodiments, each code may include two or more segments. Each code may include three or more segments. Each code may include four or more segments. In some cases, each code includes five to sixteen segments.

In one example, interrogation of code segments that have one symbol corresponding to more than one nucleotide is performed by decoding by hybridization. In some instances, at least one of the segments is interrogated more than one time by hybridization with one or more hybridization probes each having at least one label to produce the signal. At least four different labels may be utilized in the decoding by hybridization. In one example, each code includes at least four segments and at least sixteen symbols. In the case that at least one of the segments is interrogated more than one time by hybridization with one or more hybridization probes each having at least one label to produce the signal, a unique number of possibilities at each of the segments includes up to a number of the different labels to the power of a number of the hybridizations per segment. The label may be an optical label. The label may be a fluorescent label. At least one probe may include two or more of the labels to create a pseudo label and generate a larger number of the symbols.

In the methods of the invention, the set of targets may include tens of target analytes, hundreds of target analytes, thousands of target analytes, or tens of thousands of target analytes.

The length of each code from the set of codes may range from 3 to 100 nucleotides or from 3 to 75 nucleotides.

In various instances, each code from the set of codes is a predetermined code. Each code from the set of codes may be selected to avoid interaction with other assay components. Each code from the set of codes may be selected to ensure that it differs from each other code from the set of codes. Each code from the set of codes may be homopolymer free. Each code from the set of codes may be generated from a 4-ary nucleotide alphabet of A, C, G and T and generated, for example, using a 4-state encoding trellis with 3 transitions per state. In another example, each code from the set of codes is generated from a 3-ary nucleotide alphabet of a set of three of A, C, G and T and generated, for example, using a 4-state encoding trellis with 3 transitions per state.

Concluding Remarks

Throughout this specification and the claims, the terms "comprise," "comprises," "comprising," "include," "includes," and "including," are intended to be non-limiting, such that recitation of items in a list is not to the exclusion of other like items that may be substituted or added to the listed items.

Terms like "preferably," "commonly," and "typically" are not utilized herein to limit the scope of the claimed embodiments or to imply that certain features are critical or essential to the structure or function of the claimed embodiments. These terms are intended to highlight alternative or additional features that may or may not be utilized in a particular embodiment of the present disclosure.

The term "substantially" is utilized herein to represent the inherent degree of uncertainty that may be attributed to any quantitative comparison, value, measurement, or other representation and to represent the degree by which a quantitative representation may vary from a stated reference without resulting in a change in the basic function of the subject matter at issue.

Various modifications and variations of the disclosed methods, compositions and uses of the invention will be apparent to the skilled person without departing from the scope and spirit of the invention. Although the invention has been disclosed in connection with specific preferred aspects or embodiments, it should be understood that the invention as claimed should not be unduly limited to such specific aspects or embodiments.

The present invention may be implemented using hardware, software, or a combination thereof and may be implemented in one or more computer systems or other processing systems. In one aspect, the invention is directed toward one or more computer systems capable of carrying out the functionality described herein.

In one embodiment, the system includes (a) a reaction vessel; (b) a reagent dispensing module; and (c) software to execute the method of any of the foregoing claims, wherein the method is executed robotically.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments #1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

We claim:

1. A method of conducting an assay for nucleic acid targets, the method comprising:
  (a) combining dual probes with a sample composition potentially comprising nucleic acid targets to form cleavable ternary nucleic acid complexes, wherein:
    (i) each of the dual probes comprise two probes;
    (ii) a first probe of each of the dual probes comprises a first targeting sequence that is complementary to a first portion of a nucleic acid target;
    (iii) a second probe of each of the dual probes comprises:
      (1) a second targeting sequence; and
      (2) a non-targeting recognition element sequence, wherein the second targeting sequence is complementary to a second portion of the nucleic acid target and wherein the second targeting sequence of the second probe overlaps by at least one nucleotide with the first targeting sequence of the first probe;
    (iv) binding of the dual probe to the nucleic acid target with no mismatches between the nucleic acid target and the second targeting sequence of the second probe at a nucleic acid target site of interest results in a cleavable ternary nucleic acid complex, wherein the cleavable ternary nucleic acid complex comprises the non-targeting recognition element sequence of the second probe;
    (v) binding of the dual probe to a non-target nucleic acid with mismatches between the non-target nucleic acid and the second targeting sequence of the second probe results in an uncleavable ternary nucleic acid complex;
  (b) releasing from the cleavable ternary nucleic acid complex the non-targeting recognition element sequence, thereby forming a recognition element fragment;
  (c) hybridizing the released recognition element fragment to a coded oligonucleotide probe and using the resulting hybridized released recognition element fragment as a primer for copying the coded oligonucleotide probe to produce a set of target-associated codes, wherein the coded oligonucleotide probe comprises a code comprising at least one segment encoding one or more symbols that correspond to a sequence of one or more nucleotides; and
  (d) performing a detection event to identify one or more detected codes of the target-associated codes;
  wherein the one or more detected codes indicates the presence of the nucleic acid target in the sample composition.

2. The method of claim 1, further comprising, prior to performing the detection event, circularizing the coded oligonucleotide probe to produce a circular modified recognition element comprising the target-associated codes.

3. The method of claim 2, further comprising amplifying the circular modified recognition element, wherein the amplifying the circular modified recognition element comprises a rolling circle amplification reaction to yield a nucleic acid concatemer comprising multiple copies of the code.

4. The method of claim 1, further comprising amplifying the nucleic acid targets in parallel with:
  (a) binding of the dual probe to the nucleic acid target and the non-target nucleic acid; and
  (b) releasing the recognition element fragment.

5. The method of claim 1, wherein:
  (a) each of the dual probes comprise from 3 to 100 coded recognition elements; and
  (b) each of the coded recognition elements comprises a soft decodable code.

6. The method of claim 1, wherein:
  (a) each of the dual probes comprises from 100 to 10,000 coded recognition elements; and
  (b) each of the coded recognition elements comprises a soft decodable code.

7. The method of claim 1, wherein the performing the detection event comprises:
  (a) recording a signal produced in response to an interrogation of each segment of each of the codes; and
  (b) determining, upon completion of the interrogation, a probability of the presence of each of the codes by applying a soft-decision probabilistic decoding algorithm to the recorded signal.

8. The method of claim 1, wherein the performing the detection event comprises determining whether the code is present without determining a nucleic acid sequence of the code.

9. The method of claim 1, wherein the performing the detection event comprises determining whether the code is present without making a specific base call for each nucleotide in the code.

10. The method of claim 1, wherein the releasing comprises cleaving the ternary nucleic acid complex using a flap endonuclease.

11. The method of claim 1, wherein the first probe and the second probe of each of the dual probes:
(a) hybridize to one of the nucleic acid targets; and
(b) overlap at the nucleic acid target site of interest, leaving the non-targeting recognition element sequence unhybridized.

12. The method of claim 1, further comprising:
(a) counting the one or more detected codes to produce a code count for each detected code; and
(b) estimating nucleic acid target quantities based on the code count.

13. The method of claim 1, wherein the at least one segment encoding one or more symbols has a length ranging from 3 to 150 nucleotides.

14. The method of claim 1, wherein each code has a predetermined sequence.

15. The method of claim 1, wherein each code is selected to avoid interaction with other assay components.

16. The method of claim 1, wherein each of the dual probes or the coded oligonucleotide probes is unique for a specific nucleic acid target and comprises a code that is unique within a set of codes.

17. The method of claim 1, wherein each code is homopolymer free.

18. The method of claim 1, wherein each of the dual probes comprises one or more sample-specific barcodes.

19. The method of claim 1, wherein the sample composition comprises nucleic acids extracted from one or a combination of any of whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs or biological washes.

20. The method of claim 1, wherein the nucleic acid targets comprise wild-type and/or mutated nucleic acid sequences.

21. The method of claim 1, wherein the nucleic acid targets comprise point mutations.

22. The method of claim 1, wherein the nucleic acid targets comprise substitutions, insertions and/or deletions.

23. The method of claim 1, wherein the nucleic acid targets comprise copy number variations.

24. The method of claim 1, wherein the nucleic acid targets comprise extracellular DNA fragments selected for methylation patterns indicative of cancer.

25. The method of claim 24, wherein the extracellular DNA fragments comprise bases, wherein the bases are transformed prior to the performing the detection event.

26. The method of claim 1, wherein the nucleic acid targets comprise methylated nucleotides.

27. The method of claim 1, wherein the nucleic acid targets comprise extracellular DNA fragments.

28. The method of claim 1, wherein the nucleic acid targets comprise RNA fragments.

* * * * *